US 8,496,283 B1

(12) United States Patent
Schmeichel et al.

(10) Patent No.: US 8,496,283 B1
(45) Date of Patent: Jul. 30, 2013

(54) ROLL-UP TARP APPARATUS

(75) Inventors: Charles M. Schmeichel, Jamestown, ND (US); Shawn J. Wock, Buchanan, ND (US)

(73) Assignee: Agri-Cover, Inc., Jamestown, ND (US)

( * ) Notice: Subject to any disclaimer, the term of this patent is extended or adjusted under 35 U.S.C. 154(b) by 9 days.

(21) Appl. No.: 13/222,714

(22) Filed: Aug. 31, 2011

Related U.S. Application Data

(63) Continuation-in-part of application No. 12/463,049, filed on May 8, 2009.

(60) Provisional application No. 61/378,618, filed on Aug. 31, 2010, provisional application No. 61/051,999, filed on May 9, 2008, provisional application No. 61/169,185, filed on Apr. 14, 2009.

(51) Int. Cl.
*B60P 7/04* (2006.01)

(52) U.S. Cl.
USPC ........................................ 296/98; 296/100.16

(58) Field of Classification Search
USPC .................... 296/98, 100.13, 100.15, 100.05, 296/120.01, 100.04, 100.11, 100.16
See application file for complete search history.

(56) References Cited

U.S. PATENT DOCUMENTS

| | | | |
|---|---|---|---|
| 102,642 A | 5/1870 | Yenne | |
| 856,159 A | 6/1907 | Keller | |
| 989,069 A | 4/1911 | Siewert | |
| 1,199,766 A | 10/1916 | Dewstow | |
| 1,322,326 A | 11/1919 | Miller | |
| 1,526,045 A | 2/1925 | Brown | |
| 1,558,114 A | 10/1925 | Morrison | |
| 1,612,446 A | 12/1926 | Larson | |
| 1,643,281 A | 9/1927 | Baumann et al. | |
| 1,786,048 A | 12/1930 | Williams | |
| 1,844,809 A | 2/1932 | Spaugh | |

(Continued)

FOREIGN PATENT DOCUMENTS

| | | |
|---|---|---|
| AT | 112325 B | 2/1929 |
| CA | 1 243 062 A1 | 10/1988 |

(Continued)

OTHER PUBLICATIONS

Shur-Co., Rear Aluminum Cap w/Flap & Cable Return, Instruction Manual, Sep. 16, 2003, 2pgs, www.shurco.com, Shur-Co., Yankton, South Dakota.

(Continued)

*Primary Examiner* — Glenn Dayoan
*Assistant Examiner* — Pinel Romain
(74) *Attorney, Agent, or Firm* — Moore & Hansen, PLLC

(57) ABSTRACT

A roll-up tarp apparatus for attachment to an open top truck trailer having a truck box, having end caps at each end that partially cover the top opening. Preferred embodiments include a flexible tarp having at least one magnet, even more preferably a plurality of magnets along each end of the flexible tarp, that are configured to releasably secure the flexible tarp to the end cap when the flexible tarp is in the secured position. Preferably, the flexible tarp is wound around an elongated roll bar that is secured to at least one arm that connects the elongated roll bar to the truck box and selectively activates movement of the elongated roll bar to move the flexible tarp from an open position to a secured position. Various embodiments include biasing members to bias the arm(s).

43 Claims, 41 Drawing Sheets

U.S. PATENT DOCUMENTS

| | | | |
|---|---|---|---|
| 1,941,214 A | 12/1933 | Kusterle | |
| 2,595,597 A | 5/1952 | Morseth | |
| 2,743,132 A | 4/1956 | Zahn | |
| 2,766,008 A | 10/1956 | Hurd | |
| 2,771,319 A | 11/1956 | Renquist | |
| 2,797,124 A | 6/1957 | Hauptli | |
| 2,906,323 A | 9/1959 | Macy | |
| 2,976,082 A | 3/1961 | Dahlman | |
| 3,146,824 A | 9/1964 | Veilleux | |
| 3,184,261 A | 5/1965 | Young | |
| 3,384,413 A | 5/1968 | Sargent | |
| 3,467,431 A | 9/1969 | Turcotte | |
| 3,494,658 A | 2/1970 | Maes | |
| 3,498,666 A * | 3/1970 | Harrawood | 296/98 |
| 3,515,428 A | 6/1970 | Killion | |
| 3,549,198 A | 12/1970 | Cappello | |
| 3,622,193 A | 11/1971 | Schmidt | |
| 3,656,802 A | 4/1972 | White | |
| 3,667,802 A | 6/1972 | Love | |
| 3,759,568 A | 9/1973 | Unruh | |
| 3,768,595 A | 10/1973 | Kelly, Jr. | |
| 3,774,958 A | 11/1973 | Thorpe | |
| 3,785,694 A | 1/1974 | Sargent | |
| 3,819,082 A | 6/1974 | Rosenvold | |
| 3,820,840 A | 6/1974 | Forsberg | |
| 3,829,154 A | 8/1974 | Becknell | |
| 3,833,255 A | 9/1974 | Logue | |
| 3,854,770 A | 12/1974 | Grise et al. | |
| 3,861,737 A | 1/1975 | Kirkbride | |
| 3,868,142 A | 2/1975 | Bachand et al. | |
| 3,910,629 A | 10/1975 | Woodard | |
| 3,913,969 A | 10/1975 | Hoch | |
| 3,924,889 A | 12/1975 | Gogush | |
| 3,942,830 A | 3/1976 | Woodard | |
| 3,957,068 A | 5/1976 | Cox | |
| 3,964,781 A | 6/1976 | Fenton | |
| 3,975,047 A | 8/1976 | McClellan | |
| 3,986,749 A | 10/1976 | Hull et al. | |
| 4,003,301 A * | 1/1977 | Norton | 454/108 |
| 4,012,021 A | 3/1977 | Duceppe | |
| 4,014,590 A | 3/1977 | Schulz, Jr. | |
| 4,023,857 A | 5/1977 | Killion | |
| 4,030,780 A | 6/1977 | Petretti | |
| 4,032,186 A | 6/1977 | Pickering et al. | |
| 4,046,416 A | 9/1977 | Penner | |
| 4,050,734 A | 9/1977 | Richard | |
| 4,054,011 A | 10/1977 | Ensink et al. | |
| 4,067,603 A | 1/1978 | Fenton | |
| 4,082,347 A | 4/1978 | Petretti | |
| 4,088,234 A | 5/1978 | Smith | |
| 4,095,838 A | 6/1978 | Beeler | |
| 4,095,840 A | 6/1978 | Woodard | |
| 4,098,477 A | 7/1978 | Perez | |
| 4,126,351 A | 11/1978 | Peteretti | |
| 4,129,331 A | 12/1978 | Lawson et al. | |
| 4,140,339 A | 2/1979 | Fredin | |
| 4,157,202 A | 6/1979 | Bachand | |
| 4,162,100 A * | 7/1979 | Muscillo | 296/100.12 |
| 4,172,614 A | 10/1979 | Guido, Jr. | |
| 4,189,178 A | 2/1980 | Cramaro | |
| 4,200,330 A | 4/1980 | Scott | |
| 4,201,254 A | 5/1980 | Fehric | |
| 4,212,492 A | 7/1980 | Johnsen | |
| 4,218,087 A | 8/1980 | Neville | |
| 4,223,941 A | 9/1980 | Janzen et al. | |
| 4,225,175 A * | 9/1980 | Fredin | 296/98 |
| 4,230,359 A | 10/1980 | Smith | |
| 4,234,224 A | 11/1980 | Rosenvold | |
| 4,248,475 A | 2/1981 | Johnsen | |
| 4,269,443 A | 5/1981 | Farmer | |
| 4,272,119 A | 6/1981 | Adams | |
| 4,277,220 A | 7/1981 | Wiley | |
| 4,281,872 A | 8/1981 | Biancale | |
| 4,302,043 A * | 11/1981 | Dimmer et al. | 296/98 |
| 4,302,044 A | 11/1981 | Sims | |
| 4,341,416 A | 7/1982 | Richard | |
| 4,380,350 A | 4/1983 | Block | |
| 4,416,485 A | 11/1983 | Long | |
| RE31,746 E | 11/1984 | Dimmer et al. | |
| 4,484,777 A * | 11/1984 | Michel | 296/98 |
| 4,505,512 A | 3/1985 | Schmeichel et al. | |
| 4,516,802 A | 5/1985 | Compton | |
| 4,518,193 A * | 5/1985 | Heider et al. | 296/98 |
| 4,529,098 A | 7/1985 | Heider et al. | |
| 4,544,196 A | 10/1985 | Schmeichel et al. | |
| 4,583,777 A | 4/1986 | Myburgh | |
| 4,585,267 A * | 4/1986 | Friesen | 296/100.1 |
| 4,627,658 A | 12/1986 | Vold et al. | |
| 4,657,062 A | 4/1987 | Tuerk | |
| 4,659,134 A | 4/1987 | Johnson | |
| 4,668,007 A | 5/1987 | Sloan | |
| 4,673,208 A * | 6/1987 | Tsukamoto | 296/98 |
| 4,691,957 A * | 9/1987 | Ellingson | 296/98 |
| 4,700,985 A | 10/1987 | Whitehead | |
| 4,703,971 A | 11/1987 | Schmeichel et al. | |
| 4,715,089 A | 12/1987 | Schema | |
| 4,725,090 A | 2/1988 | Weaver | |
| 4,740,029 A | 4/1988 | Tuerk | |
| 4,757,854 A | 7/1988 | Rippberger | |
| 4,801,171 A | 1/1989 | Weaver | |
| 4,823,707 A | 4/1989 | Salsbury et al. | |
| 4,834,445 A | 5/1989 | Odegaard | |
| 4,854,630 A | 8/1989 | Biancale | |
| 4,858,984 A | 8/1989 | Weaver | |
| 4,874,196 A | 10/1989 | Goldstein et al. | |
| 4,893,864 A | 1/1990 | Bailey | |
| 4,915,439 A | 4/1990 | Cramaro | |
| 4,923,240 A | 5/1990 | Swanson | |
| 4,944,551 A | 7/1990 | Hardy, Jr. | |
| 4,948,193 A | 8/1990 | Weaver | |
| 4,981,411 A | 1/1991 | Ramsey | |
| 4,995,663 A | 2/1991 | Weaver et al. | |
| 5,002,328 A | 3/1991 | Michel | |
| 5,004,032 A | 4/1991 | Pedersen | |
| 5,007,672 A | 4/1991 | Koch | |
| 5,026,109 A | 6/1991 | Merlot, Jr. | |
| 5,031,955 A | 7/1991 | Searfoss | |
| 5,050,923 A | 9/1991 | Petelka | |
| 5,058,652 A | 10/1991 | Wheatley et al. | |
| 5,058,956 A | 10/1991 | Godwin, Sr. | |
| 5,064,240 A | 11/1991 | Kuss et al. | |
| 5,067,767 A | 11/1991 | Biancale | |
| 5,076,338 A | 12/1991 | Schmeichel et al. | |
| 5,080,422 A | 1/1992 | DeMonte et al. | |
| 5,080,423 A | 1/1992 | Merlot et al. | |
| 5,102,182 A | 4/1992 | Haddad, Jr. | |
| 5,112,097 A | 5/1992 | Turner, Jr. | |
| 5,129,698 A | 7/1992 | Cohrs et al. | |
| 5,145,230 A | 9/1992 | Biancale | |
| 5,152,575 A | 10/1992 | DeMonte et al. | |
| 5,174,353 A | 12/1992 | Schmeichel et al. | |
| 5,179,991 A | 1/1993 | Haddad, Jr. | |
| 5,180,203 A * | 1/1993 | Goudy | 296/98 |
| 5,190,341 A | 3/1993 | Simard | |
| 5,203,055 A * | 4/1993 | Broadwater, Sr. | 24/462 |
| 5,211,440 A | 5/1993 | Cramaro | |
| 5,211,441 A * | 5/1993 | Barkus et al. | 296/104 |
| 5,218,743 A * | 6/1993 | Miller | 24/68 CD |
| 5,238,287 A | 8/1993 | Haddad, Jr. | |
| 5,238,359 A | 8/1993 | Chen | |
| 5,240,303 A | 8/1993 | Hageman | |
| 5,240,304 A | 8/1993 | Cramaro et al. | |
| 5,253,914 A | 10/1993 | Biancale | |
| 5,275,459 A | 1/1994 | Haddad, Jr. | |
| 5,281,074 A | 1/1994 | Mashuda | |
| 5,288,123 A | 2/1994 | Dimmer | |
| 5,303,972 A | 4/1994 | Heider et al. | |
| 5,328,228 A * | 7/1994 | Klassen | 296/98 |
| 5,380,058 A | 1/1995 | Short et al. | |
| 5,385,377 A * | 1/1995 | Girard | 296/36 |
| 5,388,882 A | 2/1995 | Russell et al. | |
| 5,429,408 A | 7/1995 | Henning et al. | |
| 5,435,627 A | 7/1995 | Fleming | |
| 5,462,102 A | 10/1995 | Searfoss | |
| 5,466,030 A | 11/1995 | Harris et al. | |
| 5,474,354 A | 12/1995 | Beale | |
| 5,482,347 A | 1/1996 | Clarys et al. | |

| | | |
|---|---|---|
| 5,487,584 A | 1/1996 | Jaspersen |
| 5,491,021 A | 2/1996 | Tolliver et al. |
| 5,498,057 A | 3/1996 | Reina et al. |
| 5,498,066 A | 3/1996 | Cuthbertson et al. |
| 5,524,953 A | 6/1996 | Shaer |
| 5,538,313 A | 7/1996 | Henning |
| 5,542,734 A | 8/1996 | Burcett et al. |
| 5,549,347 A | 8/1996 | Anderson |
| 5,573,295 A | 11/1996 | Haddad, Jr. |
| 5,658,037 A | 8/1997 | Evans et al. |
| 5,664,824 A | 9/1997 | Stephens et al. |
| 5,692,793 A | 12/1997 | Wilson et al. |
| 5,713,712 A | 2/1998 | McIntyre |
| 5,743,700 A | 4/1998 | Wood, Jr. et al. |
| 5,752,735 A | 5/1998 | Fleming et al. |
| 5,762,002 A | 6/1998 | Dahlin et al. |
| 5,765,901 A * | 6/1998 | Wilkens .......................... 296/98 |
| 5,775,765 A * | 7/1998 | Kintz .............................. 296/98 |
| 5,803,528 A | 9/1998 | Haddad, Jr. |
| 5,823,067 A | 10/1998 | Clarys et al. |
| 5,823,604 A | 10/1998 | Chenowth |
| 5,829,819 A | 11/1998 | Searfoss |
| RE36,135 E | 3/1999 | O'Brian |
| 5,887,937 A | 3/1999 | Searfoss |
| 5,924,758 A | 7/1999 | Dimmer et al. |
| 5,938,270 A | 8/1999 | Swanson et al. |
| 5,944,374 A | 8/1999 | Searfoss |
| 5,957,523 A | 9/1999 | Haddad, Jr. |
| 5,964,236 A | 10/1999 | Berke |
| D427,135 S | 6/2000 | Searfoss |
| 6,135,534 A * | 10/2000 | Schmeichel .................... 296/98 |
| 6,142,553 A * | 11/2000 | Bodecker ........................ 296/98 |
| 6,199,935 B1 * | 3/2001 | Waltz et al. ..................... 296/98 |
| 6,206,449 B1 | 3/2001 | Searfoss |
| 6,237,985 B1 | 5/2001 | O'Brian |
| 6,257,646 B1 | 7/2001 | Searfoss |
| 6,322,041 B1 | 11/2001 | Schmeichel |
| 6,513,856 B1 | 2/2003 | Swanson et al. |
| 6,527,331 B2 | 3/2003 | Searfoss |
| 6,637,800 B2 * | 10/2003 | Henning ................. 296/100.15 |
| 6,641,199 B1 | 11/2003 | Hicks |
| 6,659,531 B2 | 12/2003 | Searfoss |
| 6,685,251 B2 * | 2/2004 | Dumas ................... 296/100.01 |
| 6,715,817 B2 | 4/2004 | Nolan et al. |
| 6,783,168 B2 | 8/2004 | Searfoss |
| 6,808,220 B2 * | 10/2004 | Wheatley ................ 296/100.15 |
| 6,857,682 B2 | 2/2005 | Eggers et al. |
| 6,886,879 B2 | 5/2005 | Nolan et al. |
| 6,916,060 B2 | 7/2005 | Searfoss |
| 6,979,043 B2 * | 12/2005 | Leischner et al. ............. 296/98 |
| 7,032,950 B2 | 4/2006 | Eggers et al. |
| 7,188,887 B1 * | 3/2007 | Schmeichel .................... 296/98 |
| 7,195,304 B1 * | 3/2007 | Schmeichel .................... 296/98 |
| 7,246,838 B2 | 7/2007 | Searfoss |
| 7,275,780 B2 * | 10/2007 | Boyd et al. ............. 296/100.14 |
| 7,841,642 B2 | 11/2010 | Schaefer |
| 2002/0021018 A1 | 2/2002 | Royer |
| 2002/0084672 A1 | 7/2002 | Searfoss |
| 2003/0052505 A1 | 3/2003 | Searfoss |
| 2004/0245800 A1 * | 12/2004 | Wheatley ................ 296/100.16 |
| 2005/0057068 A1 * | 3/2005 | Searfoss .......................... 296/98 |
| 2005/0062314 A1 | 3/2005 | Searfoss |
| 2008/0042466 A1 | 2/2008 | Searfoss |
| 2010/0164246 A1 * | 7/2010 | Schaefer ......................... 296/98 |

FOREIGN PATENT DOCUMENTS

| | | |
|---|---|---|
| DE | 33 40 876 A1 | 5/1985 |
| GB | 2 041 839 A | 9/1980 |
| GB | 1 587 813 A | 4/1981 |
| NO | 381008 | 3/1983 |

OTHER PUBLICATIONS

Agri-Cover, Rocker Switch Instructions for Hardware Kit # 40604, Instruction Manual, Mar. 13, 2007, 2pgs, ACI, Jamestown, North Dakota.

Agri-Cover, Inc., SRT-2™ Spool Roll Tarp Features, web site details for agricultural trailer tarp systems, 2008, 6 pgs, www.agricover.com/index.php/products/, ACI, Jamestown, North Dakota.

Agri-Cover, Inc., SRT™ Spool Roll Tarp Hand and Electric Owner's Manual, Owner's Manual, 2006, 23pgs, ACI, Jamestown, North Dakota.

Agri-Cover, Inc., EZ-LOC Electric Roll-Up Tarp Tarp Kit Instructions, Instruction Manual, 2006, 7pgs, ACI, Jamestown, North Dakota.

Agri-Cover, Inc., Agri-Cover® EZ-LOC® Roll-Up Tarp for Farm Truck, Grain Cart, and Semi-Trailer Boxes Owner's Manual, Owner's Manual, 2007, ACI, Jamestown, North Dakota.

Agri-Cover, Inc., Agri-Cover® SRT-2™ Agri-Cover® Electric SRT-2™ Spool Roll Tarp Hand and Electric Owner's Manual, Owner's Manual, 2008, ACI Jamestown, North Dakota.

Agri-Cover, Inc., Agri-Cover® EZ-LOC® Roll-Up Tarp EZ-LOC® Hand and Electric Installation Instructions and Owner's Manual, Instructions and Owner's Manual, 2008, 25pgs, Jamestown, North Dakota.

Agri-Cover, Inc., ACI™ Agri-Cover, Inc 2008 Roll Tarp Price Guide Agri-Cover® SRT-2™ Spool Roll Tarp Agri-Cover® EZ-LOC® Roll-Up Tarp, Price Guide, 2008, 23pgs, ACI, Jamestown, North Dakota.

Shur-Co., Replacement Parts: Roll Tarp—Electric Swing Arm Shur-Lok®: General Parts, replacement part order form, published online at least as early as May 5, 2009, www.ShopShurco.com, 6pgs, Shur-Co., Yankton, South Dakota.

United States Patent and Trademark Office, Prosecution History of U.S. Appl. No. 12/463,049, filed May 8, 2009, Applicant Charles M. Schmeichel et al.

* cited by examiner

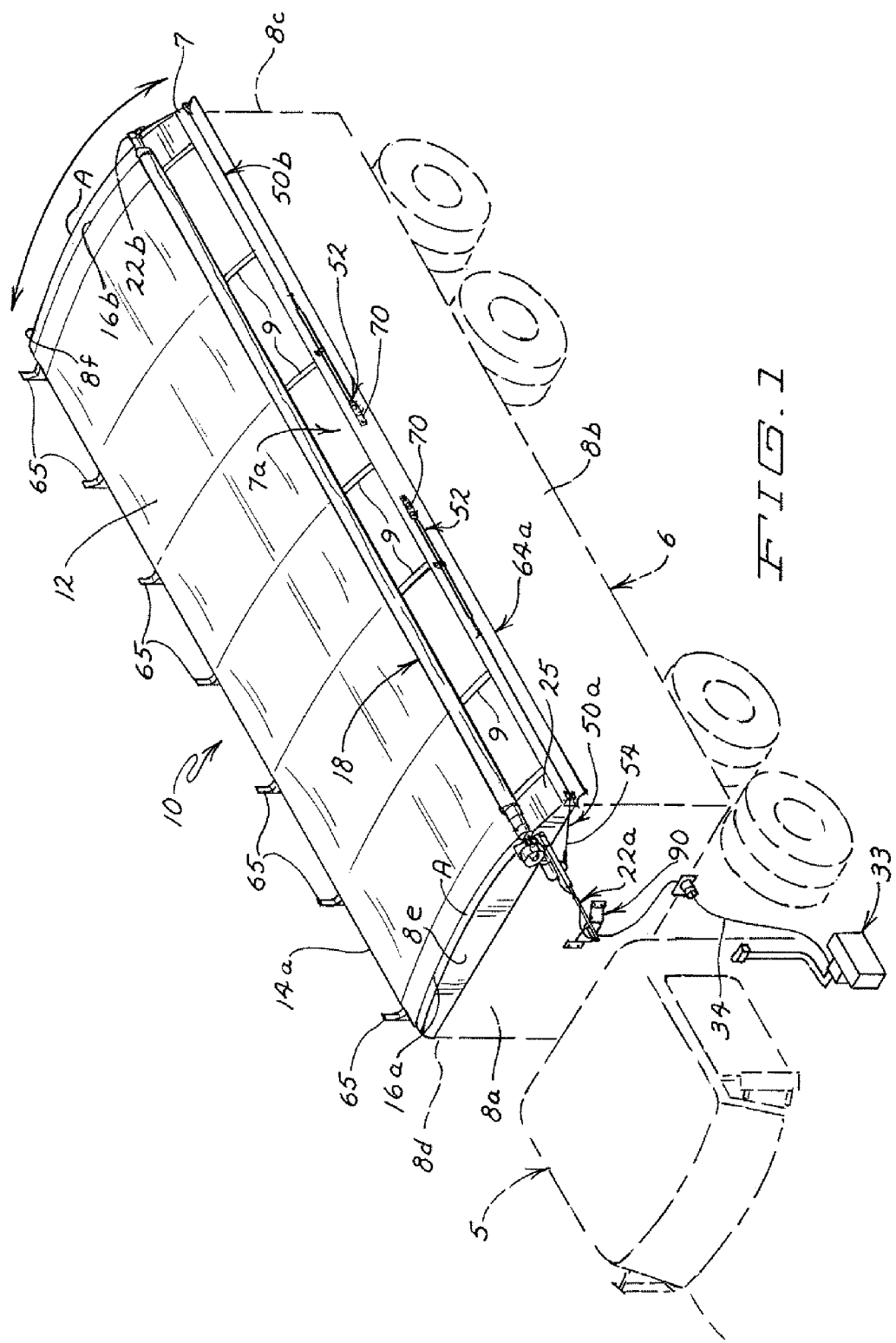

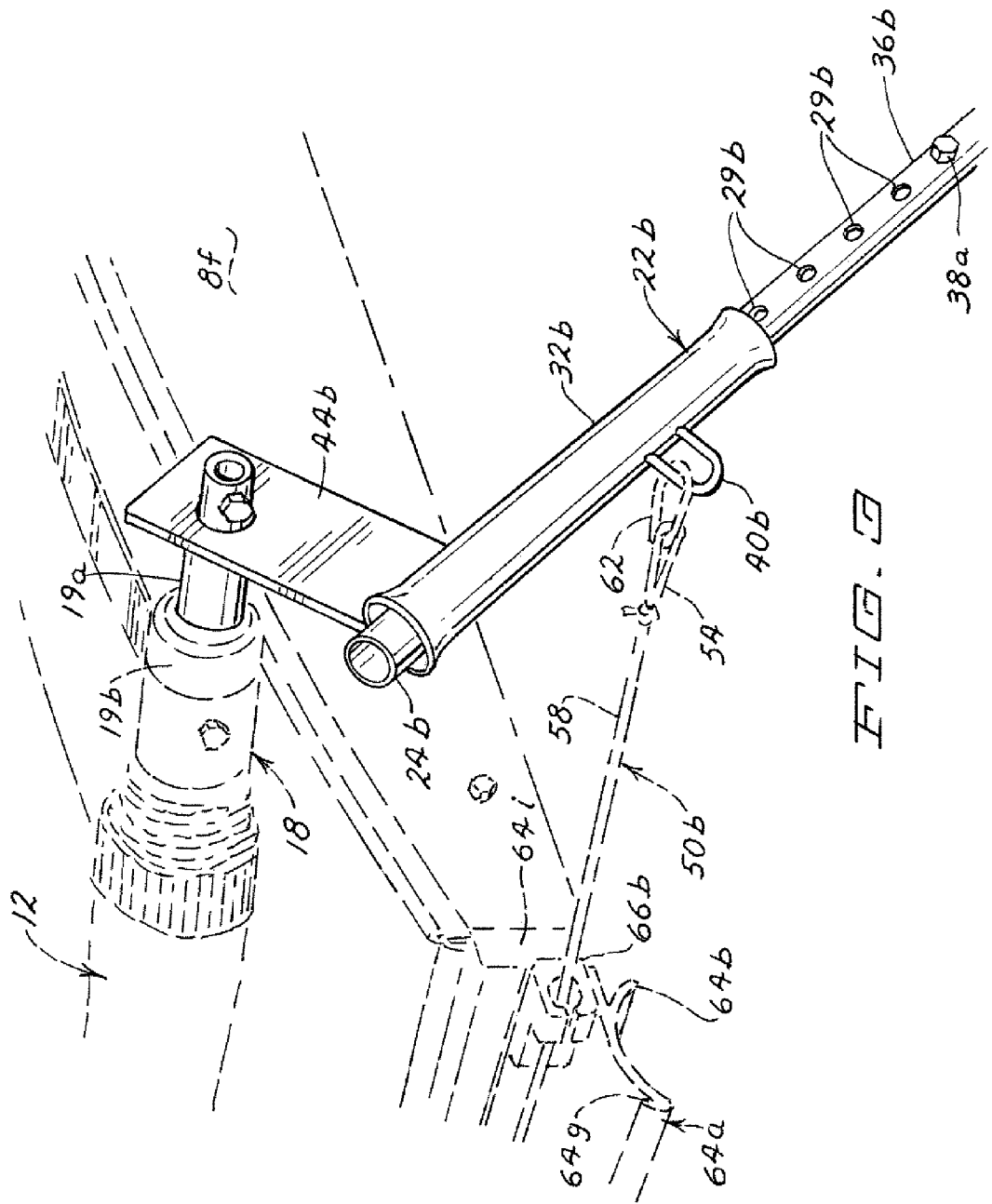

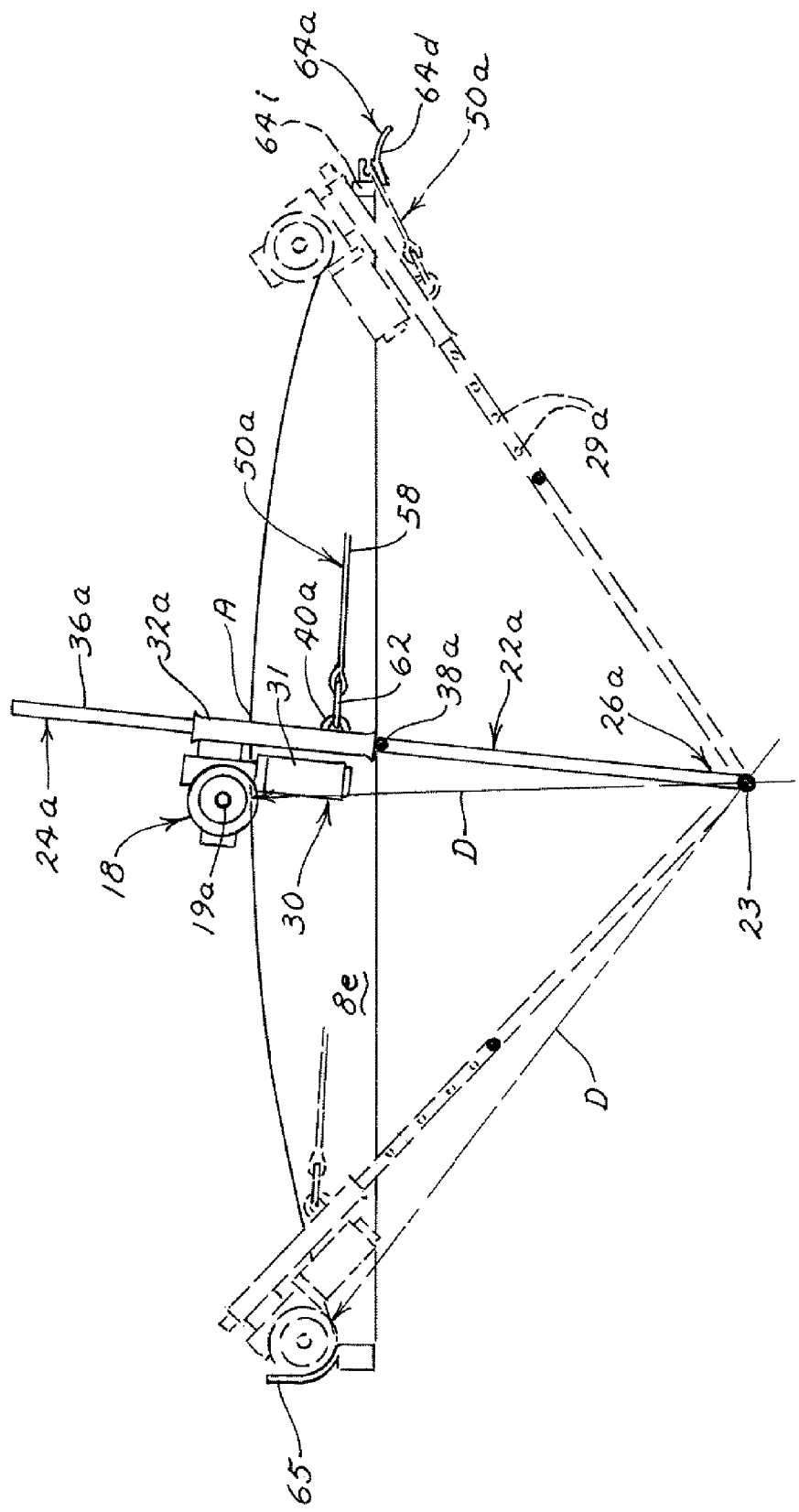

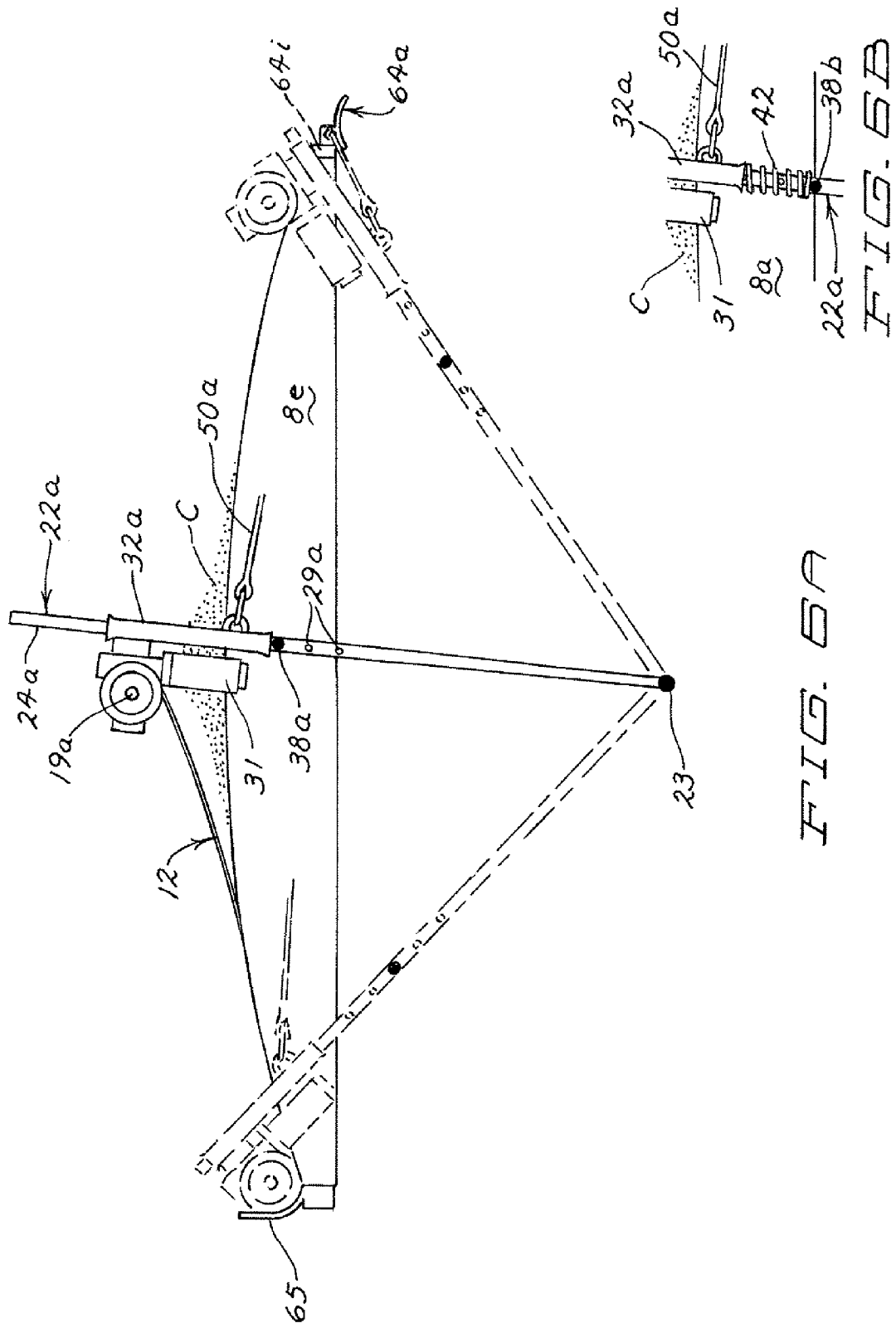

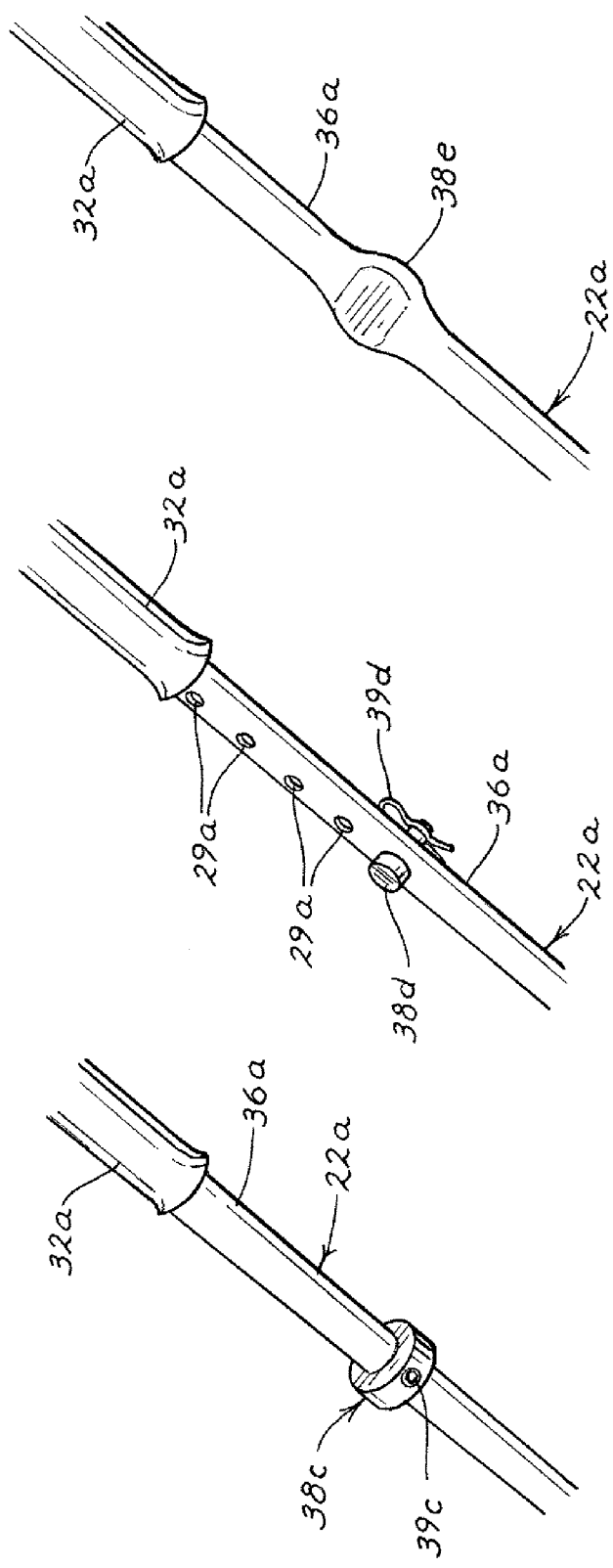

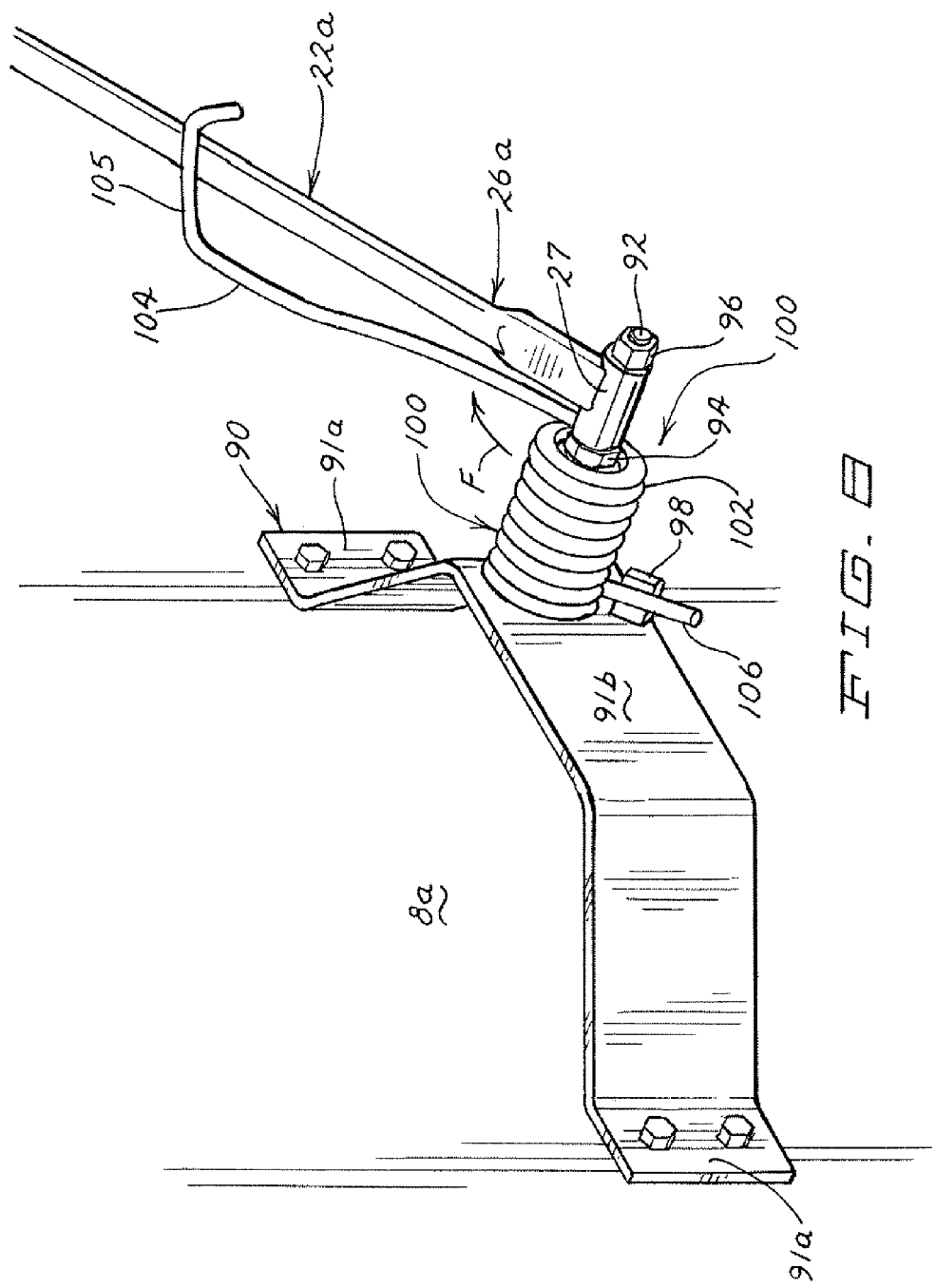

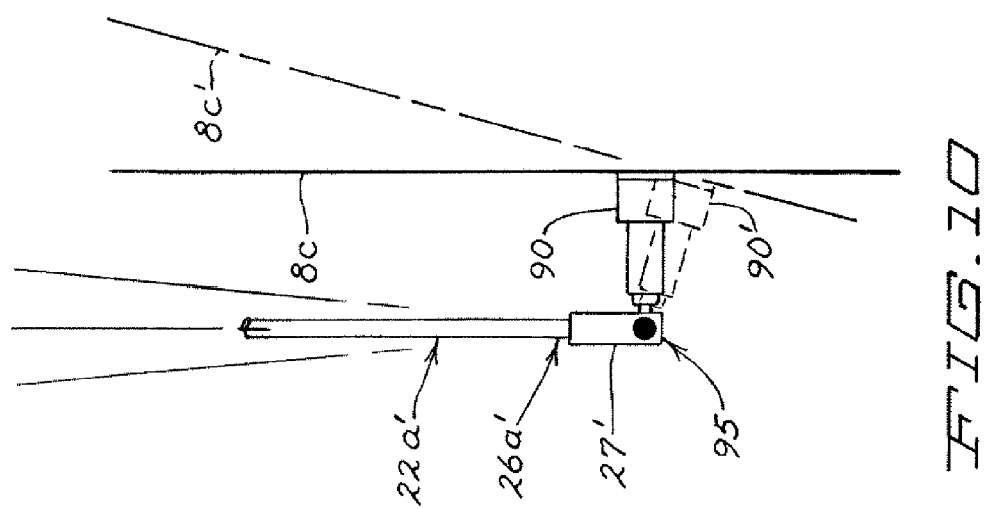
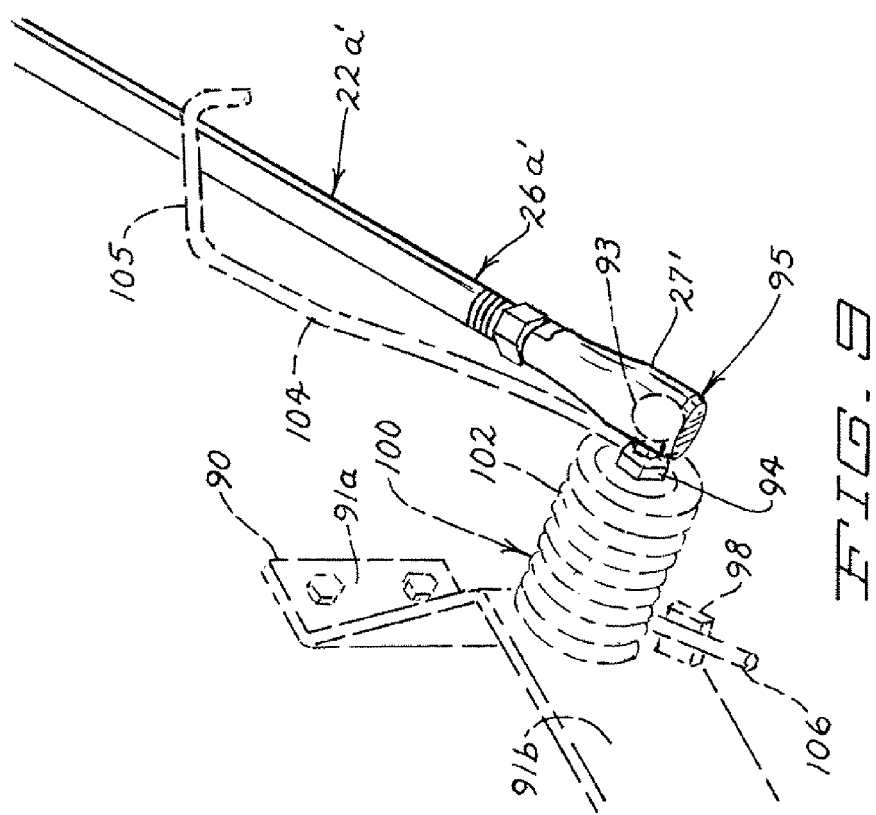

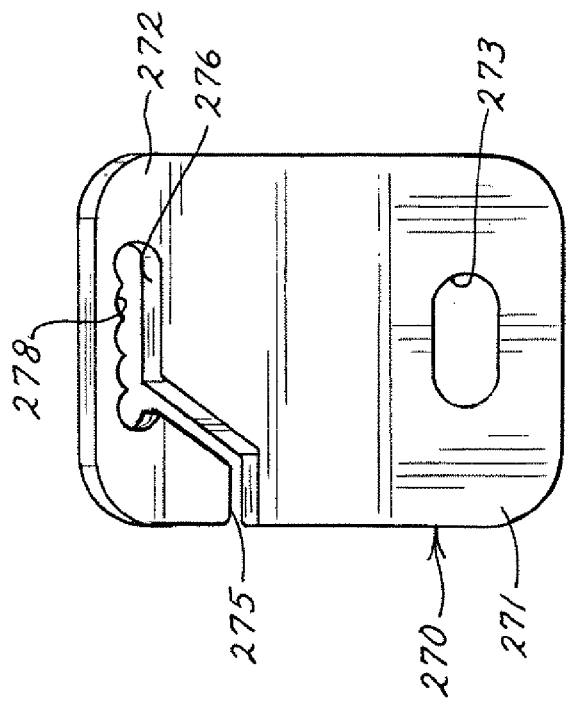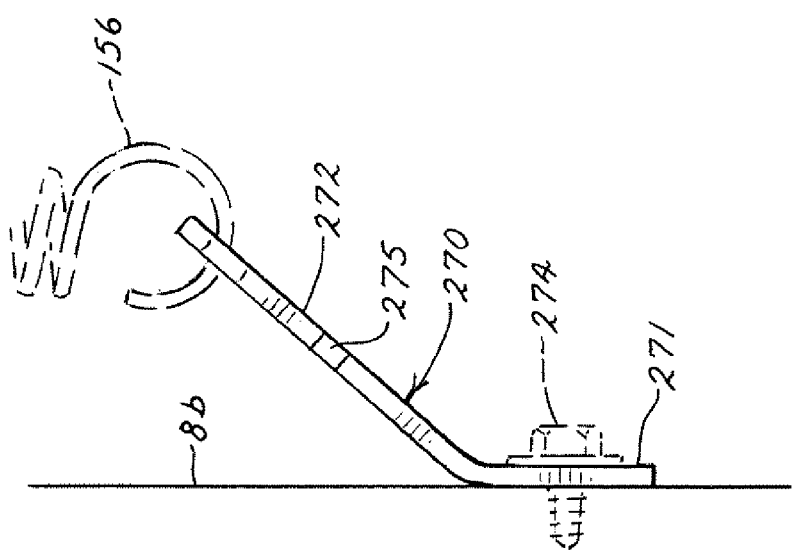

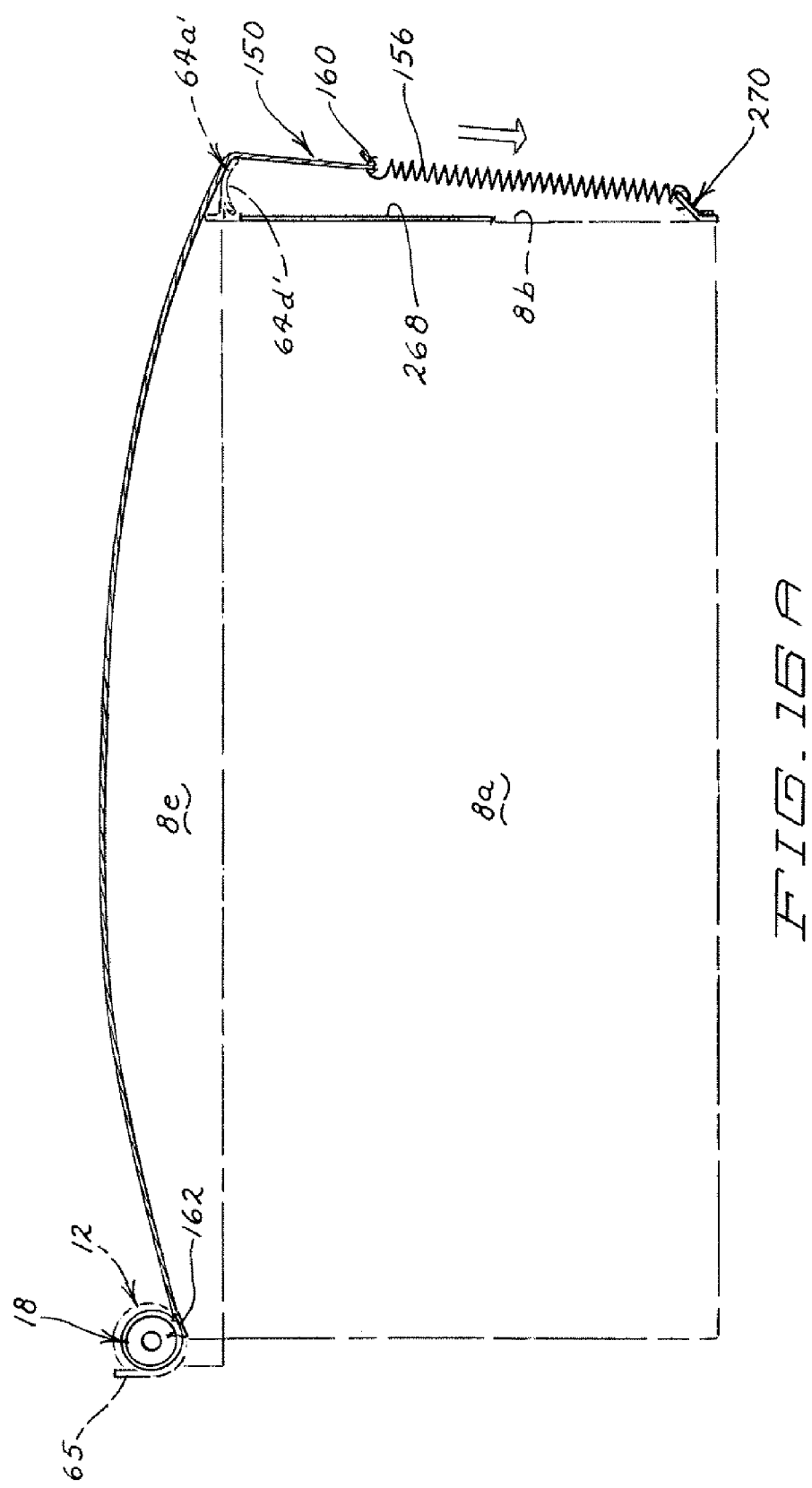

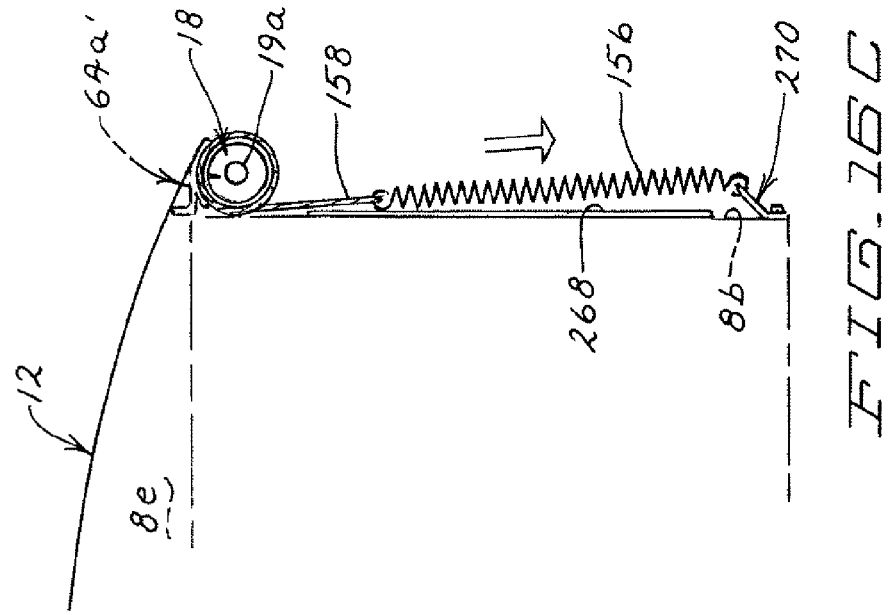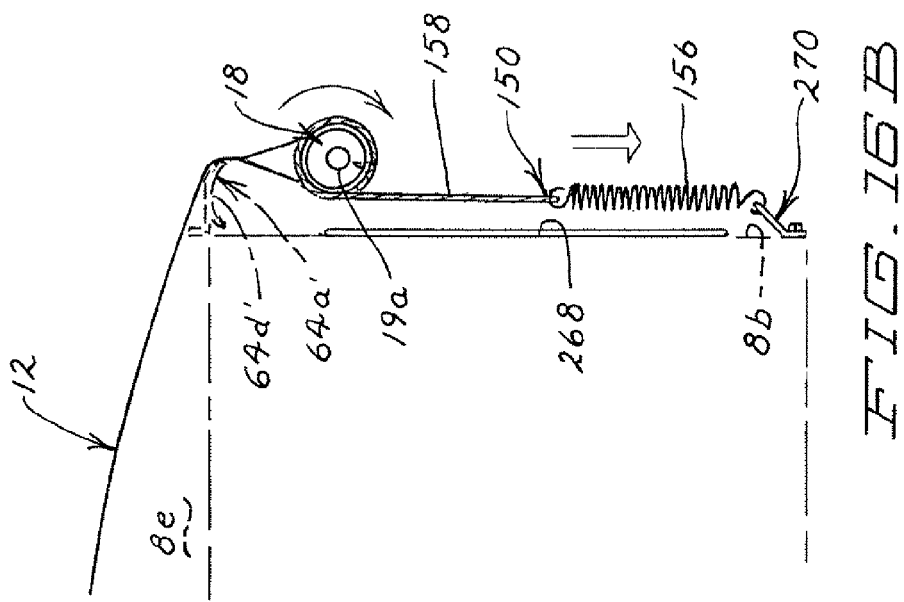

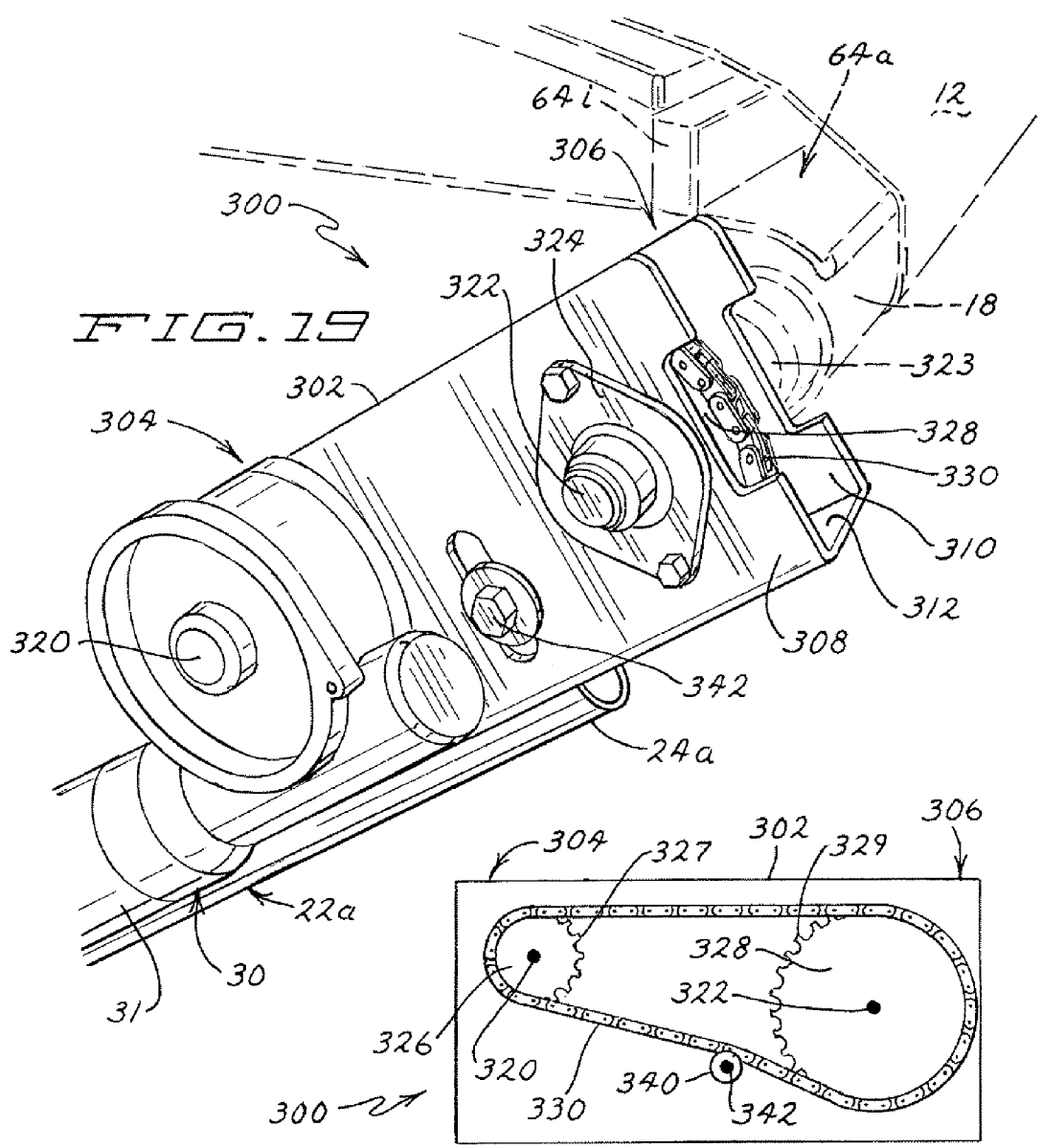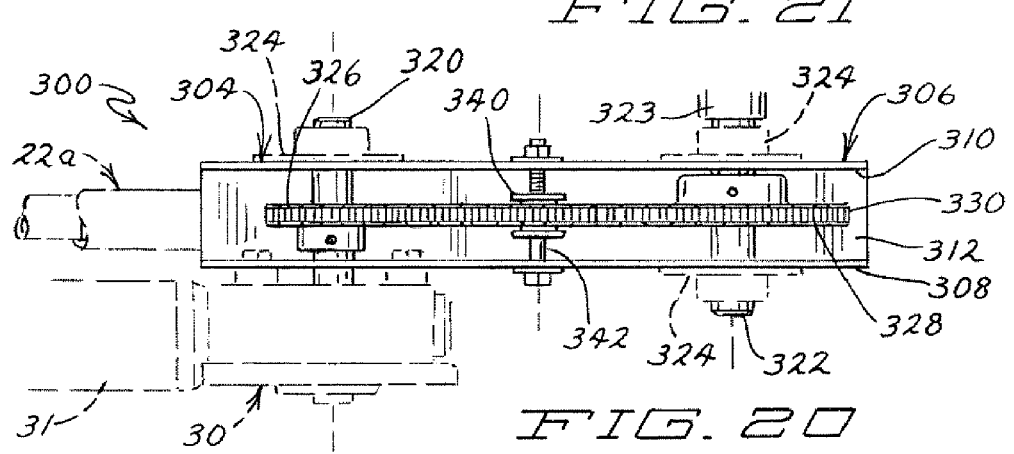

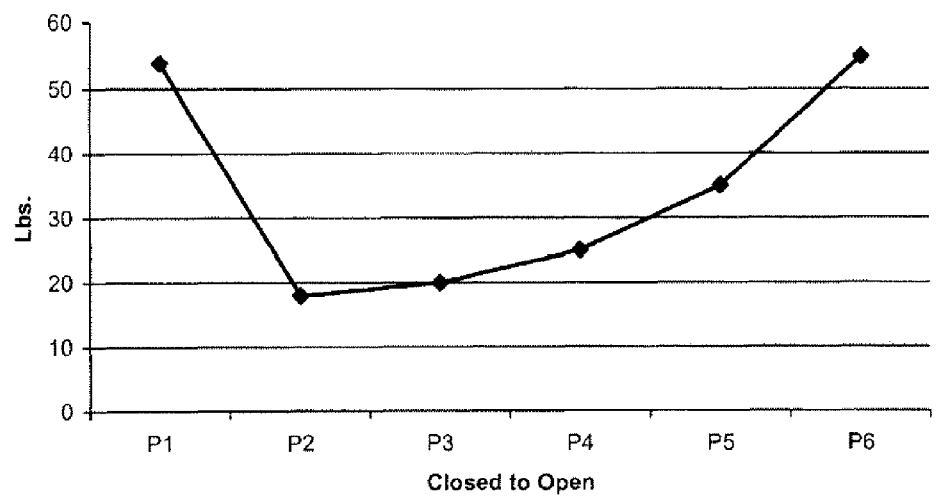
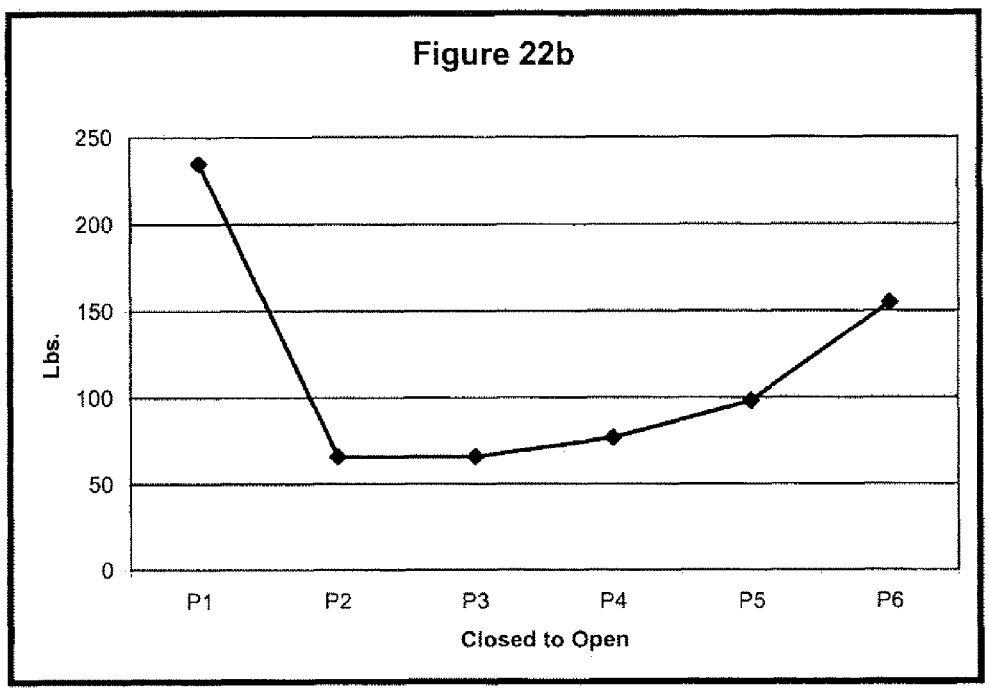

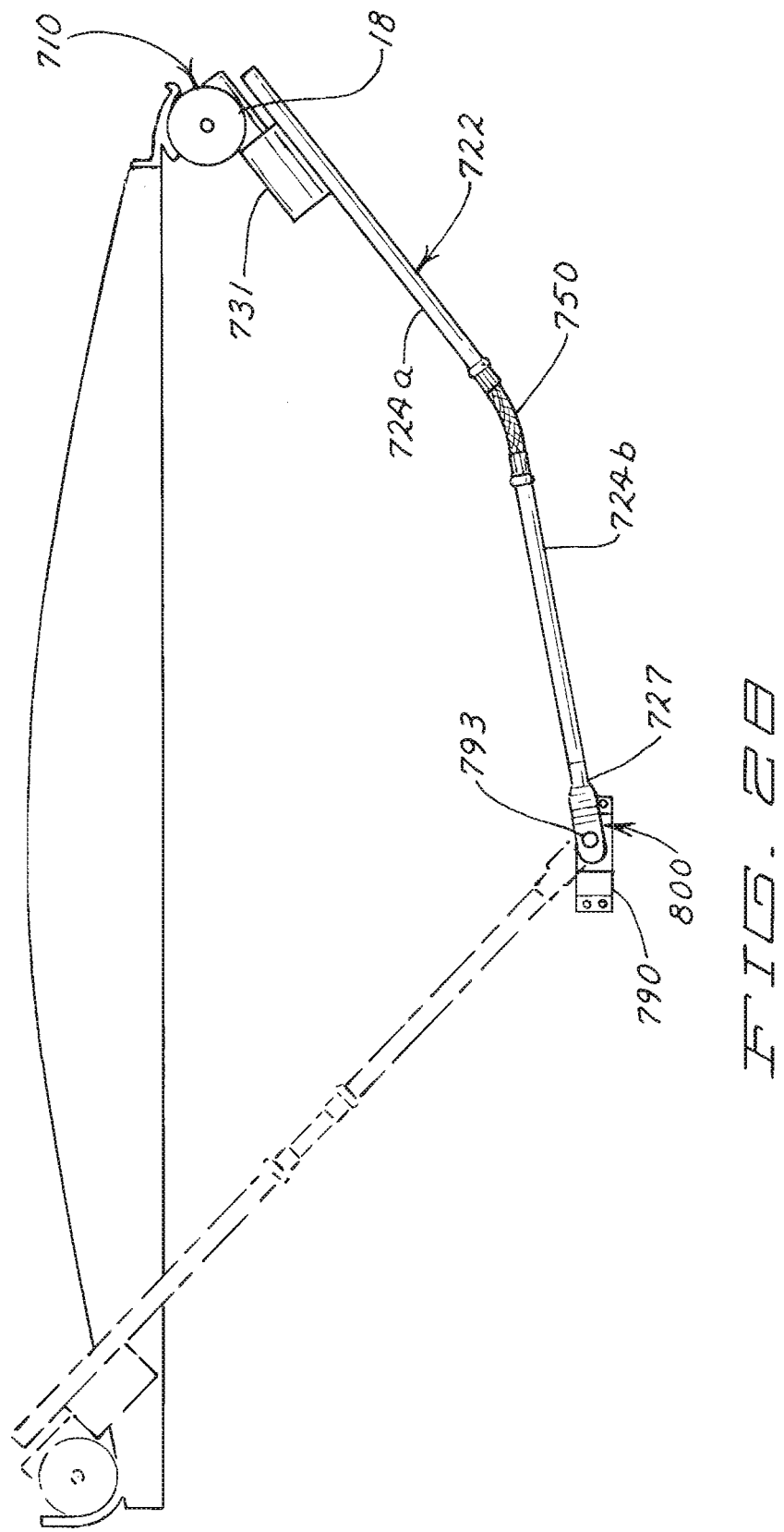

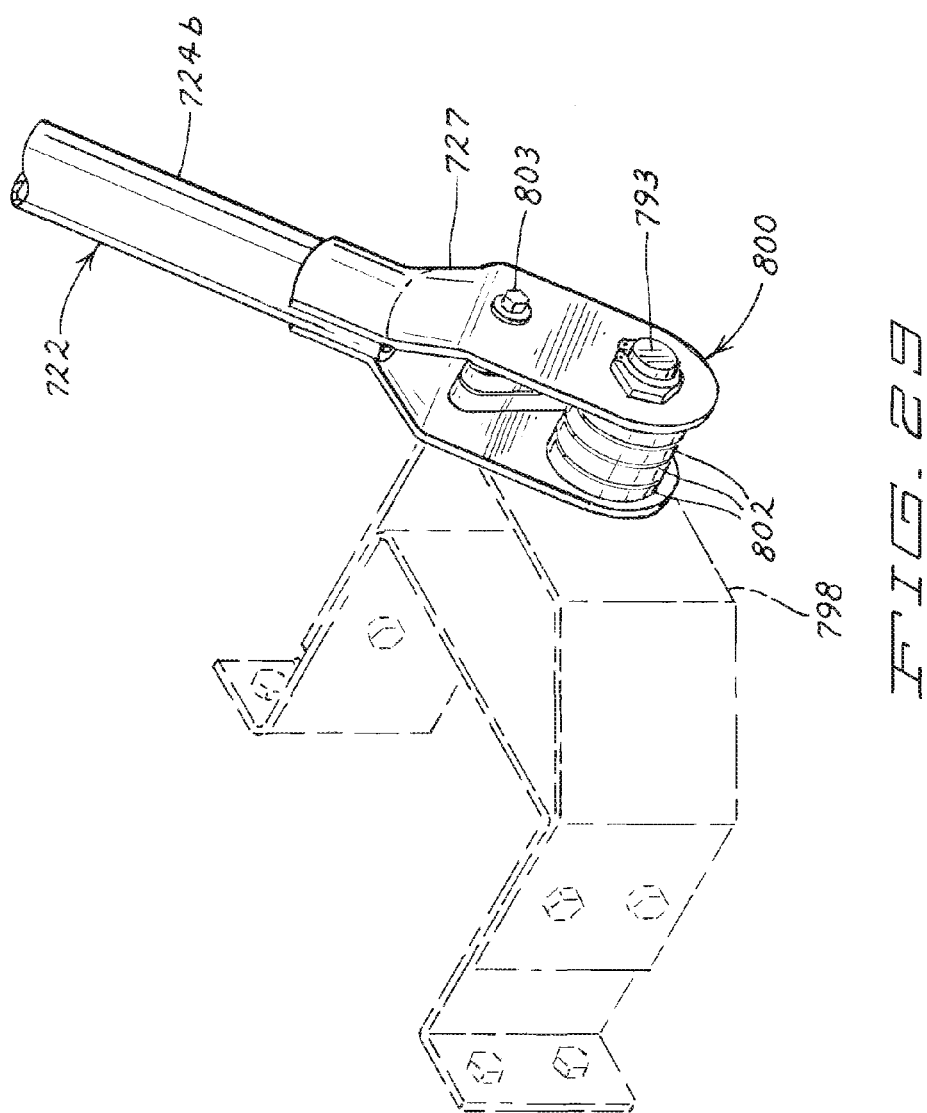

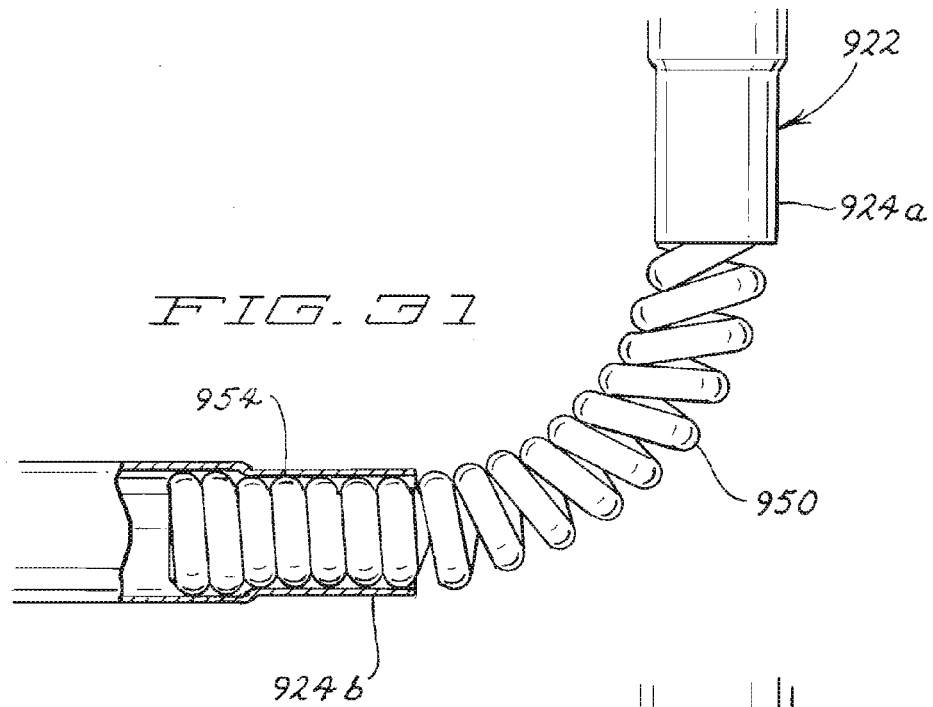
FIG.31
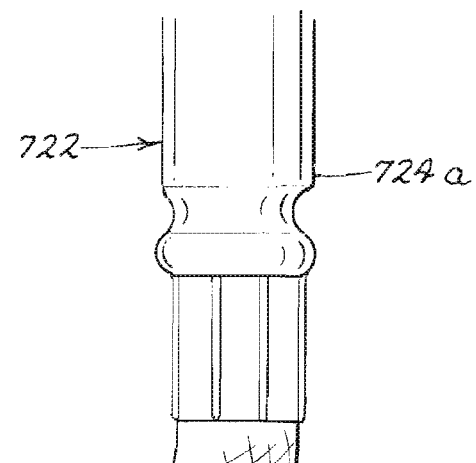
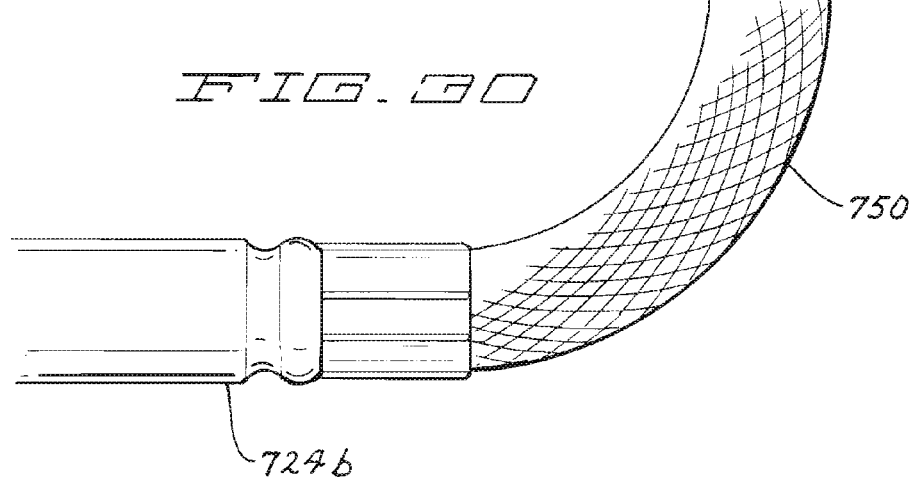
FIG.30

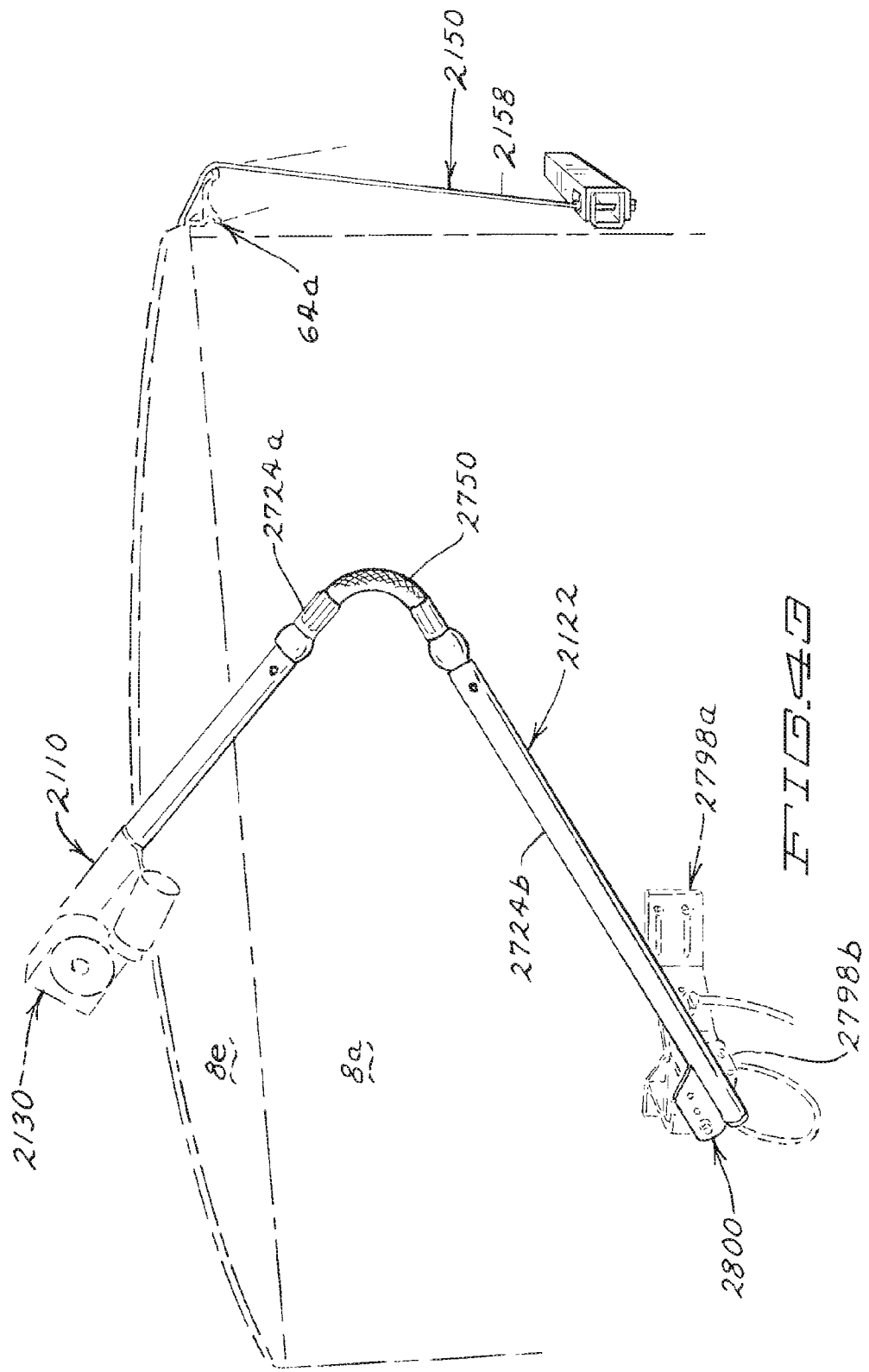

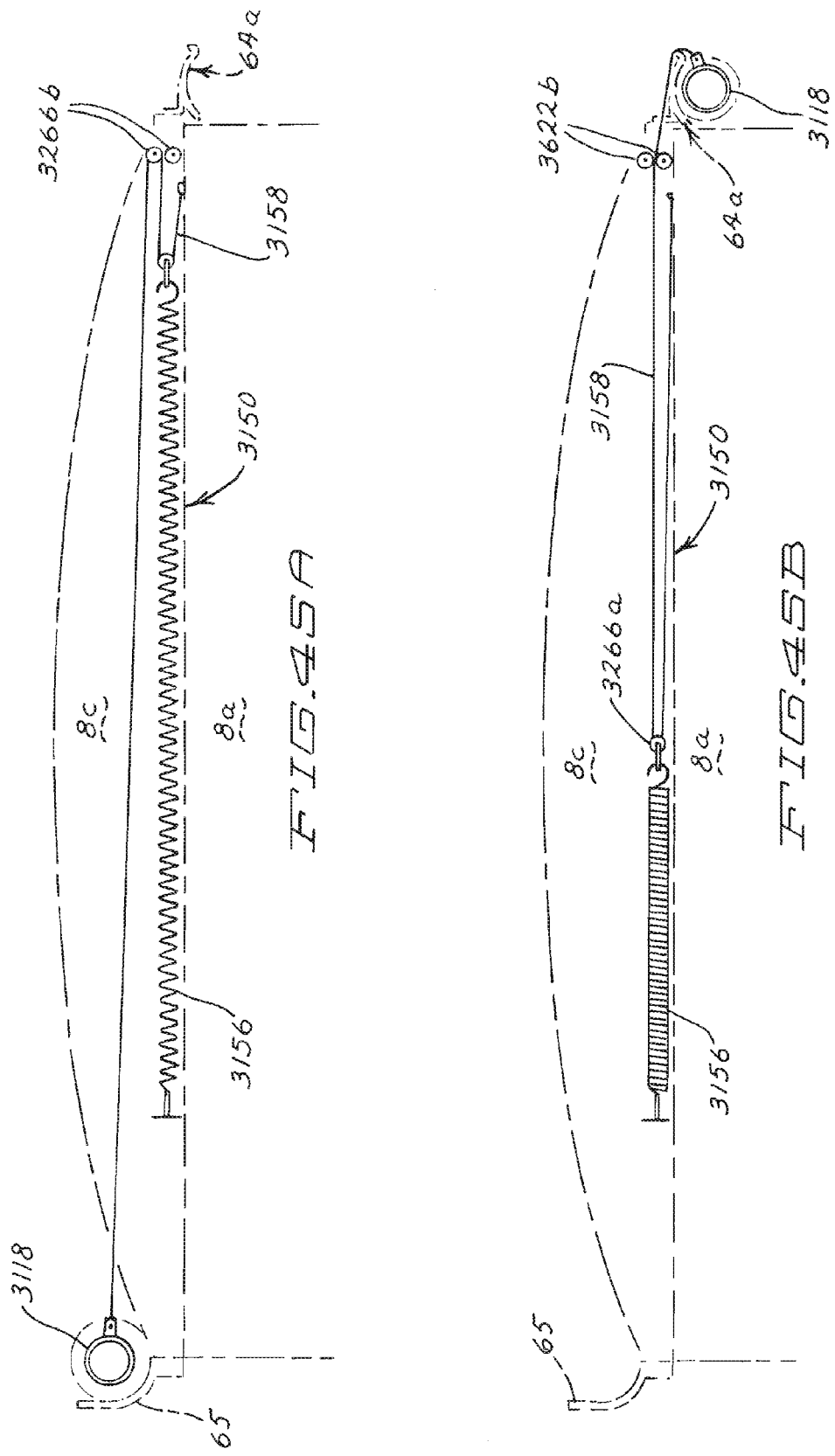

ROLL-UP TARP APPARATUS

RELATED APPLICATIONS

The present application is a continuation-in-part application of U.S. patent application Ser. No. 12/463,049 filed May 8, 2009, which claimed the benefit of both provisional application Ser. No. 61/051,999, filed on May 9, 2008, and provisional application Ser. No. 61/169,185, filed on Apr. 14, 2009, under 35 U.S.C. 119(e); and the present application also claims the benefit of provisional application Ser. No. 61/378,618, filed on Aug. 31, 2010, under 35 U.S.C. 119(e). Each of the aforementioned applications is hereby incorporated herein by reference.

BACKGROUND

1. Field of the Invention

The present invention relates to a roll-up tarp apparatus for an open top truck cargo box or the like.

2. Description of the Related Art

Roll-up tarp apparatuses for truck cargo boxes having an open top are widely utilized in the trucking industry. For example, U.S. Pat. No. 4,505,512 (Schmeichel et al.) discloses a roll-up tarp apparatus for an open truck box or trailer. The roll-up tarp apparatus includes a tarp made from a flexible material. The tarp is secured along one side to the top of the truck box. The other side of the tarp is attached to a roll bar with a plurality of flexible straps. A crank apparatus connected to the roll bar by a U-joint and collar assembly is utilized to roll the tubular member transversely of the truck box opening so as to selectively enclose the truck box with the tarp or uncover the truck box. A plurality of hooks are attached to the side of the truck box opposite of the side to which the tarp is fixedly secured. The hooks retain the roll bar when the tarp is covering the truck box. Other known roll-up tarp assemblies utilize a crank to control the movement of the roll bar and others, such as that of U.S. Pat. No. 4,673,208 (Tsukamoto), utilize a motorized arm that is interconnected to the roll bar.

In motorized roll-up tarp apparatuses, a biasing member can be used to assist the motor in moving the roll bar in an unroll direction. Typically, a bungee cord is interconnected to a collar located on the roll bar and extends from the collar, around a corner of the truck box and along at least part of the length of the truck box where the second end of the bungee cord is attached. As the tarp is rolled-up across the top opening of the truck box, the bungee cord typically stretches and rubs against the corner of the truck box. The constant stretching of the bungee cord along the corner of the truck box is a constant source of abrasion on the cord, thus reducing the life of the bungee cord and increasing the strain on the motor when the cord is at a reduced biasing capacity. As the roll bar rolls up or unrolls the tarp, the arms move the roll bar across a frame that supports the tarp over top opening of the truck box.

Other known roll-up tarp assemblies include springs to bias the arms in the unroll direction. See, for example, U.S. Pat. Nos. 7,188,887 (Schmeichel) and 7,195,304 (Schmeichel).

The present invention addresses limitations and problems associated with the related art.

SUMMARY OF THE INVENTION

The present invention provides a roll-up tarp apparatus for an open truck box or the like. One preferred roll-up tarp apparatus includes a tarp made of a flexible material having first and second longitudinal sides. One longitudinal side can be attached to a longitudinal side of the truck box and the second longitudinal side is connected to an elongated roll bar member of the roll-up tarp apparatus such that when the elongated roll bar member moves across the truck box in one direction, the tarp is un-rolled from the roll bar to cover the opening of the truck box and when the roll bar moves in a second direction, across a middle of the truck box, the tarp is rolled-up and gathered on the elongated roll bar member. In order to facilitate movement of the elongated roll bar member, one preferred roll-up tarp apparatus includes a crank arm having a top end and a bottom end. Optionally, the top end of the arm is connected to the elongated roll bar member to selectively move the roll bar in unroll and roll-up directions to respectively cover and uncover the opening of the truck box. Alternatively, a motorized arm assembly can be used to move the elongated roll bar member. In such a motorized assembly, the bottom end of the arm can be pivotally interconnected to one end of the truck box and may be biased with one or more biasing devices positioned at various locations on the arm. Alternatively, one or more biasing devices can be attached to or incorporated into the arm or the elongated roll bar member at various locations.

In various preferred embodiments, at least one lateral edge of the flexible tarp includes at least one magnet to releasably secure the flexible tarp to the end cap when the flexible tarp is in the secured position. It is preferred that each lateral end includes a plurality of magnets, spaced from each other. Magnets are provided to prevent wear and tear on the flexible tarp due to wind and the like, as well as to secure the cargo within the truck box.

Further, in preferred embodiments, the roll-up tarp assembly includes at least one roll bar biasing member connected to one of the ends of the elongated roll bar member or the arm and, in preferred embodiments, two roll bar biasing members, one connected to each of the respective ends or the respective arms proximate the respective ends. The roll bar biasing member(s) exerts a force on the roll bar member that places a tension on the roll bar member and can urge the movement of the elongated roll bar member in the unroll direction thereby providing assistance when a user is operating the crank arm to rotate the roll bar in the unroll direction. Preferably, the roll bar biasing members each include a cord interconnected to one end of the elongated roll bar member; wherein the cord winds around the elongated roll bar member as the arm directs the elongated roll bar member in the unroll direction. Preferably, each biasing member includes a tensioning element having first and second ends, the first end of the tensioning element is interconnected to the cord and the second end of the tensioning element is interconnected to the second longitudinal side of the truck box and above the latch plate when the roll-up tarp apparatus is operatively secured to the truck box.

Moreover, various preferred roll-up tarp apparatuses are arranged and configured such that the cord of the biasing member winds around the elongated roll bar member such that a substantial portion of the wound-up cord is protected and stowed underneath the latch plate when the elongated roll bar member is in the latched position or, alternatively, the secured position.

These and various other advantages and features of novelty which characterize the present invention are pointed out with particularity in the claims annexed hereto and forming a part hereof. However, for a better understanding of the invention, its advantages and objects obtained by its use, reference should be made to the drawings which form a further part hereof, and to the accompanying descriptive matter, in which there is illustrated and described a preferred embodiment of the present invention.

BRIEF DESCRIPTION OF THE DRAWINGS

In the drawings, in which corresponding reference numerals and letters indicate corresponding parts of the various embodiments throughout the several views, and in which the various embodiments generally differ only in the manner described and/or shown, but otherwise include corresponding parts;

FIG. 1 is a perspective view of a roll-up tarp apparatus 10 operatively secured over a trailer or a truck box 6 of a truck 5 and showing the elongated roll bar member 18 in a partially open position;

FIG. 3 is a partial, perspective view of a rear arm 22b of the roll-up tarp apparatus 10 shown in FIG. 1;

FIG. 5 is a partial, schematic, end view of the truck box 6 illustrating a front arm 22a of FIG. 2A further including a restricting member 38a that can prevent sleeve 32a from moving downwardly past the restricting member 38a;

FIG. 6A is a partial, schematic, end view of the truck box 6, similar to that shown in FIG. 5, wherein cargo C is particulate material such as grain, delivered into the truck box 6 and the restricting member 38a is supporting the elongated roll bar member 18, and thus, the tarp 12, above a mound of the newly delivered cargo C;

FIG. 6B is a partial, schematic view of the arm 22a as shown in FIG. 6A, but showing an alternate restricting member 38b and including a resilient compression spring 42;

FIG. 6C is a partial, schematic view of the arm 22a as shown in FIG. 6A, but showing an alternate restricting member 38c;

FIG. 6D is a partial, schematic view of the arm 22a as shown in FIG. 6A, but showing yet another alternate restricting member 38d;

FIG. 6E is a partial, schematic view of the arm 22a as shown in FIG. 6A, but showing yet another alternate restricting member 38e;

FIG. 7B is a schematic, end view of the elongated roll bar member 18 similar to that shown in FIG. 7A, but as the elongated roll bar member 18 is stored in the secured position and illustrating how the flexible tarp 12 is tensioned downwardly to compress the cargo C down into the truck box 6 as the tarp 12 is tightened on the elongated roll bar member 18 against the latch plate 64a;

FIG. 8 is an enlarged view of a lower arm biasing mechanism 100 of FIG. 1;

FIG. 9 is an alternate embodiment of an arm 22a', the alternate arm 22a' interconnected to the side of the truck box with a ball joint 95 and showing ball 93 of ball joint 95 in phantom;

FIG. 10 is a side, schematic view of the arm 22a' of FIG. 9, illustrating the preferred adjustable range of the arm 22a' allowed by the ball joint 95;

FIG. 14 is a partial side view of an attachment plate 270 for securing a spring 156, which is a portion of the alternate biasing member 150 of FIG. 11 to the first side 8b of the truck box 6;

FIG. 15 is a front view of the attachment plate 270 of FIG. 14;

FIG. 16A is a partial, schematic end view of the biasing member 150 of FIG. 11, biasing the elongated roll bar member 18 toward the closed position when the elongated roll bar member 18 is secured in an open position and the cover 12 is rolled up on the elongated roll bar member 18;

FIG. 16B is a partial, schematic end view of the elongated roll bar member 18 as the elongated roll bar member 18 moves toward the secured position of FIG. 16C;

FIG. 16C is a partial, schematic end view of the elongated roll bar member 18 in the secured position, wherein the flexible tarp 12 is over the truck box 6 so that the truck box opening (7a, not shown) is closed;

FIG. 19 is a partial, perspective, schematic view of arm 22a including a motive source 30 and a converter unit 300 to multiply to force of the motive source;

FIG. 20 is a top plan, schematic view of the converter unit 300 of FIG. 19;

FIG. 21 is a schematic illustration of the internal arrangement of the components or elements of the converter unit 300 of FIG. 19;

FIG. 22a is a first graphical representation of the tension (lbs. of tensioning force) on the cord 158 of one preferred embodiment of the biasing member 150 when the elongated roll bar member 18 is in positions P1 through P6 as illustrated in FIG. 18A;

FIG. 22b is a second graphical representation of the tension (lbs. of tensioning force) on the cord 158 of a second preferred embodiment when the elongated roll bar member 18 is in positions P1 through P6 as illustrated in FIG. 18A;

FIG. 28 is an end view of an alternate roll-up tarp apparatus having a flexible arm 722 and lower biasing member 800;

FIG. 29 is a perspective view of the lower biasing member 800 of FIG. 28;

FIG. 30 is a partial, enlarged view of the flexible arm 722 of FIG. 28;

FIG. 31 is a partial, enlarged view, similar to FIG. 30, but cutaway to show the manner of the connection between the spring 950 and the second member 924b of an alternate flexible arm 922 that can be substituted for the flexible arm 722 of FIG. 30;

FIG. 36 is a partial, exploded view of a bottom end 1124d of rear arm 1122b of FIG. 35, in which, for the sake of clarity, not all of the connecting parts are shown;

FIG. 43 is an alternate roll-up tarp apparatus 2110, largely similar to that shown in FIG. 34, wherein the roll-up tarp apparatus 2110 includes an arm 2722 having upper and lower portions 2724a, 2724b interconnected with a biasing hose 2750, similar to that shown in FIG. 30, but without the spring 950 shown in FIG. 31;

FIG. 45A is a partial, front view of an alternate biasing member 3150 when elongated roll bar member 3118 is in an open position, the biasing member 3150 including a cord 3158 connected to a spring 3156; and FIG. 45B is a partial, front view of the alternate biasing member 3150 of FIG. 45A when the elongated roll bar member 3118 is in a closed position.

DETAILED DESCRIPTION OF THE PREFERRED EMBODIMENTS

Figure 2A:
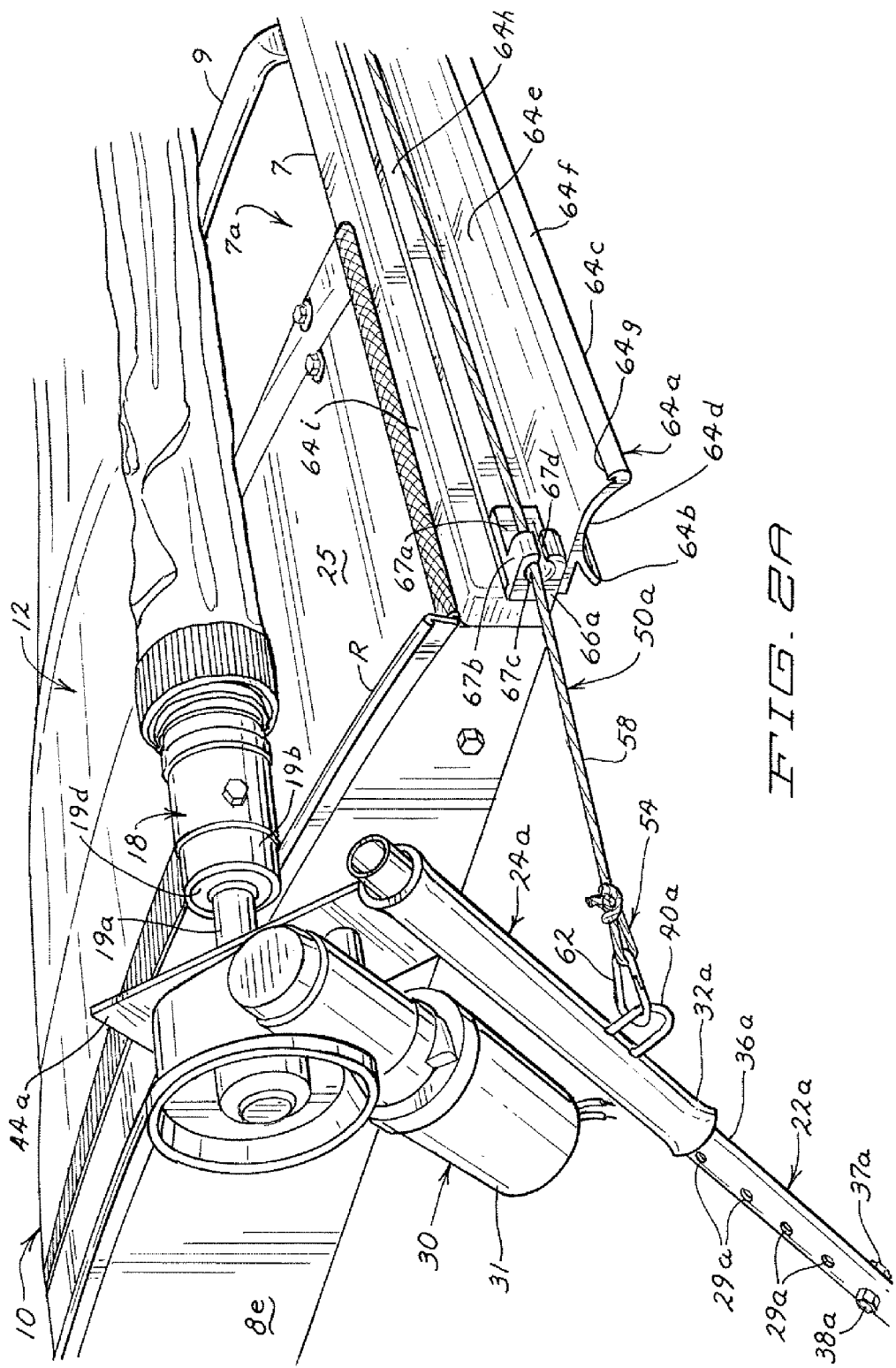
FIG. 2A is an enlarged end view of the front, right corner of the truck box 6 shown in FIG. 1.

FIGS. 1-3 illustrate a truck 5 including a trailer, truck cargo box or truck box 6 having a bed and four sides 8a-d. In preferred embodiments, the truck box 6 can include one or two end caps 8e and 8f secured over a top 7 of the respective ends 8a, 8c of the truck box 6. Each end cap 8e, 8f includes an end edge, opposing side edges, and a curved upper surface 25. End caps have been made of many materials, rolled aluminum, composite, fabric sewn onto a metal of fiberglass frame, fiberglass and even plastic. In preferred embodiments, the respective end caps are made of ferromagnetic material such as sheet metal, preferably sheet steel such galvanized sheet steel, ferromagnetic stainless steel and the like. In alternate embodiments, the front of face of the end cap will be made of aluminum and the upper surface will be made of galvanized sheet steel. It will be appreciated the galvanized sheet steel will wear better than aluminum when operators climb over the top of the end caps as they are known to do and the aluminum arguably has a better appearance, but doesn't wear as well as the sheet steel. Note that the top 7 of the truck box 6, which defines a top opening 7a, will be somewhat foreshortened by the use of one or more end caps 8e, 8f. Although in some cases, the roll tarp apparatus of the present invention will not include end caps, because they are sometimes provided by the truck manufacturer or have been provided with a previously used roll tarp apparatus, the present invention can include end caps provide for each end of the truck box 6. Similarly, support bows 9, if required and provided, can be provided by the manufacturer of the truck box 6 or alternately provided as a part of the alternate roll-up tarp apparatus. One preferred roll-up tarp apparatus 10, operatively secured to a truck box 6, is shown in FIG. 1. The roll-up tarp apparatus 10 includes a flexible tarp 12 that can be drawn over the top opening 7*a* to cover cargo C (see also, FIGS. 6A, 6B) within the truck box 6, an elongated roll bar member 18, a crank arm positioned at one of the respective ends 8*a*, 8*c* of the truck box 6. The crank arm allows a user to selectively control the position of the elongated roll bar member 18, as it is rolling-up (furling) or unrolling (unfurling) the tarp 12.

The preferred flexible tarp 12 is made of vinyl coated polyester preferably having a weight of from about 10-22 oz/yd$^2$, preferably about 18 oz/yd$^2$, although lighter or heavier material could be used. The flexible tarp 12 includes two longitudinal edges 14*a*, 14*b* and to lateral edges 16*a*, 16*b*. One longitudinal edge 14*a* of the flexible tarp 12 is attached to one respective side 8*d* of the truck box 6. The other longitudinal edge 14*b* of the flexible tarp 12 is secured to the elongated roll bar member 18, which is interconnected to an arm 22*a* and, preferably, a second arm that is pivotally attached to one respective end or lateral ends 8*c* of the truck box 6.

Now also referring to FIGS. 1-2B, 5-6, 7*a*-7B, 11, 13B and 16A-18A. The roll-up tarp apparatus 10 preferably further includes a latch plate or rail 64*a*, 64*a*' and a plurality of posts or stops 65. The latch plate 64*a*, 64*a*' is preferably removably positioned along one side 8*b* of the truck box 6, while the support posts 65 are positioned in a spaced apart relation along the opposite side 8*d*. The latch plate 64*a*, 64*a*' includes an innermost edge with a vertically oriented attachment flange 64*h*, 64*h*' and a downwardly facing curved or arcuate underside surface 64*d*, 64*d*' that is configured and arranged to receive the elongated roll bar member 18 when the roll bar member is in the latched and secured position. The downwardly facing curved or arcuate underside surface 64*d*, 64*d*' includes an inner longitudinal edge 64*b*, 64*b*' and an outer longitudinal edge 64*c*, 64*c*'. The vertical flange 64*h*, 64*h*' can further be attached to a spacer 64*i*, 64*i*' that serves to space the inner longitudinal edge 64*b*, 64*b*' of the downwardly facing curved underside surface 64*d*, 64*d*' away from the side 8*b* of the truck box 6, preferably by about ¼ inch to about 1¼ inch. As best illustrated in FIGS. 2A and 11, the preferred latch plate 64*a*, 64*a*' is arranged and configured such that the elongated roll bar member 18 including the wound up tarp 12 is spaced away from and out of contact the side of the truck box 8*b* by spacer 64*i*, 64*i*' when the elongated roll bar member is underneath the latch plate 64*a*, 64*a*' either in a stored position or otherwise.

Figure 11:
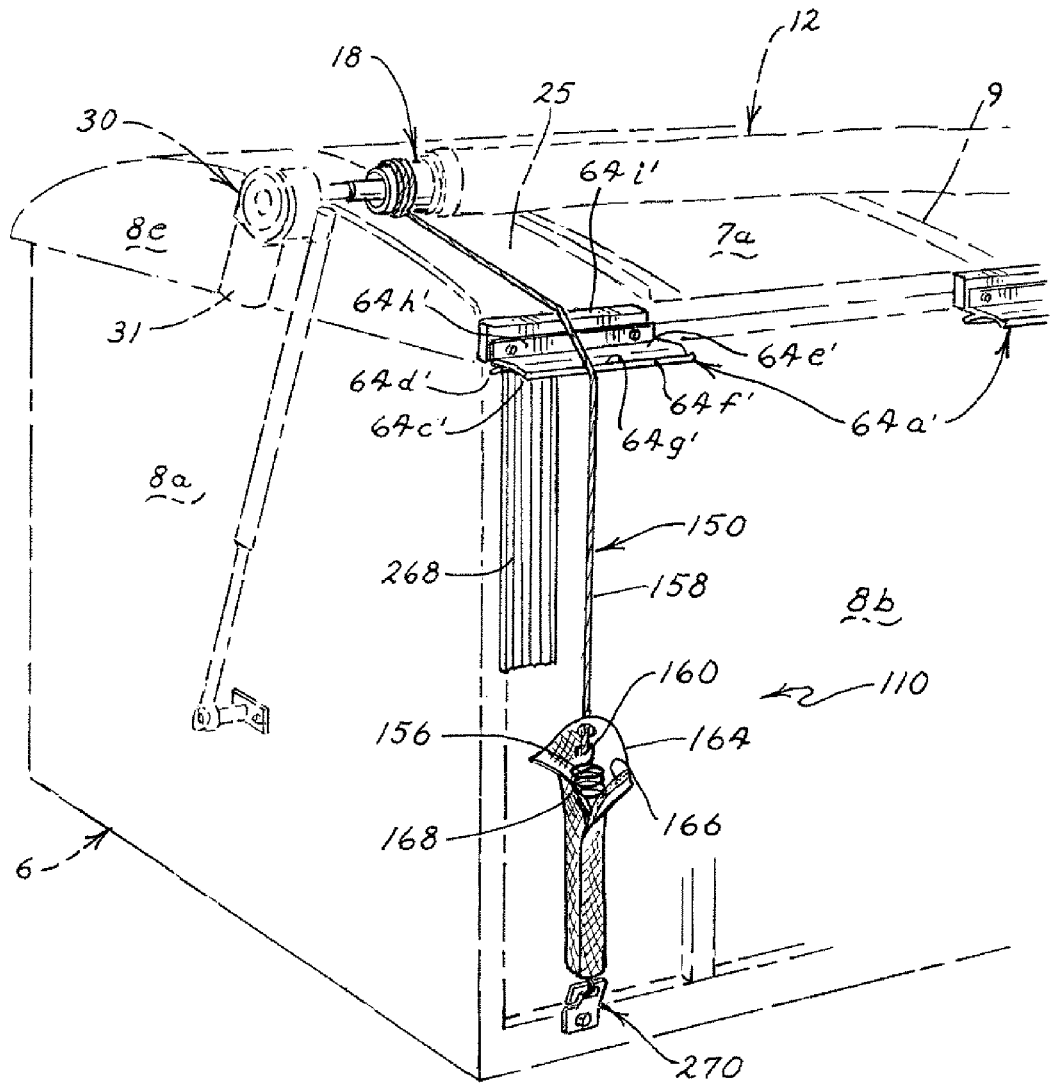
FIG. 11 is a partial perspective view of an alternate biasing member 150 connected to one end of the elongated roll bar member 18 of an alternate roll-up tarp apparatus similar to that shown in FIG. 1; but portions of which are shown in phantom.

As generally illustrated in FIG. 11 and further discussed below, the latch plate 64*a*' need not be a unitary structure. The latch plate 64*a*' can be segmented and include a plurality of spaced apart sections of any effective length spanning the length of the truck box 6. For example, the latch plate 64*a*' can include three sections, one at each end of the truck box 6 and one in the middle. This generally prevents unnecessary wear damage to the side of the truck box. Preferably, the latch plate 64*a*' is provided with spacer 64*i*' that positions the inner longitudinal edge 64*b*' of the downwardly facing receiving underside surface 64*d*' of the latch plate away from the side of the truck box 8*b*; preferably by about ¼ inch.

Further preferred latch plates 64*a*, 64*a*' include an outer longitudinal edge 64*c*, 64*c*' with a top surface 64*e*, 64*e*' and a rounded surface 64*f*, 64*f*' over which both the flexible tarp 12 and the non-elastic cord 58, 158 can be drawn. Such a rounded surface provides a controlled surface with a smooth transition that can reduce wear as compared to when the flexible tarp 12 and cord 58 are drawn over the comparatively sharp, angled edge of the truck box 6, which can be rough and abrasive. Optionally, the rounded surface 64*f*, 64*f*' may include an upwardly facing longitudinal channel 64*g*, 64*g*' that is configured and arranged to receive moisture and direct it toward the ends of the latch plate 64*a*, 64*a*'.

The truck box 6 will preferably include support bars or ribs 9 that span the respective longitudinal sides 8*b*, 8*d* of the truck box 6 and which provide support for the tarp 12 above the top opening 7*a* of truck box 6. Moreover, each end cap 8*e*, 8*f* is attachable to one end 8*a*, 8*c* of a truck cargo box 6 such that their respective edges meet, and their respective curved upper surfaces 25 are able to support a portion of a flexible tarp 12 of a roll-up tarp assembly 10 when the tarp assembly 10 is in a secured position or when the tarp assembly is moving between secured and open positions.

Figure 2B:
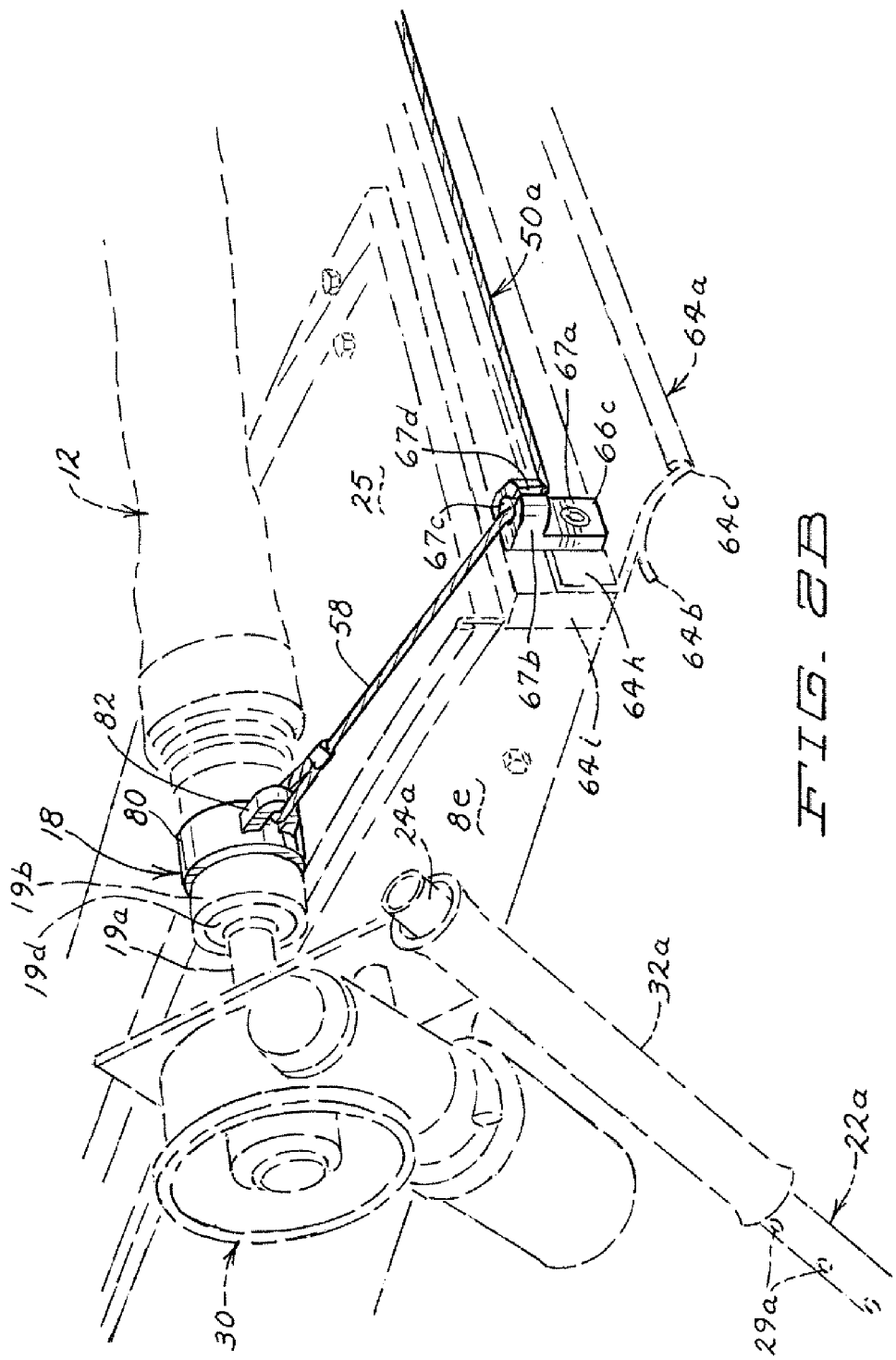
FIG. 2B is a view similar to that of FIG. 2A, but illustrating an alternate method of securing the upper biasing member 50a to the elongated roll bar member 18 with a rotatable collar 80.

Referring now also to FIGS. 5 and 6A, it is noted that one preferred roll-up tarp apparatus embodiment will include two arms 22*a*, 22*b*, one at each end of the truck box 6. Each of the arms 22*a*, 22*b* will preferably include a shaft 36*a*, 36*b* and a sleeve 32*a*, 32*b*. The shafts 36*a*, 36*b* are pivotally connected to respective ends 8*a*, 8*c* of the truck box 6 at a point of attachment 23 (see, FIG. 5, only one point of attachment 23 for arm 22*a* is illustrated, however, it will be understood that the second arm 22*b* will be attached to the truck box 6 in a similar manner). Generally, each sleeve 32*a*, 32*b* is able to freely slide upwardly and downwardly on top ends 24*a*, 24*b* of respective arm shafts 36*a*, 36*b* so that the roll bar 18, which is connected to the sleeve, is able to follow the general contour of the end plate 8*e* as opposed to following an arc described by the top end 24*a* of the arm 22*a*, 22*b*. In other words, the interaction of the shaft 36*a*, 36*b* and sleeve arm 22*a*, 22*b* are able to accommodate a varying or variable distance D, wherein the distance can be measured from the center of the pivotal point of attachment 23 and a variable point of contact. The point of contact can be, for example, established by the elongated roll bar member 18 as it traverses over the end cap 8*e* (in general terms, over the top 7 of the truck box 6, which is generally the resting place for the roll bar 18 when the tarp 12 is mostly unrolled as shown in FIGS. 2A, 2B and 3). The point of contact can also be established by the bottom-most portion of the flexible tarp 12 as the tarp is rolled-up (or furled) on the elongated roll bar member 18 and contacts the upper surface 25 of the respective end cap 8*e*, 8*f*, which is interposed between the top 7 of the truck box 6. It will be appreciated that this variable distance D changes both: 1) as a distance between a variable location on the top 7 of the truck box 6 or the upper surface 25 of the respective end cap 8*e*, 8*f* and the respective center point of pivotal attachment 23 varies through a turn radius of the respective arms 22*a*, 22*b*; and 2) as the tarp 12 is rolled-up on the elongated roll bar member 18 creating varying thickness of gathered tarp 12 on the elongated roll bar member 18. For instance, in the embodiment shown in FIGS. 1-3 and schematically in FIGS. 5 and 6A, the top opening 7*a* is almost completely uncovered when the arms 22*a*, 22*b* are over as far as they can go to the left (as shown schematically in phantom in FIG. 5). In this situation, the tarp 12 (not shown for clarity in this Figure) will be almost completely rolled-up on the elongated roll bar member 18 and the gathered tarp 12 (see also, FIGS. 2A and 3), which is rolled up on the elongated roll bar member 18 will rest against the respective support posts 65 and on the upper surface 25 of the respective end caps 8*e*, 8*f*.

It will be further appreciated, that the thickness of the gathered tarp 12 (see also, FIGS. 2A and 3) on the roll bar member 18 will not lift the roll bar 18 from the upper surface 25 of the respective end caps 8*e*, 8*f* on each end of the truck box 6, when the roll bar member 18 is close to the edge of the truck box when the tarp is nearly covering the entire top opening 7a. In alternate embodiments, where the end caps 8e, 8f are lower than the bows, support bars or ribs 9 that are provided with the various truck box 6 manufactured in North America, the bottom portion of the rolled-up tarp 12 (see also, FIG. 2A) may rest on the bows 9, raising the roll bar member 18 the distance of the thickness of the tarp gathered on the roll bar as it rests on the bows 9 proximate the respective ends 8a, 8c of the truck box 6 and thereby separating the roll bar member that further distance from the respective points of attachment 23 and raising the rolled-up tarp above the upper surface 25 of the respective end caps 8e, 8f for a short interval during the respective roll-up and unroll processes. Preferably, the bows 9 are positioned slightly higher than the end caps 25 to further tension and spread the tarp 12 across the truck box opening 7a. It will also be appreciated that as the roll bar member 18 moves over the top opening 7a in the direction of the other longitudinal side 8b of the truck box 6, and the tarp 12 is being unrolled in order to cover the top opening 7a, the space between the roll bar member 18 and upper surface 25 of the respective end caps 8e, 8f will gradually diminish. Because the arms 22a, 22b are also turning through a path (not designated) that may differ from a contour or radius R of the end caps 8e, 8f of the truck box 6 or the upper surface 25 of the end caps 8e, 8f interposed between the top opening 7a and the roll bar member 18, the variable distance D is also subject to change.

In any case, it will be appreciated that the respective sleeves 32a, 32b make upward or downward adjustments with respect to the respective shafts 36a, 36b to accommodate these variations in space and distance, so that the roll bar member 18 can rotate from left to right away from the support posts 65, toward the latch plate 64a, 64a', in an unroll direction, shown in phantom in FIG. 5 or rotate from right to left away from the latch plate 64a, 64a' and toward the support posts 65 as the tarp 12 is rolled-up or furled on the roll bar member 18 and the top opening 7a is uncovered and open (see also, FIG. 5).

In the other preferred embodiments of the present invention, selective movement of one arm 22a is actuated by a motive source 30 having a motor 31. In such embodiments, the motor 31 will preferably be either an electric motor or a hydraulic motor, although other suitable motors may also be used. In the most preferred embodiments, the motor 31 will be a Super Winch Power Drive (Model No. 719627 from Super Winch, Inc. of Putnam, Conn.), which includes a worm gear (not shown) that drives the turning of the elongated roll bar member 18. As shown in FIG. 2A, the motor 31 can be attached to the sleeve 32a and connected to an electrical power source 33, as shown in FIG. 1, by electrical conduit 34. It will be appreciated that other power sources may also be used including, without limit, a truck battery (not shown) or a power take off (PTO) (not shown). Although it is within the scope of the present invention to provide a second motive source (not shown) to actuate selective movement of the roll bar member 18 from the back end 8c of the truck box 6, in coordination with the selective movement of the roll bar member 18 actuated by the motor 31 associated with the arm 22a on the front end of the truck box 6, it is believed that a second motive source is unnecessary to provide the necessary actuating assistance needed to either: 1) roll-up the tarp 12 as the roll bar member 18 moves in the roll-up direction; or 2) unroll the tarp 12 as the roll bar member 18 moves in the unroll direction and the tarp 12 is unrolled to cover the top opening 7a. It will be appreciated that the selective movement of the roll bar member 18, in either the unroll or the roll-up direction, may be actuated by a hand crank of a type that is well known in the art, including that disclosed in U.S. Pat. Nos. 4,505,512; 5,823,067 and 6,135,534, the disclosures of which are hereby incorporated herein by reference (see also, FIG. 23). One of the great advantages of using a worm gear type motor, is the screw portion of the worm gear acts as a stop or lock against any un-rolling of the roll bar member when the roll bar member is motionless in any position, especially in the fully closed position, when the roll bar member is secured up against the latch plate 64a. In that position, it is especially important to maintain tension on the roll bar member 18 so that it does not loosen up during transit and begin to flop around and bang against either the latch plate or the side of the truck box 6. The worm gear type motor, which is preferred, significantly reduces the likelihood that the roll bar member 18 will unroll and loosen with respect to its engagement with the latch plate 64a.

It will be appreciated that the selective movement of the roll bar member 18, in either the unroll or the roll-up direction, is can be actuated by a hand crank of a type that is well known in the art, including that disclosed in U.S. Pat. Nos. 4,505,512; 5,823,067 and 6,135,534, the disclosures of which are hereby incorporated herein by reference (see also, FIG. 23).

Figure 4:
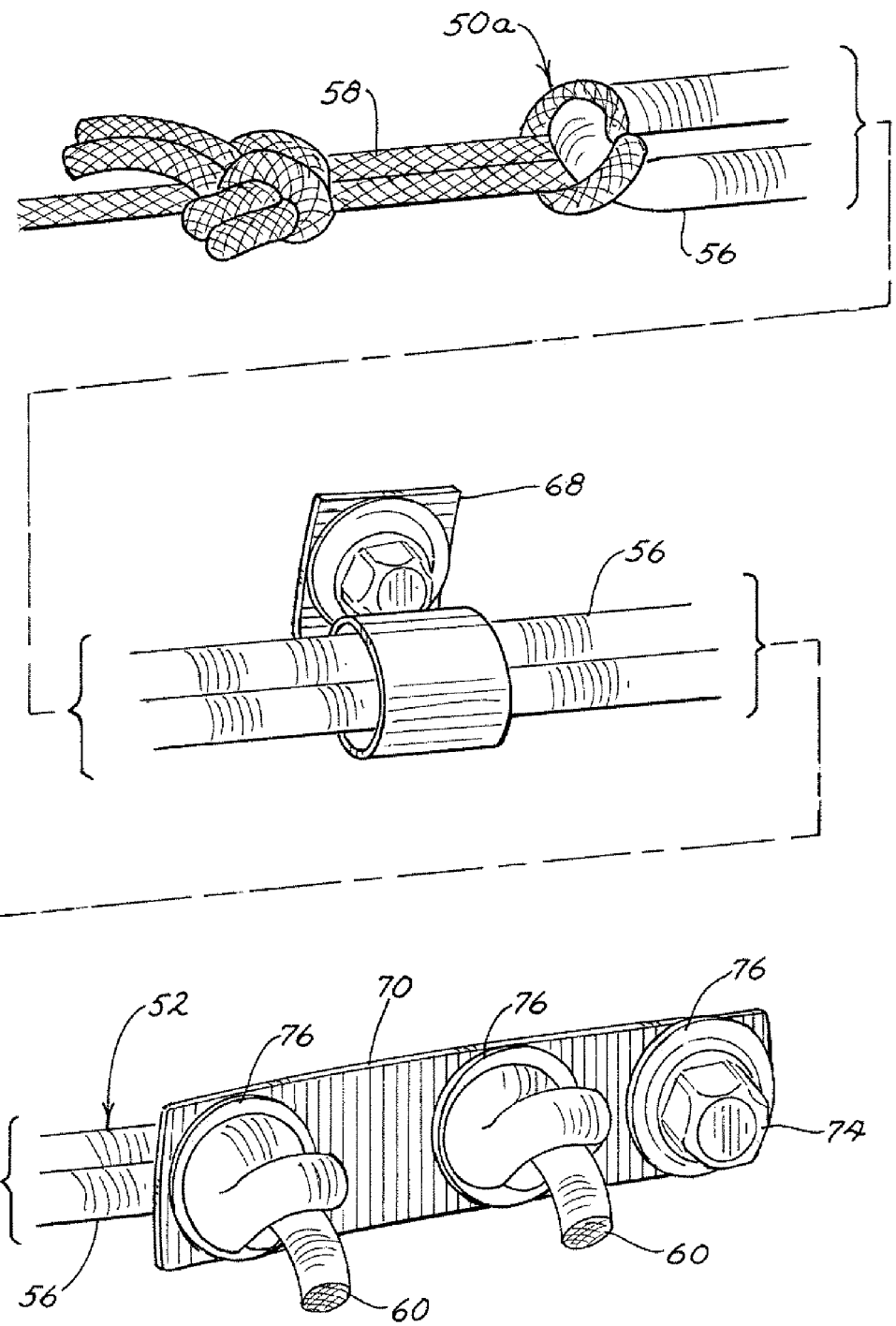
FIG. 4 is an abbreviated perspective view of attachment portions of the initial preferred upper biasing member 50a of the roll-up tarp apparatus 10 of FIGS. 1-2.

FIG. 2A also illustrates an upper or roll bar biasing member 50a interconnected to the sleeve 24a of arm 22a. A second upper or roll bar biasing member 50b can be provided at the back end 8c of truck box 6 and secured to the second arm 22b, for example, as shown in FIG. 3. The upper biasing members 50a, 50b are provided in preferred embodiments to assist the motive source 30 in moving the arms 22a, 22b, and indirectly the roll bar member 18, in the unroll direction or in other words, in a direction toward the second longitudinal side 8b of the truck box 6. The preferred upper biasing members 50a, 50b that are interconnected to the arms 22a, 22b are preferably connected to the truck box 6 with a retaining strap 70 on the longitudinal side 8b of truck box 6 as illustrated in FIG. 4 and extend along at least part of a longitudinal side 8b of the truck box 6 and preferably to the respective arm 22a, 22b, where it is attached to the respective sleeve 32a, 32b; or alternatively, the elongated roll bar member 18 as shown in FIG. 2B.

In order to prevent wear damage of the biasing members 50a, 50b, a corner guide 66a, 66b, 66c is preferably provided. Each corner guide 66a, 66b, 66c includes a base 67a and an orthogonally oriented flange 67b. The base 67a is provided with an aperture 67c that receives a fastening element, and the flange, which extends outwardly from the base, is provided with transverse slot 67d that is in communication with the aperture 67c. A cord 58 may be connected to by corner guide 66a, 66b, 66c by passing it between arms formed by the slot 67d and into the aperture 67c. Preferably, the edges of the aperture 67c are rounded and the surface of the aperture is provided with a low-friction material. More preferably, corner guide 66a, 66b, 66c is plastic. The guide 66a, 66b, 66c can be aligned either horizontally (see FIG. 2A) or vertically aligned (see FIG. 2B).

FIG. 2B illustrates the upper biasing member 50a somewhat differently configured as compared to FIGS. 1-2A. The upper biasing member 50a extending through corner guide 66c that is arranged such that the generally non-elastic or generally non-extendable cord 58 of the upper biasing member 50a passes through the corner guide 66c and is directed generally perpendicular to the latch plate 64a to where the upper biasing member 50a can be interconnected to the elongated roll bar member 18 with a rotatable collar 80 by way of a D-shaped ring 82, that is attached to the collar and which extends radially therefrom. Alternate embodiments of the roll tarp assembly of the present invention can have one collar 80 at each end of the roll bar member 18 so that the roll bar member is tensioned at each of its respective ends. The collar 80 is can be arranged and configured such that it is easily and freely rotatable about the elongated roll bar member 18 such that as the elongated roll bar member 18 rotates and moves over the upper surfaces 25 of the respective end caps 8e, 8f at each end of the truck box 6, neither of the two respective generally non-elastic cords 58 will wind around the elongated roll bar member 18.

Figure 12A:
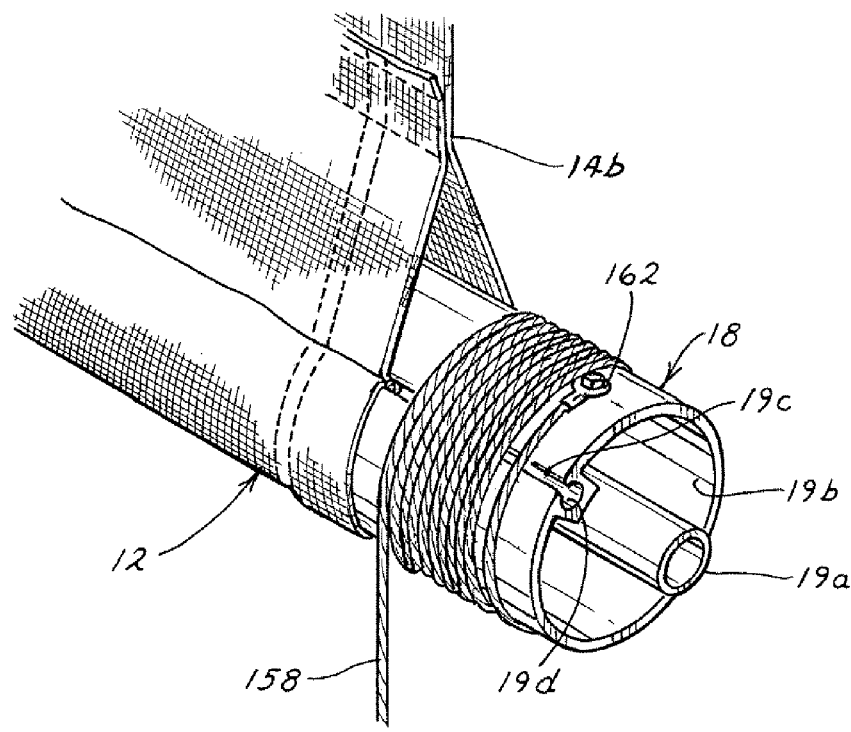
FIG. 12A is a partial perspective view of the end of the elongated roll bar member 18 of FIG. 11 (certain elements have been omitted for clarity)
Figure 13A:
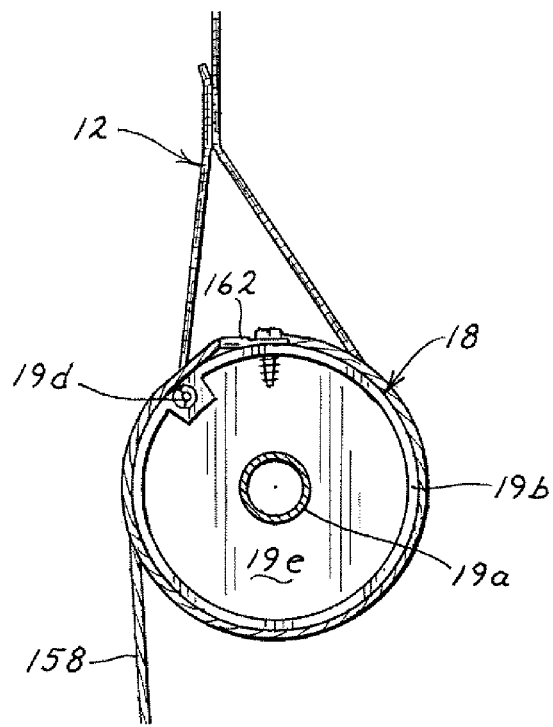
FIG. 13A is a partial cross-sectional view of the end of the elongated roll bar member 18 of FIG. 12A.

It will be appreciated that alternate embodiments of the roll-up tarp apparatus 10 may be configured to have one arm at each end of the truck box 6, with each arm provided with a connecting member 44a, 44b that is connected to opposite ends of the elongated roll bar member 18. Upper biasing members 50a, 50b can be interconnected between the latch plate 64a or truck box 6 and one of the respective arms 22a, 22b, or alternatively, one of the respective ends of the elongated roll bar member 18. It will be appreciated that the respective upper biasing members 50a, 50b can also be attached to the respective arm 22a, 22b at one end and to the roll bar member 18 at the other end. Furthermore, in certain truck cargo box configurations, where the rear end of the truck box opens, an arm at the rear end would likely interfere with the opening and closing operations. For that reason, and also because the cost of the addition arm may be a factor, arms at both ends are unnecessary and a single simple arm, preferably located at the front, may be provided and the rear end of the elongated roll bar member will be connected to the latch plate or truck box with an upper biasing member of the present invention or by other biasing members of the type that have been disclosed in the prior art, e.g. the bungee cord engaged with the roll bar member as disclosed in U.S. Pat. No. 4,505,512 (Schmeichel), the disclosure of which is hereby incorporated herein by reference. Furthermore, it will be appreciated that the roll-up tarp assembly may be either motorized or manually driven. In the manually driven embodiment, power to the arm will be provided by a hand crank, similar to those now in use and publicly disclosed in the patent literature and elsewhere (see also, for example, FIG. 23). It will be appreciated that a crank arm assembly or handle is relatively dissimilar to the arms of the present invention, insofar as it is not pivotally connected to the truck box. In this regard, it will be further appreciated that the upper biasing member of the present invention may be provided in yet another alternate embodiment in which the motive source is a hand crank and each end of the elongated roll bar member is interconnected to the truck box by a biasing member, either or both of which may be an upper biasing member attached to a collar (see, for example, FIG. 2B) secured to the elongated roll bar member. In alternate embodiments, the cord can be securely attached to the roll bar member such that the cord winds around the elongated roll bar member as the tarp is opened and unwinds as the tarp is unwound (see, for example, FIGS. 12A, 12B). In such embodiments, the arm can be a crank handle and it will not be pivotally connected to the end of the truck box or trailer, but a biasing member of one type or another will be provided. The biasing member may be an upper or roll bar biasing member of the present invention, preferably one interconnected to the latch plate at each end of the roll bar member, but other biasing members and mechanisms that are well known in the art may also be used.

It will be further appreciated that other various types of arms can be used. For example, hinged or biased arms can be utilized. Examples of such arms are disclosed in FIGS. 28 and 30-31 and U.S. Pat. No. 7,188,887 (Schmeichel), the disclosure of which is incorporated herein by reference.

The upper biasing member 50a, 50b is preferably interconnected directly to the respective arm 22a, 22b even more preferably, to the sleeve 32a, 32b of the respective arm 22a, 22b. In the preferred embodiment shown in FIG. 4, the upper biasing member 50a includes an elastic member or cord 56. The elastic member or cord 56 is preferably a stretch cord, bungee cord, shock cord, elastic rope or the like having an extensibility of at least about 60% greater than its relaxed, unstressed state, more preferably at least about 80%, even more preferably about 100%, and even more preferably at least about 130%. When the upper biasing member 50a, 50b is interconnected directly to the respective arm 22a, 22b, the upper biasing member 50a, 50b will not wrap around the elongated roll bar member 18. The sleeve 32a, 32b can include a connecting ring 40a, such that the upper biasing member 50a, 50b can simply be clipped on to a sleeve 32a, 32b of the respective arm 22a, 22b with a clip 62, such as a carabineer or the like. It will be appreciated that any other known connecting device may be used as an alternative to the clip.

The rear arm 22b is similar to the front arm 22a as discussed herein, but is preferably interconnected to the elongated roll bar member 18 with a connecting member 44b. The connecting member is adjoined to the sleeve 32b, which can slide along the shaft 36b of the arm 22b as the elongated roll bar member 18 is moved in the roll-up and unroll directions. FIG. 2A also illustrates an upper biasing member 50a interconnected to the arm 22a. Preferably, a second upper biasing member 50b is additionally provided to assist the motive source or operator of the crank arm in moving the elongated roll bar 18 in the unroll direction. The second upper biasing member 50b also is largely similar to the first upper biasing member 50a as previously discussed and is preferably connected to a second retaining strap 70, just as illustrated in FIG. 4, which extends along at least part of a longitudinal side 8b of the truck box 6 and to the respective arm 22b, or alternatively, the elongated roll bar member 18. The second upper biasing member 50b of FIG. 3 is preferably interconnected directly to the respective arm 22b, even more preferably to the sleeve 32b of the respective arm 22b. The sleeve 32b can include a connecting ring 40b, such that the upper biasing member 50b can simply be clipped on to the sleeve 32b of the respective arm 22b with clip 62, such as a carabineer or the like. Alternatively, the rear arm may be omitted in various embodiments.

In some preferred embodiments, the roll-up tarp assembly 10 will include only one arm 22a located at the front end 8a of the truck box 6 to accommodate truck boxes 6 having a rear end 8c that opens (not specifically illustrated). In these embodiments, the rear upper biasing member 50b can be interconnected to the elongated roll bar member 18 similar to the arrangement and configuration illustrated in FIG. 2B.

Referring now also to FIG. 4, in preferred embodiments, the upper biasing members 50a, 50b on each end of the truck box 6 will be two different interconnected cords, one of which is an elastic member or tensioning element 56 such as a stretch cord, bungee cord, shock cord, elastic rope, spring or the like and the other of which is a generally non-elastic cord 58, which is joined to the elastic member 56 to form the two-piece biasing member 50a, 50b. In providing the two-piece biasing member 50a, 50b, the inventor has constructed and arranged the elastic member 56 in such a way that the elastic member 56 is not required to stretch through the respective corner guide 66a, 66b, 66c, which would be abrasive for the elastic member 56 when the respective arm 22a, 22b is moving in the roll-up direction and the roll bar member 18 is moving toward the support posts 65. In other words, the generally non-elastic portion 58 of the respective upper biasing member 50a, 50b is preferably long enough and the elastic member is short enough such that the elastic member 56 will not extend around respective corner guide 66a, 66b, 66c of the truck box 6 when the elongated roll bar member 18 is in the fully open position proximate the support posts 65. It will be appreciated that as either cord 56, 58 passes through such a corner guide 66a, 66b, 66c, in many circumstances the cord will be required to pass over an edge, which will likely abrade the cord, especially if it is an elastic cord such as a bungee cord. Elastic cords are often especially subject to wear as they pass over hard edges, because they have an outer woven "skin" or "jacket." The design of the jacket allows the elastic inner cord to stretch as the woven material of the jacket is draw straight to allow the inner elastic cord material to stretch. The jacket is highly subject to wear, however, and this is especially true for cords having greater extensibility. So, when an elastic cord is drawn around a corner, the elastic cord is believed to be subject to high wear rates, requiring frequent replacement.

The cord 158, 258 may be made out of a plurality of woven strands of natural material such as jute or the like, or a plurality of strands of polymeric rope making material such as polyester, nylon or the like or even wire ropes or cables. In preferred embodiments, the generally non-elastic cord will be a nylon polyester braided cord, preferably a 3/16 inch nylon polyester braided cord. With synthetic materials, the cord preferably includes a jacket surrounding an inner cord. Preferably, the inner cord is polyester material and the jacket is made of nylon material. In preferred embodiments the inner synthetic cord will be made of an aramid material such as para-aramid or meta-aramid materials such as KEVLAR®, Technora®, Twaron®, Heracron®, Nomex® and the like and the jacket will preferably be made of. Para-aramid and meta-aramid synthetic cords and the like are preferred because they generally do not stretch over time. Metal rope and cables are not generally preferred, however, as they are not generally flexible enough to allow the generally non-elastic cord to slide around the edges of the truck box. In addition, a metal rope and cables are generally more abrasive and can mar surfaces. For embodiments in which a jacket is secured over the inner cord, black is the preferred color for the jacket because it is believed that black will best prevent ultraviolet rays from damaging the inner cord.

The inventor have discovered that using elastic cords of diminished size, which are doubled, as opposed to one elastic cord that is twice the size of the two cords, can provide a greater ratio of pull back force provided by the doubled cord as compared to the force required to pull the cord out, thereby enhancing the desirability of upper biasing member when it is included the doubled elastic biasing cord as shown in FIG. 4. It will be appreciated that the doubling of the elastic cord in this way also enhances the ability of the product assembler to connect the generally non-elastic cord to the elastic cord, as well, because the doubled cord provides a loop at its end, which is easy to tie to. With respect to the generally non-elastic cord 58, it has been discovered by the inventor, and is believed but not relied upon, that a cord or rope of a smaller diameter, which is also strong enough to bear the load that it will be required to bear, will be more desirable as the generally non-elastic portion 58 of the upper biasing member 50a, because a great portion of the biasing force of the elastic portion 56 of the upper biasing member will actually be translated so as to place that biasing force on the respective arm 22a or roll bar member 18. It is believed, but is not relied upon, that because the smaller rope or cord will be exposed to less friction as it passes around a corner or over an edge, the biasing force of the elastic cord is not diminished as much as it might be if the cord had a larger diameter. For this reason, the size of the generally non-elastic cord is preferably less than about ½ inch, preferably, less than about ¼ inch in diameter. In the most preferred embodiments, this cord will be about 3/16 of an inch, which is believed to diminish the loss of biasing force as the cord passes around the corner or over the edge. It will be further appreciated that the elastic member 56 of the upper biasing member 50a may include a plurality of elastic cords. While simply doubling the elastic cord 56 over to form a double stranded elastic portion will be preferred, it will be further appreciated that it may also be desirable to have a plurality of separated elastic cords or two or more doubled elastic cords. The elastic member 56 of the upper biasing member 50a may have any number of elastic cords or springs arranged in any configuration so as to provide a resilient elastic portion that will stretch and then place force against the ends, when the elastic portion is stretched.

Preferably a generally non-elastic cord 58, which is more resistant to abrasion, is interconnected with the elastic member 56 so that the two-piece biasing member 50a, 50b has the attributes of both components where these attributes are most useful. That is, the elastic member 56 provides extensibility and elasticity, but is not required to wrap around a corner or over an edge as it passes through a corner guide 66a, 66b, 66c. The generally non-elastic cord 58, which is more resistant to abrasion than the elastic member, is able to be drawn against the respective hard edges of the corner guides 66a, 66b, 66c when the roll bar member 18 extends away from the latch plate 64a. The preferred elastic member will preferable have an extensibility of from about 40% to about 220% greater than its relaxed, unstressed state, preferably from about 60% to about 200%, more preferably from about 90% to about 170%, even more preferably from about 110% to about 150% and most preferably about 130%.

It will be appreciated that the generally non-elastic cord 58 may be any cord that has very limited extensibility and may stretch slightly when the respective ends are drawn apart under at least some force. The extensibility of the elastic member 56 will generally be at least 10 times, preferably at least 20 times, more preferably at least 30 times as great as the limited extensibility of the generally non-elastic cord 58, which may stretch somewhat, but will not be what is generally recognized to be an elastic cord or spring. The generally non-elastic cord 58 may be made out of a plurality of strands of naturally material such as jute or the like, or a plurality of strands of polymeric rope making material such as polyester, nylon or the like or even wire rope or cable. Metal rope or cable is not generally preferred, however, as it is not generally sufficiently flexible to allow the generally non-elastic cord 58 to wrap around the hard edge of the corner guides 66a, 66b, 66c or truck box 6. In preferred embodiments the generally non-elastic cord 58 will be made of a plurality of strands of polymeric material, woven together to form the generally non-elastic rope or cord, preferably nylon polyester material. In preferred embodiments, the generally non-elastic cord will have a hollow polyester braided jacket and preferably a 3/16 inch polyester core, which may or may not be braided.

Upper biasing members 50a, 50b have respective first and second ends 52, 54. As illustrated, each preferred upper biasing member 50a, 50b includes an elastic member or cord 56 interconnected to a generally non-elastic portion or cord 58. In this embodiment, a bungee cord 56 is interconnected to a rope 58 made of a durable material, such as nylon (see also, above discussion regarding possible cords). Each upper biasing member 50a, 50b is arranged and configured such that in operation, the generally non-elastic portion 58 is the only portion of the upper biasing member 50a, 50b that contacts the edge of the truck box 6, or corner guide 66a, 66b, 66c located on the respective corner of the truck box. The generally non-elastic portion 58 is more durable than the elastic member 56 and thus, can withstand more contact with the respective abrasive corner or corner guide 66a, 66b, 66c. As illustrated, the upper biasing members 50a, 50b can be supported along the truck box 6 with one or more respective support guides 68.

The first end 52 of each upper biasing member 50a, 50b is preferably secured in a parallel fashion either above or below the latch plate 64a with one respective retaining strap 70 that has a plurality of apertures (located behind knotted ends 60, see FIG. 4). The ends 60 of the elastic cord 56 can be threaded through the apertures and secured by, for example, knotting cord ends 60. Additionally, grommets 76 are provided to reinforce the apertures, to strengthen the strap proximate the apertures and to further support and secure the knotted end 60 against the aperture. The retaining strap 70 can be secured to the truck box 6 with a fastener 74. As illustrated in FIGS. 2A-2B and discussed above, a second end 54 of each respective upper biasing member 50a, 50b is preferably interconnected to the respective arm 22a, 22b (see also, FIG. 1). It will be appreciated that other mechanisms that are known in the art may be used to join the respective cords 56, 58 of the upper biasing members 50a, 50b and in securing the biasing members 50a, 50b to the truck box 6.

It will be appreciated that a strap 70 material will be selected that can withstand the force placed on the attachment point by the biasing member. It will be further appreciated that the retaining strap 70 is not necessarily made of a flexible material and can be made out of a rigid or semi-rigid material as stated above and that the grommet can be replaced by a washer or the like. The retaining strap 70 is preferably made of woven material; most preferably nylon polyester strap material that is determined to be strong enough to secure the respective upper biasing member 50a, 50b to the truck box 6 without breaking, tearing or otherwise allowing the respective upper biasing member to disconnect from the truck box under normal use conditions. It will be appreciated, that other functionally suitable materials may be used in place of the retaining strap including without limit flexible, semi-rigid or even rigid materials that will include a rigid plate.

Now also referring to FIG. 5, which schematically illustrates the general movement of the front arm 22a as viewed from the front end 8a (not shown in this figure for clarity) of the truck box 6. In preferred embodiments, the shaft 36a, 36b of each arm 22a, 22b includes a restricting member 38a such that the sleeve or sliding portion 32a, 32b of the arm 22a, 22b is prevented from traveling down the shaft 36a, 36b, past the respective restricting member 38a. Restricting the movement of the sleeves 32a, 32b downward along the shaft 36a, 36b is beneficial in that the elongated roll bar member 18, and thus the tarp 12, will be lifted substantially above apex A of the end caps 8e, 8f of the truck box 6 and, as generally shown in FIG. 6A. Grain cargo is often crowned in the center, having a height highest toward the apex A of the end caps 8e, 8f. As the elongated roll bar member 18 moves in the unroll direction away from the support posts 65 and toward the latch plate 64a, the restricting member 38a associated with the shaft 36a will prevent the sleeve 32a, to which the motive source 30 and the elongated roll bar member 18 are attached, from sliding down the shaft 36a as the arm 22a reaches the apex A of the end cap 8e. This will have the effect of raising the motive source 30 and the roll bar 18 up and over and accumulated grain or other cargo C, gathered in the center of the truck box 6 (see, for example, FIGS. 5, 6A), as the tarp 12 is unrolled to cover the top opening 7a (see, for example, FIGS. 7A and 7B). After the tarp 12 is secured and the cargo C settles, spreading out more evenly within the truck box 6, the operator can re-secure the tarp 12 to insure a tighter fit.

When the top opening 7a is covered by the tarp 12 and the roll bar member 18 is secured against the underside of the latch plate 64a, the top opening 7a is covered by the roll-up tarp apparatus 10. When the operator wishes to expose the top opening 7a when it is covered by the tarp 12, the operator will activate the hand crank or motive source 30 so that the elongated roll bar member 18 will initially move down from the underside of the latch plate 64a, until the tarp 12 is fully unrolled and the roll bar member 18 will then continue to turn in the same direction and begin rolling the tarp 12 up on the roll bar member 18 in the opposite direction, initially climbing upward as it begins to gather the tarp 12. As the roll bar member 18 continues to gather and roll the tarp 12 up on its extended length, the roll bar member 18 will traverse over the latch plate 64a and then continue to gather or furl the tarp 12 as the roll bar member 18 turns over the upper surfaces 25 of the respective end caps 8e, 8f and moving in the roll-up direction. When the roll bar member 18 has gathered or furled all of the tarp 12 it is positioned adjacent the nexus of the support posts 65 and the area where the tarp 12 is attached to the longitudinal side 8d of the truck box 6.

Figure 7A:
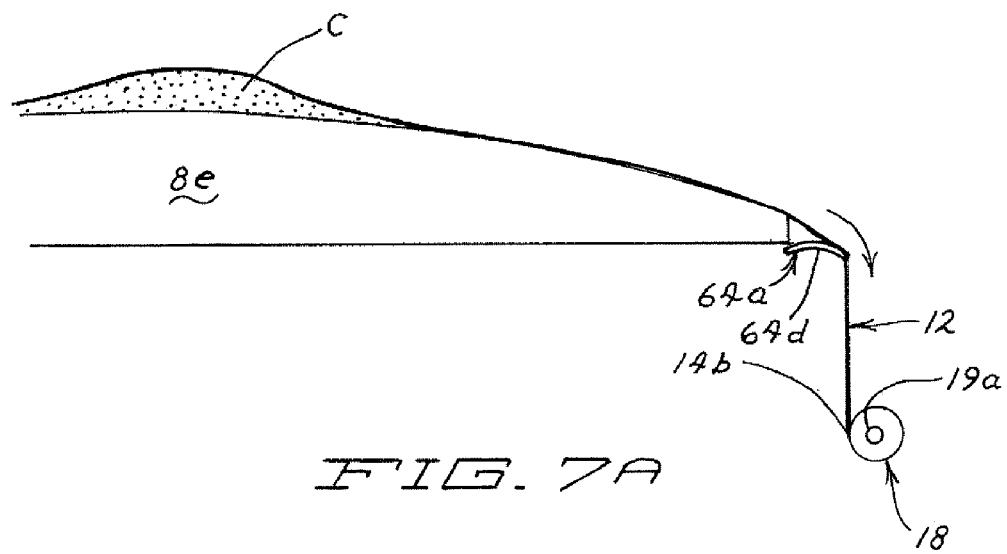
FIG. 7A is a schematic, end view of the elongated roll bar member 18 as it is in the process of being secured over the trailer or cargo box 6, prior to being in a closed, stored or secured position; the cargo box 6 contains a new load of cargo C such as grain or the like, which is shown in a mound in the center of the cargo box 6 prior to the usual shifting of the load C that generally occurs over time during transport and delivery of the load, similar to that shown in FIG. 6A.
Figure 7B:
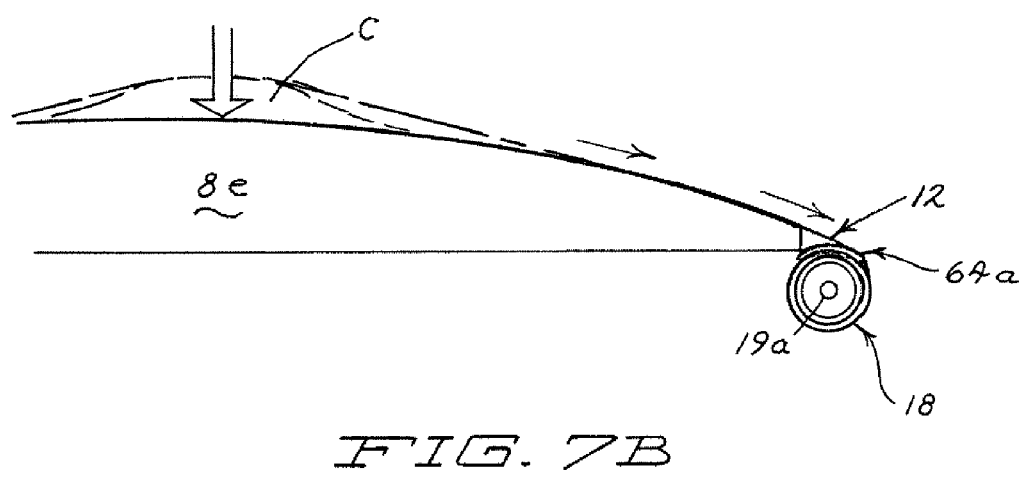
Figure 23:
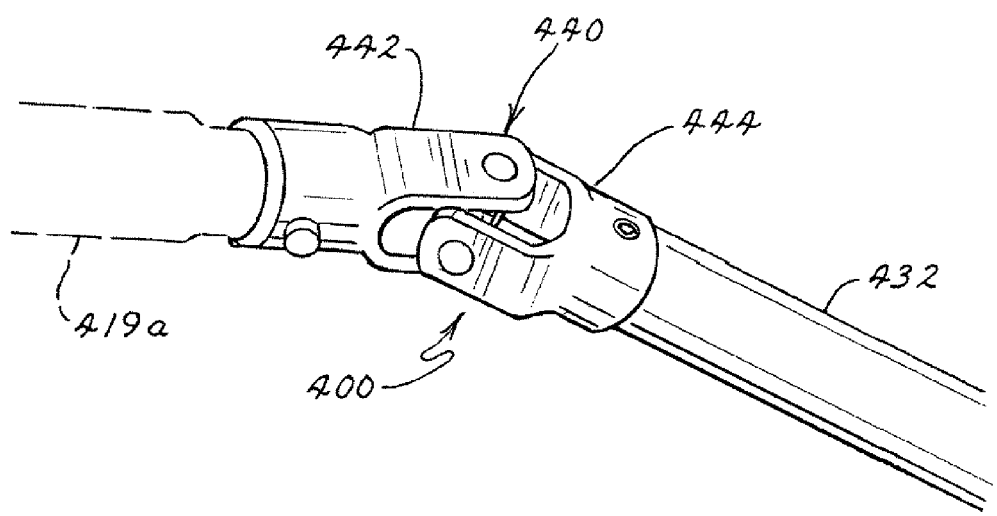
FIG. 23 is a partial, perspective view of a crank arm assembly 400 connected to inner tube 419a the elongated roll bar member, which can be substituted for the motive force 30 of the roll-up tarp apparatus 10 of FIG. 1.
Figure 24:
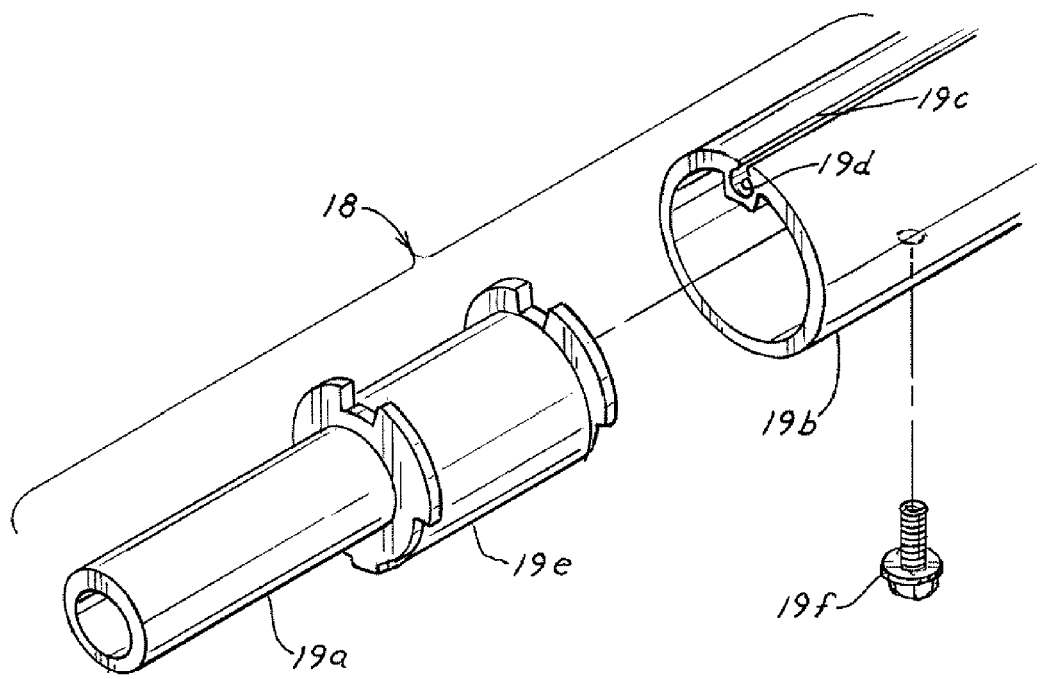
FIG. 24 is an exploded, perspective view of the elongated roll bar member 18 of FIGS. 1 and 11-13.
Figure 25:
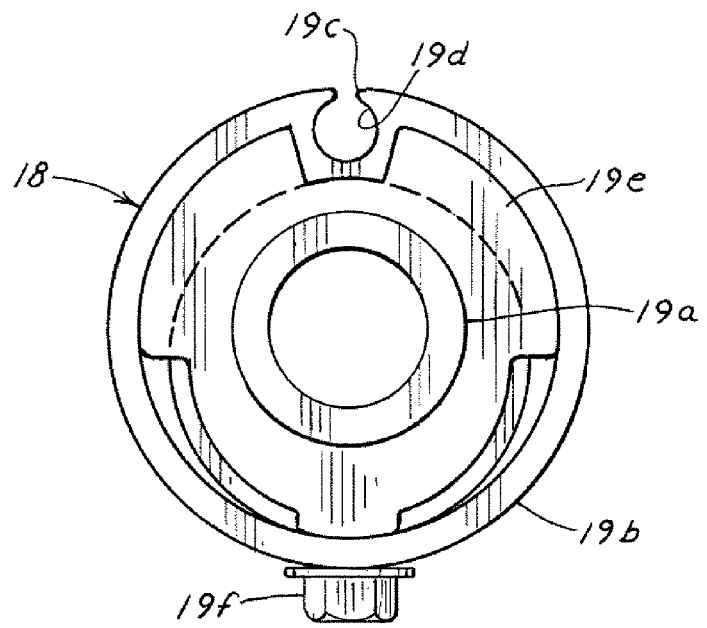
FIG. 25 is an end view of the elongated roll bar member 18 of FIGS. 1, 11-13 and 24.

As illustrated schematically in FIGS. 7A, 7B and 13B, when the roll-up tarp apparatus 10 is moving in the unroll direction driven by the motive source 30 (or, alternatively, a crank handle as shown in FIG. 23), the elongated roll bar member 18 will eventually traverse over the latch plate 64a, 64a', and then travel down below the latch plate 64a, 64a' until the tarp 12, 12' is fully unrolled. Preferably, the tarp 12, 12' is long enough such that the elongated roll bar 18 drops a length L between about 5 to about 15 inches from below the highest point along the radius of the underside 64d' of the latch plate 64a', more preferably about 7 to about 13 inches, even more preferably about 9 to about 11 inches, even more preferably about 10 inches. The long drop L allows the elongated roll bar member 18 to be secured underneath the latch plate 64a, 64a' even on a windy day, where the elongated roll bar member might bow due to the wind, so that the center of the elongated roll bar member bows, and even when a large load is loaded into the truck box 6 so that it initially extends above the top surface 25 of the end caps 8e, 8f in the middle before the load settles into the truck box 6. Once the tarp 12 is fully unrolled, the elongated roll bar member 18, still driven by the motor 31 of the motive source 30, will roll-up in an upward direction gathering or rolling-up the tarp 12 until the roll bar member 18 has gathered as much of the tarp 12 that is available within the space that is allowed and it is secured underneath the latch plate 64a (see also, U.S. Pat. No. 4,505,512 Schmeichel et al., the disclosure of which is hereby incorporated herein by reference).

The restricting members of the present invention may take many forms. In preferred embodiments, the shaft 36a, 36b of each arm 22a, 22b will include a plurality of adjustment apertures 29a, 29b. A preferred restricting member, preferably a bolt 38a, can be inserted transversely into one of the respective adjustment apertures 29a, 29b and interconnected with a reciprocating nut 37a, which, together, limit the downward distance the sleeve 32a, 32b can slide on the respective shaft 36a, 36b.

Referring now also to FIG. 6B, an alternative restricting member includes a spring 42 that is placed above the respective restricting member 38b to generally support the respective sleeve 32a, and thus the elongated roll bar member 18, above the cargo C in the truck box 6 as the arms 22a, 22b direct the elongated roll bar member 18 in the roll-up and unroll directions. It will be understood that the spring 42 of the present invention can be substituted with a variety of resilient materials.

FIGS. 6C-6E show alternative restricting member embodiments that can be used as a substitute for the restricting members 38a, 38b, respectively illustrated in FIGS. 6A and 6B. The restricting member of FIG. 6C is a collar 38c secured on the respective arm 22a with a fastener 39c. The restricting member of FIG. 6D is a pin 38d inserted through one of a plurality of apertures of the respective arm 22a. The pin 38d can be secured to the respective arm 22a with a fastener 39d. The restricting member of FIG. 6E is a flattened portion 38e of the respective shaft 36a formed such that the sleeve 32a cannot slide below the flattened portion 38e. It will be understood that the restricting members disclosed are merely illustrative and alternatives will be possible without departing from the spirit and scope of this disclosure.

FIG. 5 additionally illustrates how each upper biasing member 50a, 50b assists the movement of the respective arms 22a, 22b in the roll-up direction (only the first upper biasing member 50a is shown but it will be understood that second upper biasing member 50b is arranged and configured similarly). When the respective arm 22a is moving in the rolled-up direction (from right to left, as shown in the figure), the upper biasing member 50a is stretched and tensioned. As the motive source 30 directs the arm 22a in the unrolled position, the tensioned upper biasing member 50a urges the arm 22a to the other side 8b of the truck box 6, thus assisting the motive source 30. FIG. 5 further illustrates, in phantom, the elongated roll bar member 18 in an open position, wherein the elongated roll bar member 18 has completely rolled-up the flexible tarp 12 and the elongated roll bar member 18 and the gather tarp 12 rolled up against the plurality of support posts 65 extending along the longitudinal side 8d of the truck box 6, opposite the latch plate 64a (see also, FIG. 1).

Referring now also to FIGS. 9 and 10 that illustrate an alternative and preferred method of securing at least one respective arm 22a' to the respective side 8a, 8c of the truck box 6 with a bracket or the like 90, 90'. As shown, a bottom end 26a' of the arm 22a' preferably includes a retaining element or connecting portion 27' having a socket that corresponds to a ball 93. The ball 93 is provided with a threaded stem that is interconnected to the support member 94. The corresponding connecting portion 27' and ball 93 collectively form a ball joint 95 to allow for minor adjustments of the longitudinal placement of the top of the respective arm 22a' as best illustrated in FIG. 10. The preferred allowed range of movement is at least about degrees, preferably at least about 10 degrees, more preferably at least about 15 degrees and most preferably at least about 20 degrees such that the roll-up tarp apparatus 10 can be effectively used with truck beds having a variety of lengths. For example, if the elongated roll bar member 18 is longer than might be needed, the ball joint 95 will allow for the longer roll bar 18. Moreover, the ball joint 95 is preferred for truck boxes having slanted ends 8c' (as shown in phantom in FIG. 10), where it is likely that the arm 22a' will have to slant back toward the top of an end cap (see also, FIG. 2A) over the top opening 7a of the truck box 6. It will be appreciated that such slanted back truck boxes allow haulers to carry more cargo lower to the center of gravity of the trailer and also provide a preferred climbing angle for a hauler wanted to climb up a ladder at the back of the truck box to inspect the cargo load in the truck box.

In alternate preferred embodiments, each respective arm 22a, 22b is additionally biased with a lower biasing member 100 as best illustrated in FIGS. 1 and 8, preferably one lower biasing member 100 operatively engaged with each arm 22a, 22b. As illustrated most clearly in FIG. 8, preferably one of the respective arms 22a, 22b, in this illustration front arm 22a, is interconnected to the respective side 8a of the truck box 6 with a mounting bracket 90. The mounting bracket 90 includes opposing feet 91a with apertures for receiving fastening elements, and a raised section 91b that is spaced outwardly from the side 8a of the truck box 6 when the mounting bracket is attached to the truck box. Extending from the raised section 91b of the mounting bracket 90 is a support member 92 to which one arm 22a can be rotatably mounted. In this embodiment, the bottom end 26a of the arm 22a includes an alternate retaining element 27 configured to be a transverse cylindrical portion that can be connected to the support member 92. The preferred lower biasing member 100 includes a torsion spring 102 positioned on the support member 92 between the mounting bracket 90 and respective arm 22a. Preferably, a first nut 94 is welded to the support member 92, which is threaded on both ends. The cylindrical retaining portion 27 of the arm 22a can be slid over the support member 92 and secured thereto by a second nut 96. The lower biasing member 100 having an assisting end or arm 104 with a finger 105 and a static or stationary end 106, with the biasing member 100 arranged and configured such that the lower biasing member will assist the motor 31 of the motive source 30 (see also, FIG. 2A) by applying a force F to the arm 22a so that the arm 22a is urged in the direction of side 8b of the truck box 6. The mounting bracket 90 preferably includes a stop, a block 98 or similar device to maintain the position of the static or stationary end 106. As illustrated, the finger 105 of the preferred assisting end 104 engages the respective arm 22a and pushes the respective arm 22a in the unroll direction. It will be understood that a lower biasing member 100, located proximate the bottom end 26a of the arm 22a, can be used in conjunction with or as an alternative to the upper biasing member 50a located toward the top end 24a of the respective arm 22a. A similar lower biasing member is preferably operatively secured to the second arm 22b.

Another preferred lower biasing member 800 is illustrated in FIGS. 28-29. Lower biasing member 800 is preferably attached to a bracket 798 that is secured to the side of the truck box 6. The bracket 798 having a rod or post 793 on which one or more clock springs 802 or the like can be secured. The clock spring(s) 802 can also be secured to a bolt 803 of the connecting portion 727 of the arm 722 such that the clock springs 802 bias the arm 722 in the unroll direction. The connecting portion 727 can be sized such that the clock springs 802 are generally contained by the connecting portion and the clock springs will not move laterally along the rod 793. The lower biasing member 800 of FIG. 29 can be used with all various arms disclosed herein as desired. The lower biasing member 800 can be similar to the pivot apparatus disclosed in U.S. Pat. No. 5,944,374 (Searfoss), the disclosure of which is incorporated herein by reference.

Now also referring to FIGS. 11-16C, the roll bar biasing member 150 is operatively connected to a truck box 6. The roll bar biasing member 150 includes a cord 158 having first and second ends 160, 162, one end 162 is interconnected to the elongated roll bar member 18 and the other end 160 is interconnected to a tensioning element 156, such as a spring, which in turn, is interconnected to the truck box 6. Preferably, one roll bar biasing member 150 is attached to each end of the elongated roll bar member 18 although only one is shown for clarity. The preferred tensioning element 156 is a metallic coil spring, versus, for example, an elastic cord, because it is believed that springs generally work better when the temperature is generally at or below freezing and/or there is frost and/or snow on the tarp and/or spring. The inventor has found that the elasticity (or stretchability) of an elastic cord is generally more affected by cold temperatures in comparison to a metallic coil spring. For example, a cold bungee cord will typically lose a significant amount of its elasticity in very cold weather whereas a spring generally will not. The tensioning member 156 is preferably a spring but can be at least one elastic cord or the like having an extensibility of at least about 60% greater that its relaxed, unstressed state, more preferably at least about 100%, even more preferably at least about 130%. One preferred spring is made of music wire or the like having a wire diameter of about 0.148", an outside coil diameter of about 1.50", free length of about 14.0", a spring rate of about 3.6 lbs./in., an initial tension of about 10 lbs., a maximum load of about 92 lbs., a maximum deflection of about 23" and a zinc PL finish or the like. Yet another alternative tensioning element is the return unit 100 disclosed in U.S. Pat. No. 7,246,838 (Searfoss), the disclosure of which is hereby incorporated by reference.

Biasing member 150 is connected to one longitudinal side 8b of the truck box 6 such that an unwound portion of the cord 158 and the tensioning element 156 remain generally perpendicular to the elongated roll bar or roll tube 18 during operation. This perpendicular relationship provides for a generally self-adjusting and self-aligning roll bar biasing member in that the unwound portion of the cord 158 will have the tendency to remain generally perpendicular to the elongated roll bar member 18 as the cord 158 is continually tensioned in the direction of the longitudinal side 8b of the truck box for which the biasing member 150 is secured. Generally, the unwound portion of the respective cord 158 of the respective biasing member 150 remains perpendicular to the elongated roll bar member 18 because of the constant tension exerted on the cord 158. Therefore, the tension exerted on the respective ends of the elongated roll bar member 18 will be generally equal and provide for generally even movement of the ends of the roll bar member. When the cord 158 is being unwound from the elongated roll bar member 18, as the roll bar member moves from the closed position to a fully open position in which the flexible cover or tarp 12 is full wound up upon the elongated roll bar member 18, the force on the cord 158 generally increases and the spring 156 stretches. As the cord 158 unwinds as the elongated roll bar member 18 is on the top of the truck box 6, rolling along support bars 9 and the ridges of the respective top surfaces 25 of the end caps 8e, 8f along the edges of the end caps, the cord 158 actually unwinds slower than the tarp 12 gathers or winds up on the roll bar member 18, especially as the tarp thickness on the roll bar 18 begins to grow in thickness, because the cord 158 tends to be gathered directly on the outer surface of the roll bar 18, whereas the thickness of the tarp, as it becomes rolled up upon the roll bar, makes the diameter of the surface upon which the tarp 12 is wound, increasingly greater than the diameter of the roll bar 18 proximate the area where the cord 158 is gathered. For this reason, the cord 158 has to slide over the top 25 of the end cap 8e proximate the roll bar member 18 and over an edge 64f of the latch plate 64a in the direction of the roll bar member, even as the spring 156 is being stretched and the force on the cord 158 is being increased, because the cord 158 is being released from the roll bar member 18 at a slower rate than the linear length of the tarp 12 is being gathered or wound up on the roll bar member 18 and at a slower rate than the roll bar member 18 is moving over the top opening 7a of the truck box 6. When the tarp 12 is being unwound from the roll bar member 18, and the roll bar member is moving from an open position toward a closed position, the tarp 12 is released or unwound faster than the cord 158 is wound up on the roll bar member 18, so, in that case the cord 158 will again slide over the top 25 of the end cap 8e and over an edge 64f of the latch plate 64a, but in this case it will be releasing the stress on the spring 156 and sliding back toward the latch plate 64a.

While the biasing member 150 may be connected directly to the truck box side 8b, connection via an attachment plate 270 is preferred. One preferred attachment plate 270 includes a base 271 and an extension 272 that is angled with respect to the base 271. The base 271 includes an aperture 273 for receiving a fastener 274 that is used to secure the attachment plate 270 to the truck box side 8b. The extension 272, which positions the biasing member 150 away from the surface of the truck box side 8b, includes a slot or channel 275 that is in communication with a tensioning element receiving section 276 having at least one securing ridge 278 with a plurality of serrations. Preferably, the tensioning element 156 is a spring having a portion that can be inserted into the slot or channel 275, moved toward the receiving section 276 and then retained at one of the serrations of the securing ridge 278. It is advantageous to provide a plurality of serrations along the securing ridge 278 so that the position of the tensioning element 156 can be adjusted and less care needs to be taken when locating the proper position in which to secure the attachment plate 270 to the side of the truck box 8b.

Yet another preferred biasing arm 922 is illustrated in FIG. 31. The biasing arm 922 includes a first member 924a and a second member 924b, wherein the two members are interconnected by a coil spring 950 having first and second ends 954. The preferred spring 950 is made of an oil-tempered medium basic steel wire per ASTM A229 having a spring rate in torsion to be of about 1.67 lbf-in./degree°. The biasing arm 922 of FIG. 31 can be used with any of the disclosed roll-up tarp assemblies. The spring 950 will naturally resist stretching and bending as the arm 922 moves to the side of the truck box to position the tarp in an open position, the spring 950 will stretch and bend to some limited degree storing potential energy. It will be appreciated that the spring selected will be one that balances the need to bend with the need to retain its unbent shape. As the motor or hand crank (not shown but see FIGS. 1-21 and 23) moves the arm 922 to position the tarp in a closed position, the spring 950 will assist the motor or hand crank as the spring 950 will release its stored energy. The biasing arm 922 of FIG. 31 can be used with any of the disclosed roll-up tarp assemblies.

A further, alternative roll-up tarp apparatus 710 having a biasing arm 722 is illustrated in FIGS. 28-30. The biasing arm 722 includes a first member 724a and a second member 724b, wherein the two members 724a, 724b are interconnected by a resilient, flexible hose or conduit 750. The second member 724b is connected to the truck box (not shown, see also, FIG. 1) with a bracket 790. A resilient, reinforced hose is preferred, but a conduit can be used. The preferred hose 750 is a reinforced, high pressure hydraulic hose from Scheiffer International Group that will bias the respective arms toward an in-line or straight orientation, preferably a high pressure hydraulic hose such as a hose I.D. 25.4+1.0/−0.4 from Scheiffer GmbH & Co. KG of Lippstadt, Germany. In preferred embodiments in which a conduit is used, the preferred conduit will be a flexible metallic conduit, preferably one that is covered with a polymeric covering such as a flexible, liquid-tight conduit from McMaster-Carr (Part No. 8069K16), flexible steel conduit from Bliss Yih Enterprises Co., Ltd., Taiping, Taichung, Taiwan (Part No. BS EN 61386) or the like. The biasing arm 722 of FIGS. 28 and 30 can be used with any of the disclosed roll-up tarp assemblies. Similar to the embodiment of FIG. 31 above, the hose 750 will naturally resist stretching and as a motor 731 moves the arm 722 to the side of the truck box to position the tarp in an open position (as shown in phantom), the hose 750 will stretch and bend, thus storing potential energy. As the motor 731 moves back to position the tarp (not shown in this figure) in a closed position, the hose 750 will assist the motor 731 as the resilient hose 750 will release its stored energy. The biasing arm 722 of FIGS. 28 and 30 can be used with any of the disclosed roll-up tarp assemblies.

The hose, conduit or spring 750, 950 of the biasing arms 722, 922 of FIGS. 30-31 is preferably connected to hollow, first and second members 724a, 924a, 724b, 924b by swaging or constricting the hollow pipe members 724a, 724b, 924a, 924b around the hose, conduit or spring 750, 950. Preferably, the hose, conduit or spring 750, 950 is partially inserted within each of the hollow first and second member 724a, 924a, 724b, 924b and then a swaging machine such as a 480 volt, three-phase, FINN-POWER Swaging Control, from Finn-Power Co., is used to swaging the first and second members 724a, 924a, 724b, 924b around ends of the hose, conduit or spring 750, 950. Even more preferably, respective tips or ends 954 of the spring 950 are inserted within the hollow first and second member 924a, 924b further than the area to be swaged to further assist in retaining the first and second members 924a, 924b to the spring 950 (see, for example, the breakaway section of FIG. 31).

One preferred roll-up tarp apparatus 110 further includes a protective bumper 268 or the like attached to the side 8b of the truck box 6 proximate the latch plate 64a, 64a' and extending downwardly toward attachment plate 270. The bumper 268 primarily serves to protect the side 8b from the biasing member 150, which, under tension, can be snapped against the side 8b of the truck box 6 and cause damage. The bumper 268 can also protect the side 8b from the roll up tarp apparatus 110 that is improperly secured and which may swing up against the side 8b. Preferably, the bumper 268 is provided with a somewhat resilient surface so that is able to protect an errant biasing member 150 or elongated roll bar member 18 from damage as well. See, for example, see FIG. 11. In addition, preferred biasing members 150 may be provided with a sheathing or shroud 164 to protect the tensioning element 156 from debris or the like. Preferably, the sheathing is in the form of a flexible sheet of material with two lateral edges and two longitudinal edges. The longitudinal edges can include complimentary fasteners, such as hooks 166 and loops 168, so that the sheathing can easily be secured around and removed from the tensioning element 156 without having to remove the tensioning element from the attachment plate 270.

Figure 18A:
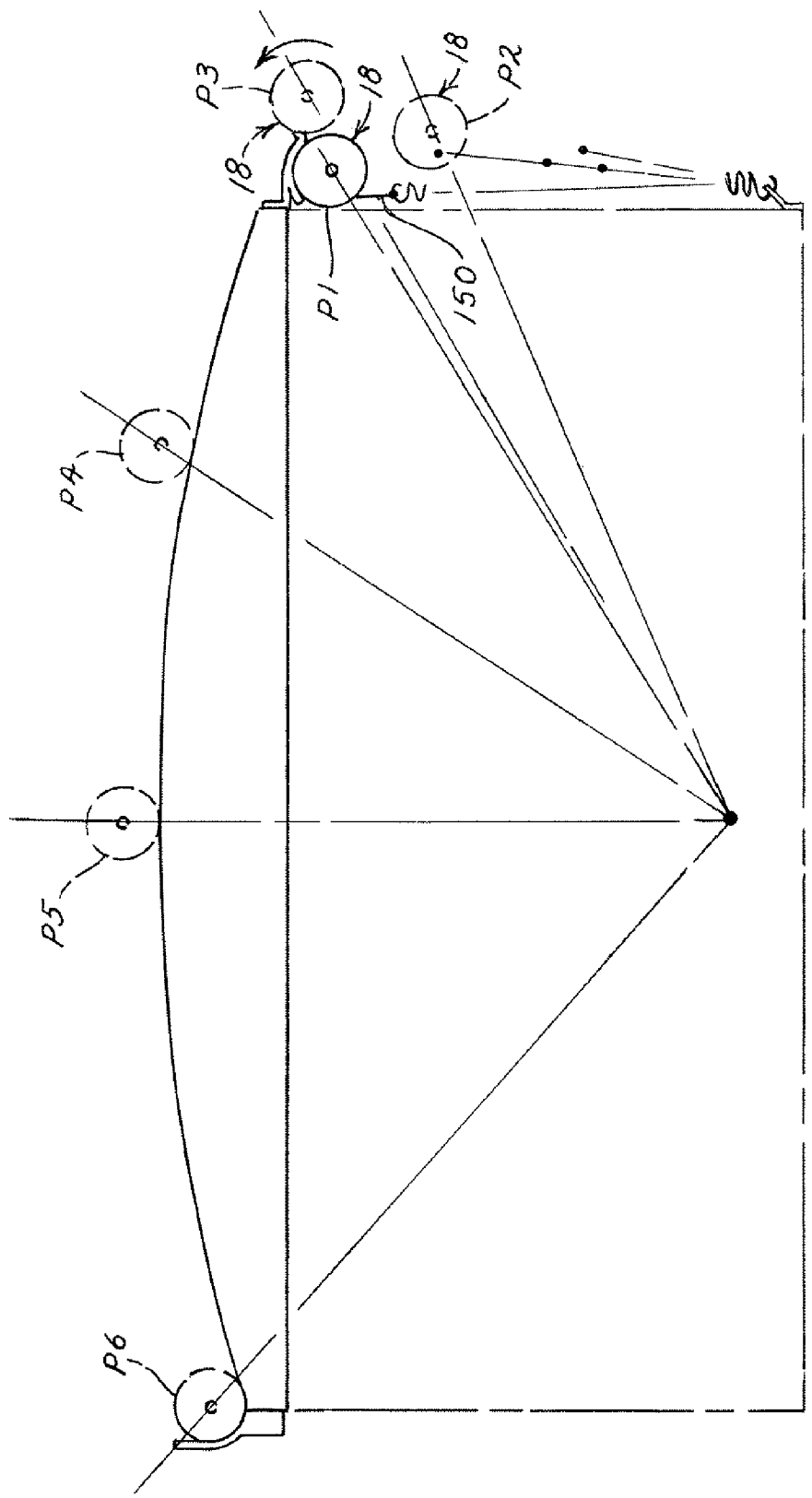
FIG. 18A is a schematic illustration of the elongated roll bar member 18 as it moves from the secured position P1 to the open position P6.

With respect to the roll-up tarp apparatus 110 of FIGS. 11-16C, the general tension exerted by the biasing member on the elongated roll bar member 18 is not constant as the elongated roll bar member rolls or unrolls the flexible tarp 12. As is shown in FIG. 18A and the graph depicted in FIG. 22a (see also, Table 1 below), tension exerted on the elongated roll bar member 18 at the completely secured position (P1) and at the completely open position (P6) is about equal (within about 1 lb.). In addition, it is noted that in this embodiment there is continual tension placed on the elongated roll bar member 18 when the roll bar member is in intermediate, partially-open positions (P4-P5) or partially closed positions (P2-P3) and even when the elongated roll bar member is in the secured or latched position (P1) as is also illustrated in FIG. 16C. Continual tension exerted on the elongated roll bar member 18 when the roll bar member is in the secured or latched position is advantageous because, it has been discovered that it will substantially eliminate lateral swinging of the elongated roll bar member. This, in turn, can prevent damage from the elongated roll bar member by preventing it from repetitively banging against the respective side 8b of the truck box 6. In addition, if continual tension is exerted on the elongated roll bar member 18, there is a reduced risk that wind gusts could infiltrate under the flexible tarp 12 and lift the tarp up, similar to a sail. This can be a significant problem as wind lifting the tarp 12 up could potentially blow the tarp off of the truck box 6 or otherwise damage the roll up tarp apparatus. Since grain trucks are often used in the plains of the Midwest, where gusty winds are common, the present invention provides a significant advantage as compared to known devices that do not address this problem. It is noted that the amount of tension noted in Table 1, which is illustrated in the graph of FIG. 22a is simply an example, and that the actual amount of force exerted by a tensioning element can differ based on the particular tensioning element selected as well as the configuration of the roll-up tarp apparatus (see also, FIG. 22b).

It will be appreciated that alternate roll-up tarp apparatuses may have a tension pattern more similar to what is illustrated in FIG. 22b. To acquire the data illustrated in FIG. 22b, a roll-up tarp apparatus was operatively secured to a truck box. The roll-up tarp apparatus was similar to that shown in FIG. 11 and included a biasing member having a spring made of music wire having a wire diameter of 0.148", an outside coil diameter of 1.50", a free length of 14.0", a spring rate of 3.6 lbs./in., an initial tension of 10 lbs., a maximum load of 92 lbs., a maximum deflection of 23 in. and a zinc PL finish. The roll-up tarp assembly was operated to open the cover from a secured position P1. At each position (P1-P6) illustrated in FIG. 18A, the movement of the elongated roll bar member 18 was stopped and the length of the spring was measured to indicate the amount of stretch. The various stretch lengths are listed in Table 2 below. Then, to determine the amount of tensioning force exerted by the spring, a pull type scale, preferably a Cabela's Buck Scale (Item No. XJ-226597), was attached to the spring and the spring was stretched to correspond to the length of the spring measured during operation of the roll-up tarp apparatus. Once the length of the spring equaled that measured during operation of the roll-up tarp apparatus, the pounds of tensioning force indicated on the scale were recorded and the record force is listed in Table 2 below. It is noted that the highest amount of tensioning force exerted by the tensioning element (spring) in both FIGS. 22a and 22b is highest when the elongated roll bar member is in the secured position and the open position.

TABLE 1

| Position | Corresponding Tensioning Force (lbs.) |
| --- | --- |
| P1 | 54 |
| P2 | 18 |
| P3 | 20 |
| P4 | 25 |
| P5 | 35 |
| P6 | 55 |

TABLE 2

| Position | Length of Spring (in.) | Corresponding Tensioning Force (lbs.) |
| --- | --- | --- |
| P1 | 40 | 235 |
| P2 | 15.5 | 66 |
| P3 | 15.5 | 66 |
| P4 | 17 | 77 |

TABLE 2-continued

| Position | Length of Spring (in.) | Corresponding Tensioning Force (lbs.) |
|---|---|---|
| P5 | 20 | 98 |
| P6 | 28 | 155 |

As with previous embodiments, when the roll-up tarp apparatus 110 is moving in the unroll direction driven by the motive source 30 (or, alternatively, a crank handle), the elongated roll bar member 18 will eventually traverse over the latch plate 64a', and then travel down below the latch plate 64a' until the tarp 12 is fully unrolled. Once the tarp 12 is fully unrolled in an unrolled position (P2), the elongated roll bar member 18 can be rolled-up in an upward direction, gathering or rolling-up the tarp 12 until the roll bar 18 has gathered as much of the tarp 12 that is available within the space that is allowed until the roll bar member 18 and the tarp 12 rolled up on the roll bar member 18 engage the latch plate 64a' so that the roll bar member 18 is pressed up against the latch plate 64a', with the gathered portion of the tarp being "sandwiched" in between, and the roll bar member 18 is fully secured underneath the latch plate 64a' in the closed or fully secured position (P1). When the tarp 12 is fully unrolled and then is moving upward to be secured underneath the latch plate 64a', as shown in FIG. 16C, the cord 158 preferably and the flexible cover 12 are both being wound around the elongated roll bar member 18 in the same direction with respect to the rotational movement of the elongated roll bar member 18. When the roll bar member 18 is turned to allow the tarp 12 that is wound up on the roll bar member and a portion of the cord 158 that is wound up on the roll bar member to be unwound, as the roll bar member 18 moves from the fully closed or secured position (P1) to the "unwound" position (P2) shown in FIG. 13 and schematically in FIG. 18A, the tension on the roll bar member 18, exerted by the respective biasing elements at each of the respective ends of the roll bar member 18, is the least that it will be at any point in the movement of the roll bar member 18, i.e. from the fully closed position (P1) to the fully open position (P6). In this unwound position (P2), the tension on the each end of the roll bar member 18 is preferably preset so as to maintain sufficient tension to prevent the roll bar member 18 from striking the side of the truck box 6 and/or prevent the roll bar member 18 from being carried upwards over the top of the truck box 6 by a gust of wind that catches the underside of the unwound tarp 12, so that the roll bar member is pulled up and over the truck box. When the elongated roll bar member 18 is in the fully unrolled position (P2), if the roll bar member 18, as shown in FIG. 16B, turns in a clockwise direction as viewed from the front of the truck box 6, the tarp 12 will wind up on the roll bar member 18 and the cord 158 will also wind-up on the roll bar member 18 as the roll bar member 18 moves toward the closed or fully secured position (P1). When the roll bar member 18 is in the fully unrolled position (P2) and the roll bar member 18 is turned in the opposite direction (counterclockwise direction), the direction of the tarp winding will change. As the tarp 12 begins to be wound in the other direction and the roll bar member 18 moves from the unwound position (P2) to the initial wind-up position (P3), shown schematically in FIG. 18A, the tarp begins to wind-up on the roll bar member 18, but the cord 158 continues to be released from and unwound from the roll bar member 18. As the elongated roll bar member 18 moves over the top 7 of the truck box 6, toward the fully open position (P6), shown schematically in FIG. 18A, the cord 158 is unwinding and the flexible tarp 12 is winding up with respect to the rotational movement of the elongated roll bar member. It will be further appreciated that when the roll bar member 18 moves from the fully open position (P6), shown schematically in FIG. 18A, to the initial wind-up position (P3), shown schematically in FIG. 18A, the cord 158 will wind up on the roll bar member 18 and the flexible cover 12 will unwind from the elongated roll bar member 18. Because the outer diameter of the wound up tarp on the roll bar member 18 is greater than the diameter of the part of the roll bar member proximate the area where the cord 158 is wound up when the roll bar member 18 is in the open position (P6), it is believed that the cord 158 is wound up on the roll bar member 18 at a linear rate that is less than the linear rate of the release or unwinding of the rolled up portion of the tarp 12 until the roll bar member 18 begins to get close to the side of the trailer 6 where the latch plate 64a' is located, which causes the respective cords 158 at each end of the respective roll bar member 18 to slide over the tops 25 of the respective end caps 8e, 8f and the respective edges of the latch plate 64a'. When the roll bar member 18 is moving toward the fully open position (P6) from the initial wind-up position (P3), the cord 158 will slide over the respective tops 25 of the respective end caps 8e, 8f, toward the other side of the truck box 6, where the roll bar member 18 will rest when it is in the fully open position (P6), because the tarp 12 will gradually effectively increase the diameter of the rolled-up tarp 12 on the roll bar with respect to the diameter of the portion of the roll bar member 18 where the cord 158 is unwound, as the tarp 12 is so gathered.

It is noted that the cord 158 winds-up around the outer tube 19b of the elongated roll bar member 18, preferably not around a spool. Unlike roll tarp apparatuses where the cord winds-up around a spool, the cord 158 generally rolls flat on the roll bar member and generally does not gather upon itself as the cord winds around the elongated roll bar member 18. It is also noted that the cord 158 is gathered on and released from a portion of the roll bar member 18 that does not extend beyond the end cap 8e, 8f on either end of the trailer 6. It is believed, but not relied upon, that when the cord 158 winds-up around the outer tube 19b over the end cap 8e, 8f, as opposed to being wound around a spool or the like, that extends out beyond the end cap on either end of the trailer, it is safer because the cord cannot catch on any ladder or other devices positioned on the ends of the truck box or get in the way of dump gates, doors or the like. Moreover, the cord is further out of the way and protected from passing trees and other objects. Additionally, the cord preferably winds such that the cord does not overlap itself and winds-up in the direction of the tarp (see, for example, FIGS. 12A, 12B), when the roll bar member 18 is going from the unwound position (P2) to the secured position (P1). When spools are used, they are generally used on the end of an elongated roll bar that extends out beyond the end caps so that the cord or cable is out and away from the front or back of the trailer where it can easily be either in the way of other operations or become engaged with passing objects.

Figure 18B:
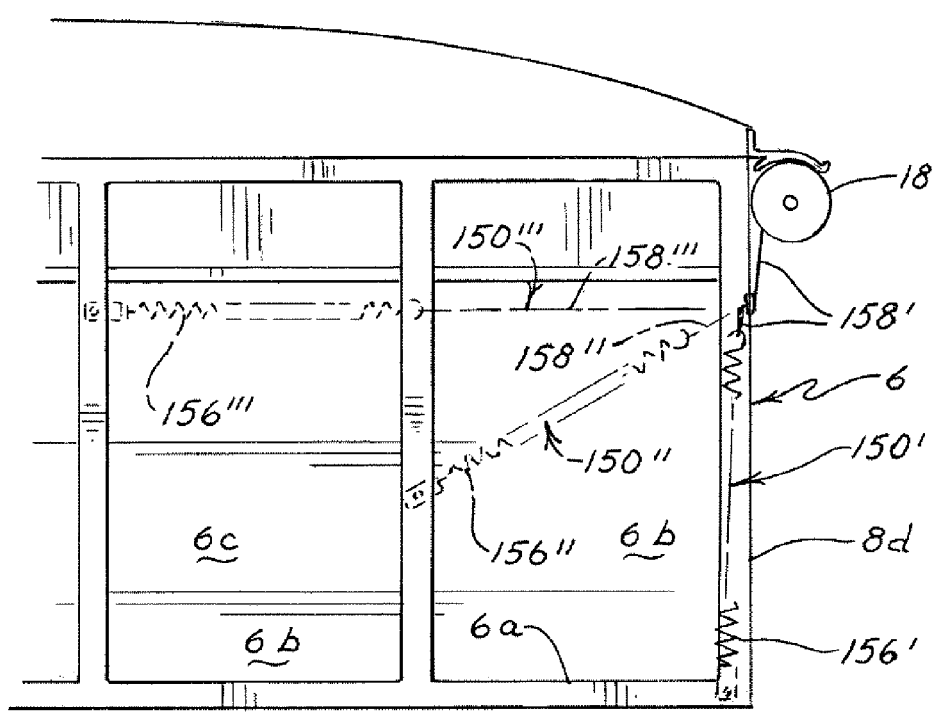
FIG. 18B is a partial, schematic illustration of alternate configurations of the roll-up tarp assembly of FIG. 11 in which the biasing member 150', 150'', 150''' can at least partially be secured at numerous positions within the truck box 6 (as also shown in phantom)
Figure 18C:
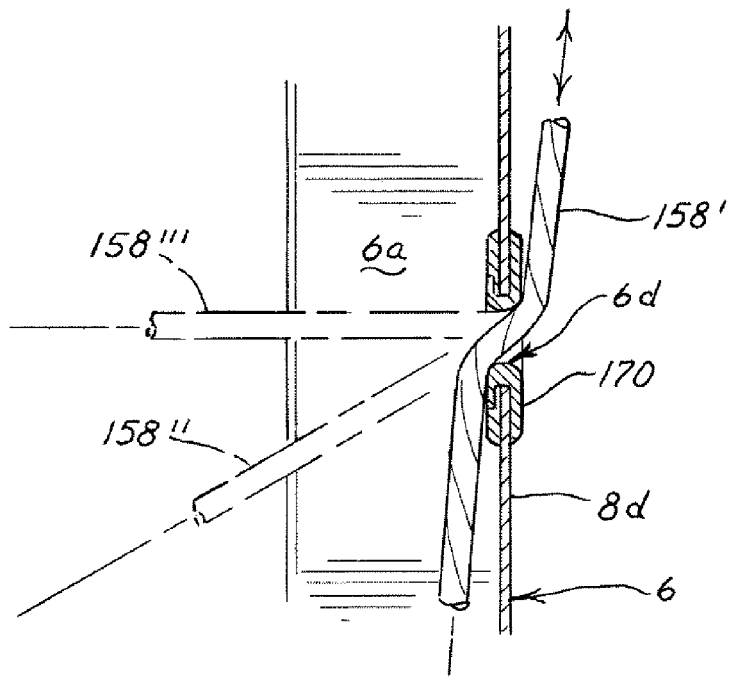
FIG. 18C is an enlarged schematic illustration of cord 158' of FIG. 18B exiting the truck box 6 through grommet 170.

Now also referring to FIGS. 18B-18C, it will be understood that biasing members 150', 150" and 150'" may be configured such that they are at least partially located within the truck box 6. Typical truck boxes 6 include a supportive frame 6a including a skin or shell 6b secured thereto. Inside the truck box 6 is a hopper 6c. In various embodiments, a tensioning element 156', 156", 156'" of the respective biasing member 150', 150", 150'" can be secured to a portion of the frame 6a and the respective cord 158', 158", 158'" can extend out of the truck box 6 via an aperture 6d in the shell 6b. Preferably, the aperture 6d includes a grommet 170 to reduce wear on the cord 158', 158", 158'" and can serve to guide the cord to the elongated roll bar member 18. As shown, the biasing member 150', 150", 150'" can be secured to the frame 6a at a variety of angles with respect to the side 8d of the truck box 6.

As best illustrated in FIGS. 12A, 13A, 19, 20 and 24-29, the elongated roll bar member 18 preferably includes an inner tube 19a, an outer tube 19b having an outwardly opening longitudinal channel 19c that is in communication with an larger longitudinal channel 19d, and a spacer elements 19e that position the inner tube 19a within the outer tube 19b. The spacer elements 19e can be secured to the outer tube 19b with a screw fastener 19f or the like. Preferably, the inner tube 19a serves as an attachment point for the motive source 30 or coupling 323 (further discussed below), and to facilitate the connection between the tube 19a and the motive source the tube 19a may project beyond the end of the outer tube 19b. In preferred embodiments, the flexible tarp 12 is provided with an enlarged longitudinal bead that is removably positioned within the longitudinal channel 19d by feeding the bead into an open end of the channel 19d and sliding the rest of the cover 12 along the channel 19c. In further preferred embodiments, as further discussed below, a cord 258 of a biasing member 250 is secured to and unwraps from around the outer tube 19a as the elongated roll bar member 18 moves into the open position. More specifically, it is important to note that the cord of the biasing member and the flexible tarp are arranged so that they wind about the elongated roll bar member in opposite directions. Thus, for example, as the roll-up tarp assembly 110 is moved from the open position toward the secured or latched position, the tarp is unrolled or unfurled as the cord 158 of the biasing member 150 is being wound about the roll bar. Conversely, as the roll bar 18 is moved from the secured position toward the open position, the cord 158 of the biasing member 150 is unwound from the roll bar as the tarp 12 is being rolled-up or furled about the roll bar. It is also important to distinguish how the tarp 12 and the cord 158 of the biasing member 150 wind about the roll bar 18. As the tarp assembly 110 is moved between the open and secured positions, the cord 158 of the biasing member 150 winds preferably about the roll bar 18 in a spiral or helical manner, while the tarp 12 winds upon itself and its circumference changes. When the tarp 12 rolls upon itself, it also may roll upon portions of the support bars or ribs 9 and/or the upper surface 25 end caps 8e, 8f. It will be appreciated that the roll bar 18 circumference increases as the roll bar moves from a position just above the latch plate 64a, 64a' adjacent the second longitudinal side 8b to the open position adjacent the first longitudinal side 8d. As the roll bar 18 moves from the second longitudinal side 8b to the first longitudinal side 8d, the circumference of the rolled-up tarp 12 becomes significantly larger than the roll bar 18, while the cord 158 unwinds at a constant rate. This creates a distance differential that results in an increase in tension in the cord 158 as the elongated roll bar member 18 and the tarp 12 are moved to the open position. This increased tension is accommodated by the tensioning or spring element 156 of the biasing member 150. When the elongated roll bar member 18 is moved past the latch plate 64a' and allowed to continue to unroll until it bottoms out tension is at a minimum. However, as the roll bar 18 continues to rotate in the same direction, the tarp 12 is rolled up against the latch plate 64a' and the force exerted by the tensioning member 156 increases. As it turns out, the forces exerted by the biasing member 150 when the roll up tarp assembly 110 is in either the open or secured positions are roughly the same, while the force exerted by the tensioning member 156 when the elongated roll bar member 18 is located between the longitudinal sides 8b, 8d of the truck box 6 will be less than the tensioning forces when the elongated roll bar member 18 is in either the open or secured position.

Figure 12B:
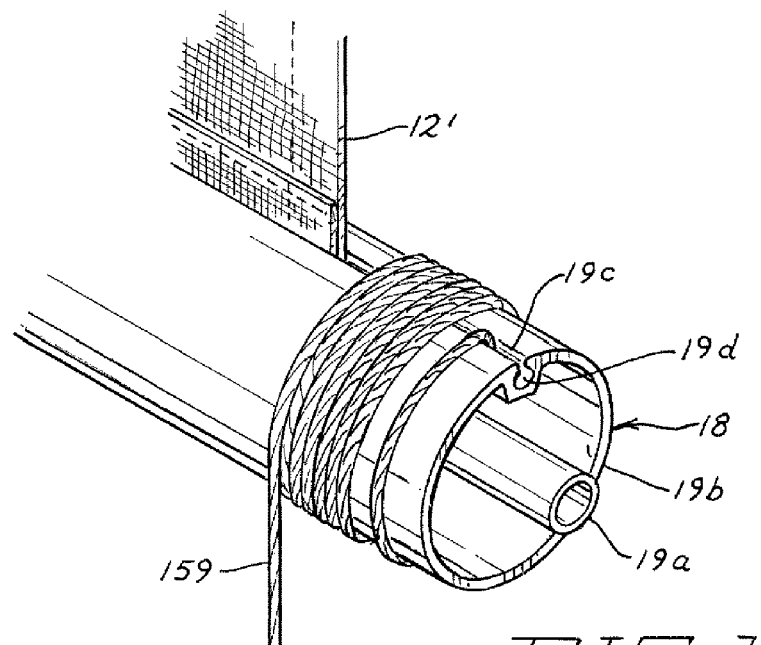
FIG. 12B is a partial perspective view of the end of an alternate flexible tarp 12' connected to the elongated roll bar member 18 of FIG. 11.
Figure 13B:
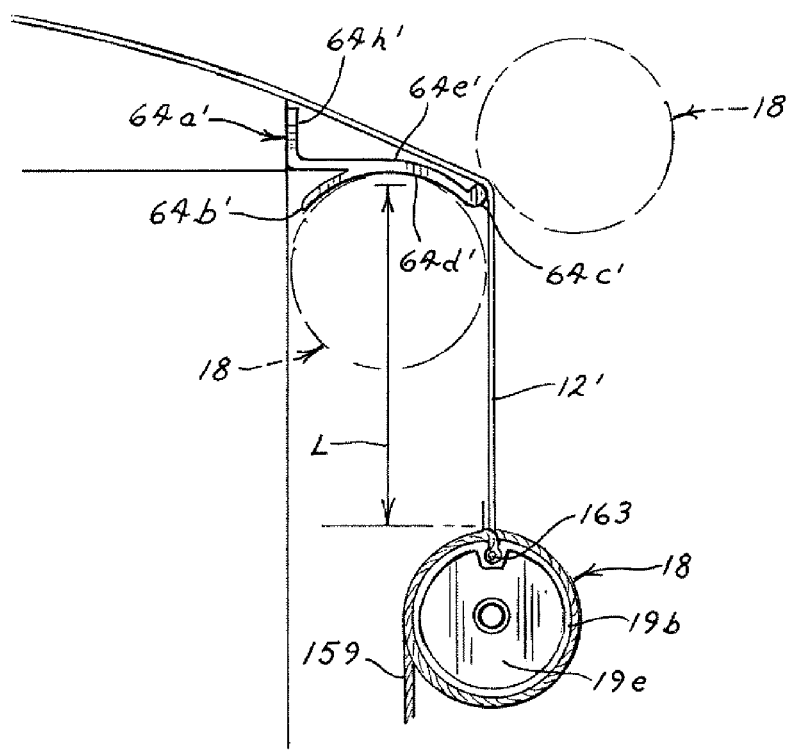
FIG. 13B is a partial, end view of the elongated roll bar member 18 and tarp 12' of FIG. 12B when the elongated roll bar member is in an unrolled position.

Now also referring to FIGS. 12B and 13B illustrating an alternative flexible tarp 12' that is secured within the channel 19c of the elongated roll bar member 18. FIGS. 12B and 13B further illustrate how cord 158 can be secured into channel 19c by tying a knot 163 in cord 158 and then sliding the knot into the channel. Knot 163 may be preferred over the screw illustrated in FIG. 12A because the knot 163 can be readjusted as desired. Such adjustments are easily made when the roll bar member 18 is in the unwound position (P2), when the tension on the cord 15, created by the biasing element 150, is the least that it will be at any point in the transition from the fully open position (P6) to the fully secured position (P1).

Figure 26:
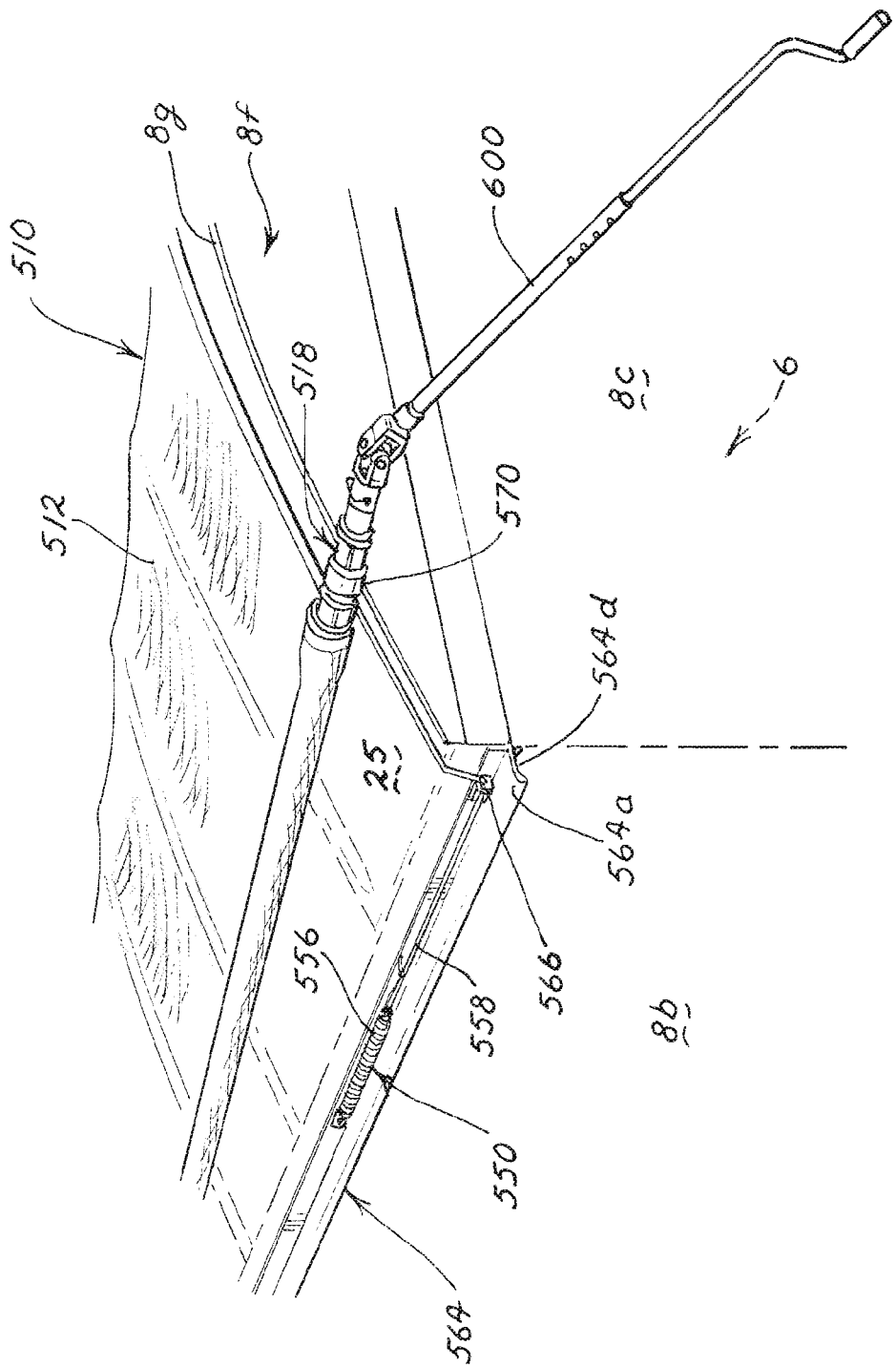
FIG. 26 is a partial view of an alternate roll-up tarp assembly 510 having a biasing member 550 positioned generally parallel to and above a latch plate 564.
Figure 27:
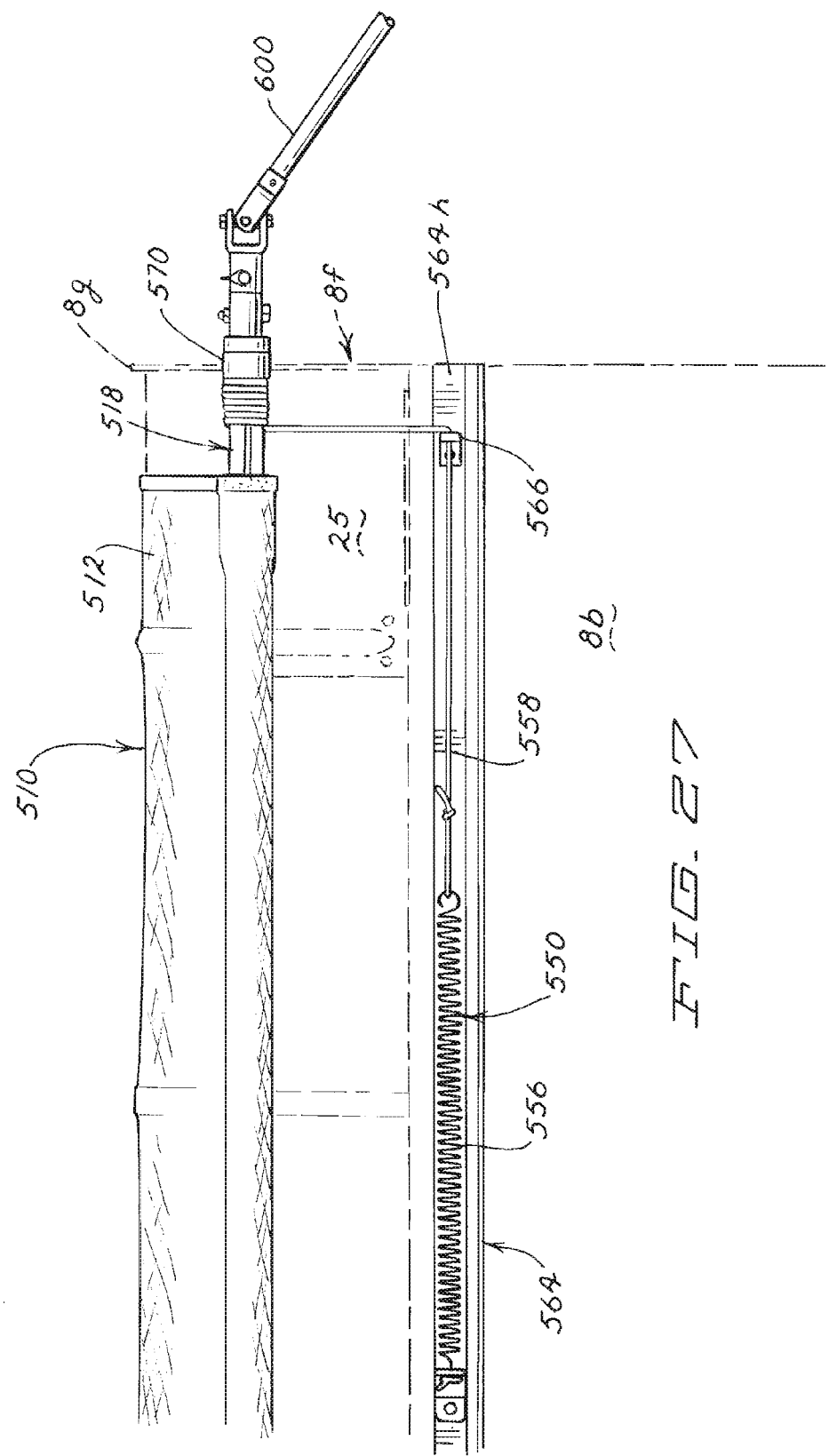
FIG. 27 is a partial, side view of the roll-up tarp apparatus 510 of FIG. 26.

Referring now also to FIGS. 26-27, an alternate roll-up tarp assembly 510 is illustrated. The roll-up tarp assembly 510 of FIGS. 26-27 is similar to the roll-up tarp assemblies 10, 210, 710 except for a biasing member 550 is secured above, and generally parallel to, a latch plate 564 that extends along one longitudinal side 8b of the truck box 6. The latch plate 564 is largely similar to that disclosed in other embodiments and includes a downwardly facing underside 564d, a top surface 564e, and a vertically oriented attachment flange 564h. This roll-up tarp assembly 510 is preferred in embodiments utilizing a hand crank assembly 600, wherein the biasing member 550 includes a spring 556 connected to a generally non-resilient cord 558 that wraps around a corner guide 566 and then to the elongated roll bar member 518. Preferably, the corner guide and the biasing member 550 are secured to a vertical flange of the latch plate 564. The biasing member 550 assists the operator of the hand crank assembly 600 in unrolling the flexible tarp 512 to cover the opening 7a of the truck box 6.

Figure 17C:
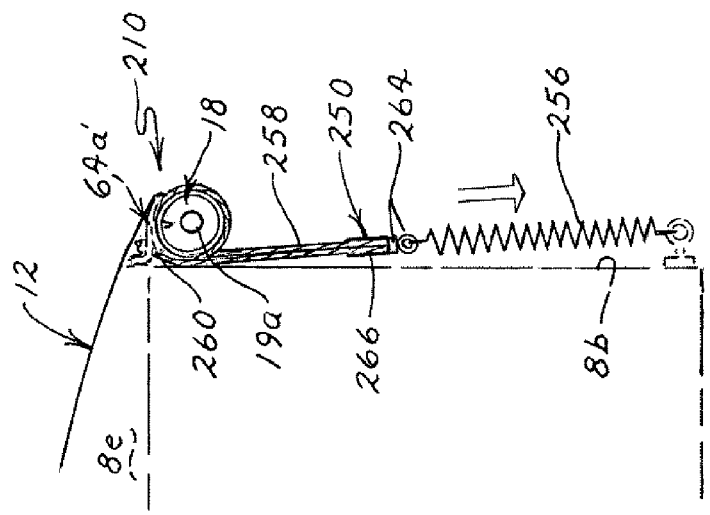
FIG. 17C is partial, schematic end view of the second alternate biasing member 250 of FIG. 17A when the elongated roll bar member 18 is in the secured position.
Figure 17B:
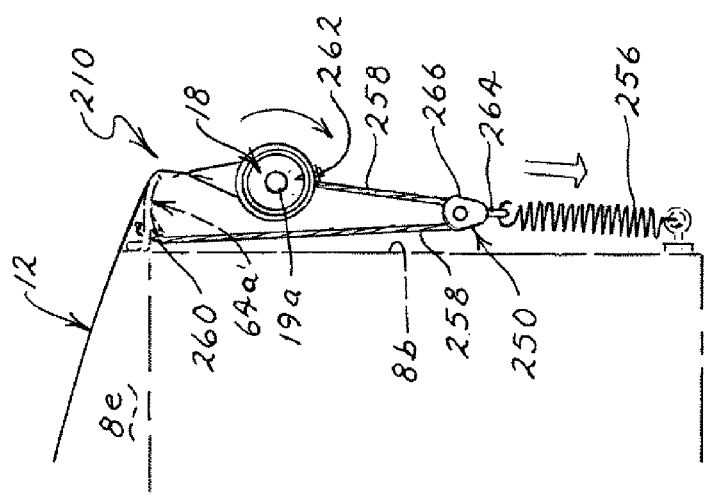
FIG. 17B is partial, schematic end view of the second alternate biasing member 250 of FIG. 17A as the elongated roll bar member 18 is moving toward the secured position.
Figure 17A:
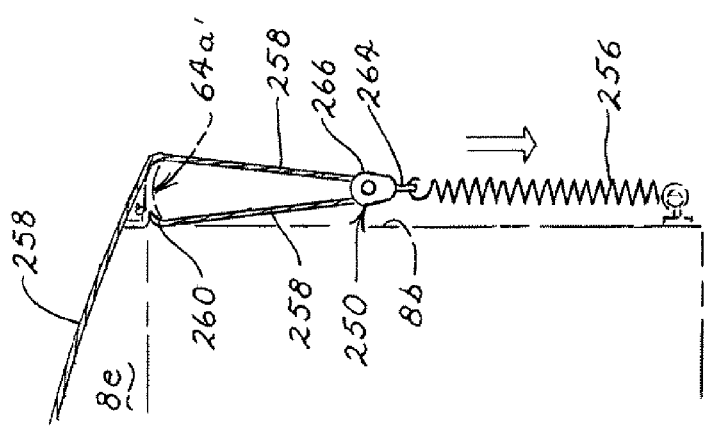
FIG. 17A is a partial, schematic end view of a second alternate biasing member 250, similar to that shown in FIG. 11, but including a pulley 266.

In the embodiment of FIGS. 17A-17C, the roll bar biasing member 250 is operatively secured to the truck box 6 and includes a cord 258 interconnected to a tensioning element or spring 256 with a clip 264 and a pulley 266. One end 260 of the cord 258 is preferably interconnected to the latch plate 64a' and a second end 262 is interconnected to the elongated roll bar member 18, for example, by drilling a hole through the external surface of the outer tube 19b of the elongated roll bar member 18, extending the cord through the hole and tying a retaining knot in the end 262 of the cord 258 (another option in which the cord is connected to the elongated roll bar member with a screw is illustrated in FIGS. 12-13). In further embodiments (not shown), a knot can be tied in the end of the cord, and the knot can be slipped into the channel 9c and the pulled tight to secure. This roll bar biasing member 250 is generally less preferred for motorized roll-up tarp apparatuses as it requires about two times the length of cord 258 to stretch the tensioning element or spring 256 as compared to an embodiment utilizing a cord directly connected to the tensioning element as discussed herein. Utilizing a pulley 266 is occasionally preferred, especially when the roll-up tarp apparatus is installed on a trailer 6 having a shorter sidewall. For roll-up tarp apparatuses utilizing a crank arm (see also, FIG. 23), the pulley reduces the amount of force needed to operate the crank arm 400. In essence, when turning the crank arm 400 to position the elongated roll bar member 18 into the secured position, the pulley 266 will require that the spring 256 be stretched half as much than if the cord 258 was directly attached to the spring 256, thereby making it easier to move the elongated roll bar member 18 against the bias of the spring 256. It is further believed that this embodiment may have additional safety features, in that the spring 256 is not stretched significantly in operation, as would be the case if a pulley 266 was not used. The pulley 266 allows for easier rolling up of the tarp 12 without overstretching the spring 256. It is believed, but not relied upon, that the roll-up tarp apparatus 210 applies forces to the elongated roll bar member 18 generally as illustrated in FIG. 22. In alternate embodiments (not shown, multiple pulleys may be used in series to simplify or ease the turning of such a crank arm and/or the cord 258 can be bolted to a side of the truck box 6 or the latch plate 64a'.

In preferred embodiments, a second roll bar biasing member (not shown) is additionally provided at the rear end of the elongated roll bar member 18 to assist the motive source 30 in moving the rear end of the elongated roll bar member 18 in the unroll direction uniformly. The second roll bar biasing member is preferably identical to the first roll bar biasing member 250 and is provided so that there is generally uniform tension on the elongated roll bar member 18. The rear biasing member can be connected to the elongated roll bar member 18 in the same manner as the first roll bar biasing member 250 as discussed above.

Preferably, the roll-up tarp assemblies 110, 210 of the present invention are arranged and configured such that a substantial portion of wound-up cord 158, 258 is stowed underneath the latch plate 64a, 64a' when the elongated roll bar member 18 is in the latched, secured position. In preferred embodiments, the cord 158, 258 winds around the elongated roll bar member 518 and the wound up portion has a thickness generally no greater than the thickness of the tarp 12 such that the elongated roll bar member 18 can fit snugly under the downwardly facing curved or arcuate underside surface 64d, 64d' of latch plate 64a, 64a' as illustrated (see also, for example, FIGS. 7B, 16C, 17C). When the elongated roll bar member 18 is in the secured position, the tarp 12 is wrapped around the elongated roll bar; the thickness of the tarp will be greater than the thickness of the cord that wrapped around the roll bar member. This separation takes pressure off of the cord that would otherwise exist if the cord was thicker than the tarp material gathered around the roll bar 18 proximate the respective ends of the roll bar 18. In a preferred embodiment (not shown), a webbing material, such as the type of material used to make seat belts for motor vehicles and the like, is sewn into the edge of the tarp 12, thus providing great thickness to the respective edges of the tarp 12 in the area where this thickness is helpful to provide separation from the latch plate 64a proximate to portion of the cord 158 that is wound up around the roll bar member 18, when the roll bar is in the secured position (P1). This will significantly reduce the likelihood that the cord 158, 258 might be worn or abraded by coming into contact with the bottom surface of the latch plate 64a.

The cord 158, 258 may be made out of a plurality of woven strands of natural material such as jute or the like, or a plurality of strands of polymeric rope making material such as polyester, nylon or the like or even wire ropes or cables. In preferred embodiments, the generally non-elastic cord will be a nylon polyester braided cord, preferably a 3/16 inch nylon polyester braided cord. With synthetic materials, the cord preferably includes a jacket surrounding an inner cord. Preferably, the inner cord is polyester material and the jacket is made of nylon material. Alternatively, KEVLAR® para-aramid synthetic cord can be used as the inner cord in conjunction with a polyester or nylon jacket, for example. Para-aramid synthetic cord and the like are preferred because they generally do not stretch over time. Metal rope and cables are not generally preferred, however, as they are not generally flexible enough to allow the generally non-elastic cord to slide around the edges of the truck box. In addition, a metal rope and cables are generally more abrasive and can mar surfaces. For embodiments in which a jacket is secured over the inner cord, black is the preferred color for the jacket because it is believed that black will best prevent ultraviolet rays from damaging the inner cord.

The decision to include one or two arms as well as the decision to include what type and location of biasing members is largely customizable. If the roll-up tarp apparatus is to only have one arm, it is preferred that the arm be located on the front end of the truck box to accommodate rear opening style ends as previously discussed. It may be desirable to eliminate any sort of arm or biasing member on the front side of the truck box so that ladders can be more easily positioned proximate the front end of the truck box. Embodiments of the present invention further include an upper biasing member secured to the front arm and a lower biasing member connected to the second, rear arm. In addition, the front arm may include an upper biasing member as well as a lower biasing member, wherein the rear arm could be omitted and the elongated roll bar member could be additionally biased with an upper biasing member secured to the elongated roll bar member with a rotatable collar or the like. Alternatively, only upper or only lower biasing members can be utilized. The number of potential combinations of elements of the present invention is virtually limitless and all can be utilized as desired to create a product embodying characteristics desired for the specific product and purpose. All such combinations are considered within the scope of the invention.

Elongated roll bar members 18, 518 can have a variety of diameters. In preferred embodiments, the elongated roll bar member 18, 518 has a diameter of about three inches. In alternate embodiments, the elongated roll bar member 18, 518 can have a diameter of two inches, more or less. Preferably, the elongated roll bar member 18, 518 has a diameter of about three inches as the inventor has found that this larger elongated roll bar member is less prone to bending or bowing and will remain straighter as the flexible tarp is rolled-up and unrolled. In addition, it is believed that a roll bar having a diameter of about three inches will be more able to resist wind and gravitational forces than a smaller diameter elongated roll bar member. Moreover, it is believed that a larger diameter roll bar member 18, 518 will be able to provide for a straighter and more uniform roll-up of the flexible tarp 12.

For elongated roll bar members 18 having a larger diameter, for example a diameter of about three inches or more, the motive source 30 is preferably interconnected to a converter unit 300 that allows the motor 31 to provide more torque to the roll bar member 18, as opposed to having to use a more powerful motor (see, for example, FIGS. 19-21). Generally, the converter unit or unit 300 will be a force multiplier such as a chain drive, a gear box, a V-belt drive system or the like that multiplies the force proved by the motor 31. The convert unit 300 is preferably connected to the second or top end 24a of the arm 22a, and includes a shaft 322 that is connectable to the elongated roll bar member 18 with a coupler 323. More specifically, one preferred converted unit 300 shown in FIG. 19 includes a u-shaped frame or housing 302 with an input section 304 and an output section 306, with the housing including two side walls 308, 310 connected to each other by a web 312, with the side walls supporting first and second parallel shafts 320, 322 at respective input and output sections 304, 306. In further embodiments, the housing 302 is fully enclosed. The housing 302 is preferably small as a smaller housing will generally have a lower weight. The first and second shafts 320, 322 are rotatably supported by bearing elements 324, and each shaft 320, 322 supports a wheel 326, 328, respectively. The wheels 326, 328, which are preferably located between the side walls of the housing 302, are spaced apart from each other and which are connected to each other by an the endless belt 330, which is also preferably located between the side walls 308, 310 of the housing. Preferably, the wheels 326, 328 are sprockets and the endless belt is a chain 330 that engages teeth 327, 329, respectively, of sprockets 326, 328. The first wheel or sprocket 326, attached to the first shaft 320, is operatively connected to the motor 31, which can also be attached to the housing 302. The second wheel or sprocket 328, attached to the second shaft 322, is connectable to the elongated roll bar member 18. To prevent slippage and/or possible disengagement of the endless belt 330 from the first and second wheels 326, 328 due to slack, the unit 300 may be provided with an adjustable idler wheel 340 secured on shaft 342. Preferably, the circumference of the first wheel or sprocket 326 is smaller than the circumference of the wheel or second sprocket 328 so that the motor 31 will be able to exert a greater amount of torque to the roll bar member 18 than it would in the absence of the device. It will be appreciated that differences between the rotational speeds of the first and second sprockets 326, 328 will generally depend upon the number of teeth 327, 329 of each sprocket. For example, if the number of teeth 327 on the first sprocket 326 is one half the number of teeth 329 on the second sprocket 328, the first sprocket will rotate twice as fast as the second sprocket. However, the second sprocket 328 will have twice the torque of the first sprocket 326. Or, if the number of teeth on the first sprocket is one third of the number of teeth on the second sprocket, the first sprocket will rotate three times as fast as the second sprocket, while the second sprocket will have three times the torque of the first sprocket. In a preferred embodiment, the ratio of the number of teeth of the first sprocket to the number of teeth of the second sprocket is in the range of about 1:1 to about 1:4. More preferably, the ratio is about 1:2. Even more preferably the first sprocket has 12 teeth and the second sprocket has 26 teeth, for a ratio of about 1:2. In preferred embodiments, the motor itself will provide a drive ratio of from 60:1 to 120:1, preferably 90:1, which can then be multiplied by the multiplier effect of the converter unit 300; which, if it is 2:1, would result in a drive ratio of 180:1. Preferably, the multiplier effect of the converter unit 300, shown in FIGS. 19 and 20, is 2.16:1. The preferred, motor and converter unit combination ratio is 194.4:1. As noted in the earlier discussion of the worm gear type motors, which are preferred as a part of the motive source 30 of the present invention, the design of the worm gear acts as a stop to prevent unrolling of the roll bar member 18 when it is in a fully secured or closed position.

Now also referring to FIG. 23, certain preferred embodiments, as additionally discussed above, include a roll-up tarp apparatus having a crank arm assembly 400 for actuating movement of the elongated roll bar member 18. For example, the roll-up tarp apparatus 10 of FIG. 1 can be configured such that instead of including an arm 22a having a motive source 30, the apparatus includes a crank arm assembly 400 secured to the inner tube 419a of the elongated roll bar member. The crank arm assembly 400 further includes a shaft 436. Preferably, the inner tube 419a and the shaft 436 include corresponding adaptors 442, 444 that can be connected to form a universal joint 440. An operator can grasp and rotate the shaft 436 such that the elongated roll bar member will correspondingly rotate to move the roll bar member into the secured or open position, respectively.

Figure 32:
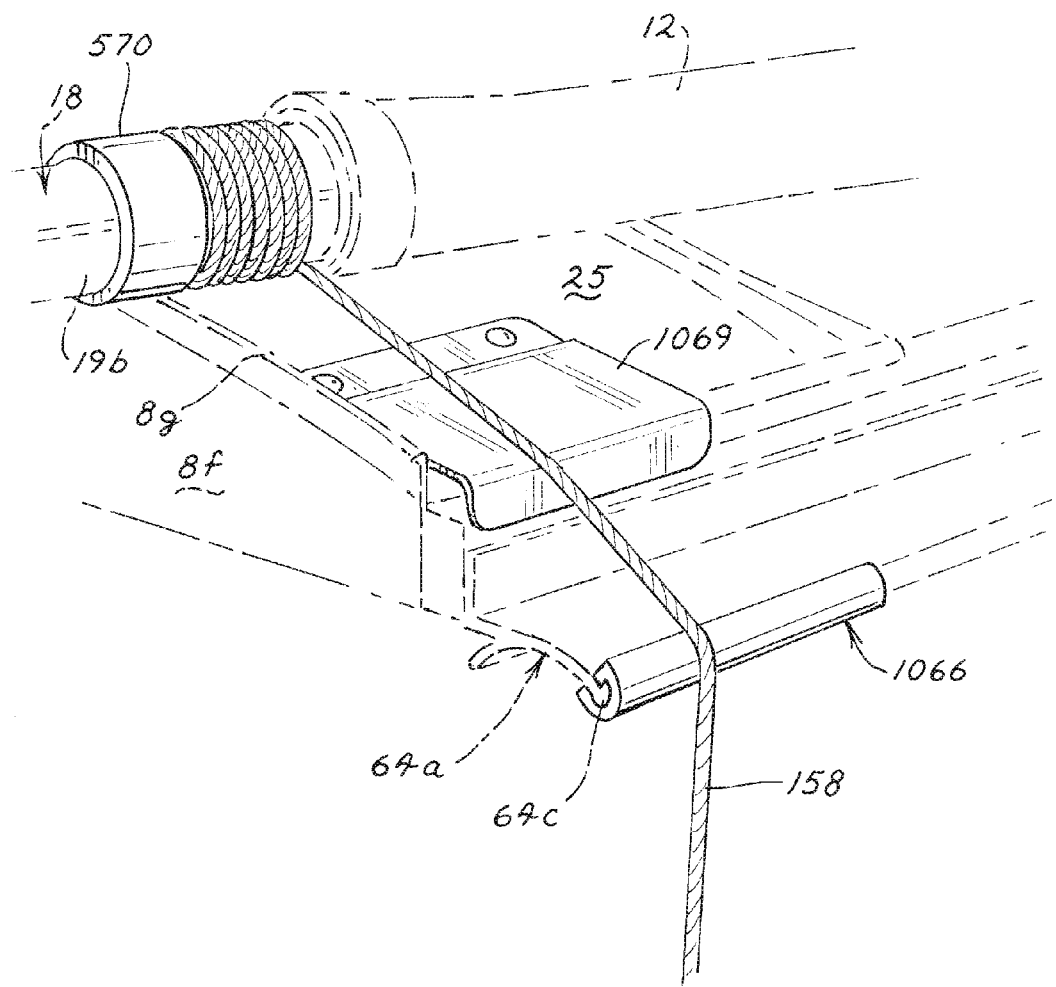
FIG. 32 is a partial, perspective view of a roll-up tarp apparatus having a latch plate cap 1066 and a head cap 1069 to protect the cord 158 from abrasion.

FIG. 32 generally illustrates a preferred latch plate 64a, as also shown in FIG. 2B, having a latch plate cap or cover 1066. The latch plate cover 1066 preferably slides over at least a portion of the latch plate(s) 64a and creates a smooth, almost slippery surface for the cord 158 and tarp 12 to pass over to reduce abrasion, thus improving the useful life of the cord 158 and the tarp 12. The preferred latch plate cap 1066 is made of extruded T6 aluminum that is hard anodized. Hard anodizing produces a much thicker coating of aluminum oxide, penetrating holes and fissures in the surface in the latch plate cap to create a more uniform and smooth surface. Stainless steel and the like can also be used. Therefore, with respect to the cord 158, the latch plate cap 1066 has a coefficient of friction that is less than the coefficient of friction of the latch plate 64a. The preferred latch plate cover 1066 is arranged and configured such that the latch plate cover 1066 can be installed by generally sliding the latch plate cover 1066 over the edge of the latch plate 64a. In even more preferred embodiments, one end of the latch plate cover is crimped (not shown) so that it is more difficult to slide the last portion of the latch plate cover 1066 over the latch plate 64a, perhaps requiring a hammer to tap the crimped end of the latch plate cover to force fit the cover over the latch plate. As will be understood, the crimped end generally secures the latch plate cover to the latch plate.

Alternatively, the latch plate, selected portions of the latch plate, or even the entire latch plate itself, can be hard anodized to achieve similar results.

Figure 33:
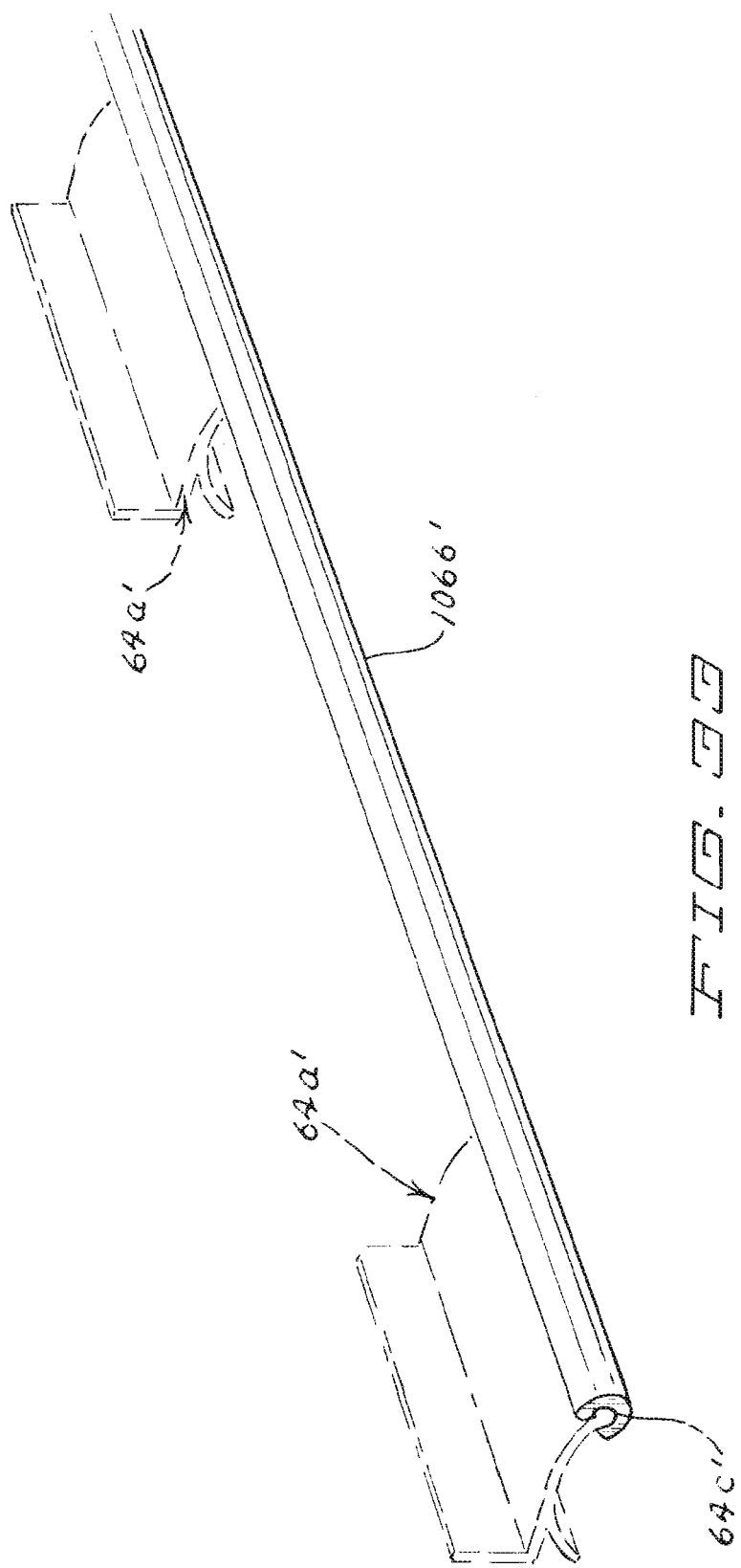
FIG. 33 is a partial, perspective view of an alternate embodiment including a plurality of latch plate sections 64a', similar to that of FIG. 11, having a latch plate cover 1066' secured to and bridging the respective latch plate sections 64a'.

Yet another alternate embodiment, as illustrated in FIG. 33, includes a latch plate that includes a plurality of sections 64a' as is illustrated in FIGS. 11 and 33. Such embodiments preferably further include a latch plate cover 1066' that generally bridges the latch plate sections 64a'. This embodiment is preferred in that as the flexible tarp (not shown) moves over the latch plate sections 64a', the flexible tarp contacts the generally non-abrasive latch plate cover 1066', which covers abrasive outer edges 64c' of each of the respective latch plate sections 64a'.

It is further preferred that the roll-up tarp apparatus include a wear plate 1069 as is generally illustrated in FIG. 32. The wear plate 1069 is secured to the upper surface 25 of the end cap 8f proximate the position where the cord 158 would contact the end cap 8f and/or side of the truck box 6. Similar to the latch plate cap 1066, the preferred wear plate 1069 is made of T6 aluminum that is hard anodized, stainless steel, or the like such that when the cord 158 moves against the head cap 1069, friction is reduced, thus increasing the useful life of the cord. The upper surface 25 of the end cap 8f is protected from wear that could create a groove having a sharp edge that could cut or abrade the cord 158.

In even further preferred embodiments, as illustrated in FIGS. 26, 27 and 32, for example, the elongated roll bar 18, 518 further includes a band 570 to protect the upper ridge or air dam 8g of the end cap 8f and the outer tube 19b of the elongated roll bar 18 as the elongated roll bar moves across the upper ridge 8g of the end cap 8f. Such a band 570 can be made of plastic or rubber, preferably engineered plastic, polycarbonate, polyvinyl chloride (PVC) or the like such that as the elongated roll bar 18 moves across the upper ridge 8g at the top of the end cap 8f, the band 570 contacts the end cap 8f, thus minimizing abrasive contact between the outer tube 19b and the respective end cap 8f to reduce, if not eliminate, wear on both the upper ridge 8g and the roll bar 18. It will be appreciated that a band of this type can be positioned at the opposite end to protect the elongated roll bar and the upper ridge of the end cap at the other end of the truck box.

An additional preferred roll-up tarp assembly 1110 is illustrated in FIGS. 34-41A and 42. The roll-up tarp assembly 1110, at least one lateral edge 1116a, 1116b of the flexible tarp 1112 includes at least one magnet 1188 that can releasably secure the flexible tarp 11112 to the top surface 25 of the respective end cap 8e, 8f when the respective end cap 8e, 8f, or, in the alternative at least the upper surface 25 of the respective end cap 8e, 8f is made of ferromagnetic material to which a magnet is attracted and the flexible tarp 1112 is in the secured position. The ferromagnetic material will preferably be sheet steel or ferromagnetic stainless steel. In preferred embodiments this material will be galvanized sheet steel. In preferred embodiments, the magnets 1188 are secured to the tarp 1112 with caps 1180, wherein each cap 1180 includes a head 1182, a stem 1184 and a base 1186, wherein the base 1186 and stem 1184 can be inserted through an aperture 1190 in the magnet 1188 and the base 1186 can be compressed with a tool (not shown) that will expand the diameter of the base as compared to the stem to flare out the base and secure the magnet 1188 to the edges 1116a, 1116b of the flexible tarp 1112, as is generally illustrated in FIGS. 34, 35, 43 and 44. Although not required, it is preferred that each lateral end 1116a, 1116b include a plurality of caps 1180 and corresponding magnets 1188, spaced generally equidistant from each other. Preferably, the magnets 1188 are spaced apart, one for every 6 inches or so, preferably about every 8 inches to about 12 inches or more, depending on the application. The inventor found that if the magnets 1188 are spaced closely together, the flexible tarp 1112 rolls up thicker on the elongated roll bar 1118 and is less preferred. Magnets 1188 are provided to prevent wear and tear on the flexible tarp 1112 due to wind and the like, as well as to secure the cargo within the truck box. It is envisioned that the magnets will prevent wear and tear on both the front end of the tarp and the rear end of the tarp during hauling when the roll tarp is in use to cover a load. During long hauls, especially in windy parts of the world, the edges of the tarp will generally beat against the head caps uncontrollably if there is any extra tarp that is not pulled tightly across the end cap. It will be appreciated that it is this wear and tear that causes a lot of damage to the tarp and can lead a need to replace the tarp prematurely. Using magnets 1188 to hold the edges of the tarp down is one of the best ways to protect the tarp from such a need. It will be understood that the flexible tarp 1112, including magnets 1188, can be used in all other embodiments disclosed herein as well. It will be further understood that the magnets 1188 need not be secured to the tarp 1112 with caps 1180 but other devices and methods can be used, as well, such as plastic enclosures in which magnets are enclosed (not shown) that can be secured to the tarp by adhesive bonding, RF (radio frequency) welding, heat sealing, sewing and the like.

Figure 41A:
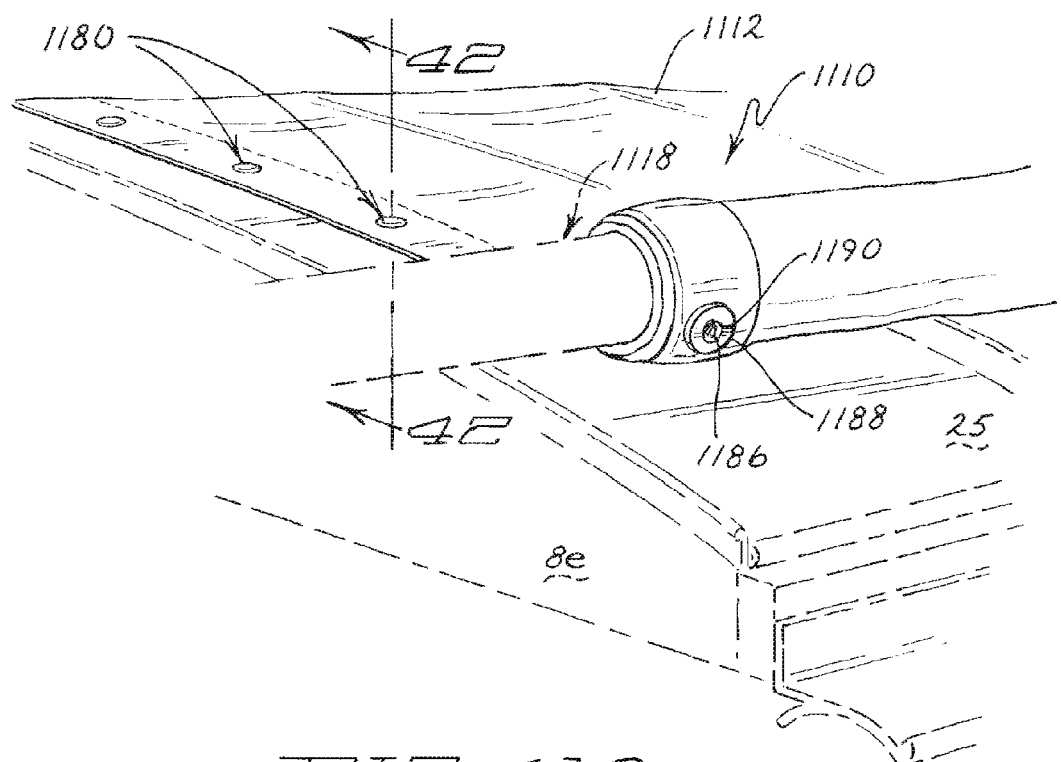
FIG. 41A is an enlarged, partial view of the roll-up tarp assembly 1110 of FIG. 34 illustrating the magnets 1188 connected to the flexible tarp 1112 with caps 1180.
Figure 41B:
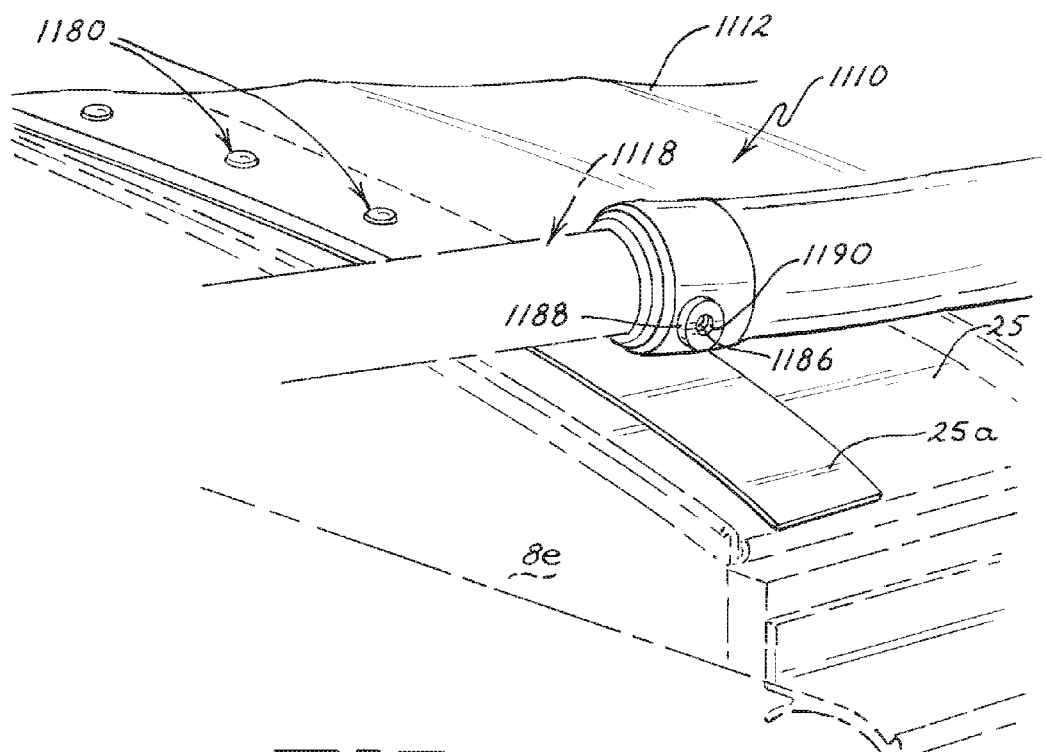
FIG. 41B is an enlarged, partial view of the roll-up tarp assembly 1110 of FIG. 34 illustrating the magnets 1188 connected to the flexible tarp 1112 with caps 1180; except that the end cap 8e is equipped with a strip of galvanized steel 25a that is need when the end cap 8e or even just the top surface 25 of the end cap is made of aluminum or other non-ferromagnetic materials.
Figure 41C:
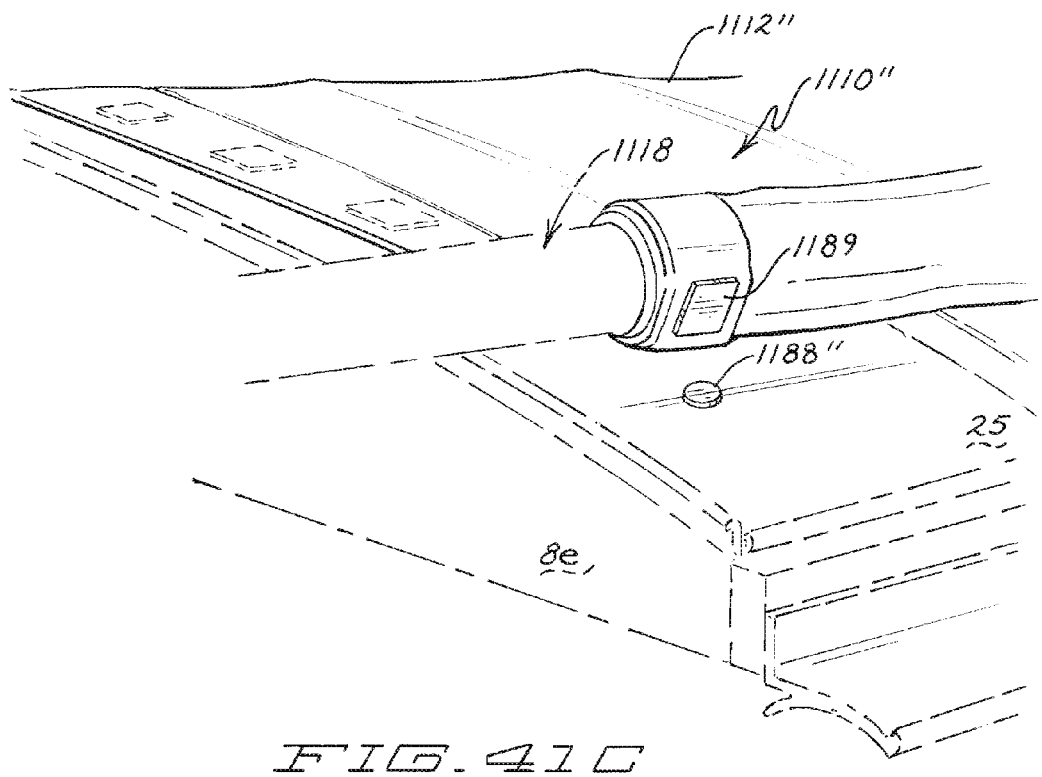
FIG. 41C is an enlarged, partial view of an alternate roll-up tarp assembly 1110" similar to that shown in FIGS. 34 and 41A, but in this case illustrating the magnets 1188" connected to the upper surface 25 of the end cap 8e and a small ferromagnetic plate 1189 secured to an edge of an alternate tarp 1112"

Referring now specifically to FIGS. 41B and 41C, alternate approaches to the use of magnetic attraction to hold the edge of the flexible tarp 1112 down onto the upper surface of the end cap 8e, 8f are also disclosed. As shown in FIG. 41B a ferromagnetic strip, preferably rolled steel sheet material, galvanized sheet steel or ferromagnetic stainless steel is secured onto the top surface 25 of the end cap 8e to provide a surface to which the magnet 1188 will be attracted. The strip can be attached with heavy duty two sided adhesive tape or by other means such as bolting or the like. In FIG. 41C the magnets 1188" are attached to the upper surface 25 of the end cap 8c using such heavy duty adhesive tape and strips 1189 of ferromagnetic material, such as galvanized steel or the like are attached to the lower side of the edge of the flexible tarp 1112" so that the magnets 1188" can attract the strips 1198 and hold the tarp 1112" down on the upper surface 25 of the end cap 8e.

Referring now also to FIGS. 34-44, the roll-up tarp assembly 1110 further includes two brackets 1798a, 1798b that secure each arm 1122a, 1122b to the respective side 8a, 8c of the truck box. Front and rear arms 1122a, 1122b are largely similar to each other. The arm that does not include a converter unit 1130 having a motor 1331, in this case rear arm 1122b, can include a crank connector 1128 in case of motor failure. Each arm 1122a, 1122b includes a top end 1124a, 1124c telescopically connected to a bottom end 1124b, 1124d. The front and rear arms 1122a, 1122b are preferably biased with a lower biasing member 1800 similar to that shown with respect to FIG. 29. Basing member 1800 is preferably attached to a bracket 1798b that is secured to the side of the truck box 6 with corresponding second bracket 1798a with nuts and bolts 1798c, 1798d, 1798e (see in particular, FIGS. 35 and 37). Bolt 1798e is preferably arranged and configured such to allow the bracket 1798b to pivot to accommodate slanted sidewalls 8c'. The bracket 1798b having a rod or post 1793 on which one or more clock springs 1802 or the like can be secured. Preferably, bushings 1796 are secured around the rod 1793 proximate where the rod 1793 is inserted through the connecting portion 1727. The clock spring(s) 1802 can also be secured to a bolt 1803 of the connecting portion 1727 of the arm 1722b such that the clock springs 1802 bias the arm 1722b in the unroll direction. In various preferred embodiments, the connecting portion 1727 includes a plurality of apertures 1794 such that the bolt 1803 can be positioned at different positions such that the amount of bias is adjustable. The connecting portion 1727 can be sized such that the clock springs 1802 are generally contained by the connecting portion and the clock springs will not move laterally along the rod 1793. The lower biasing member 1800 of FIG. 35 can be used with all various arms disclosed herein as desired.

Figure 34:
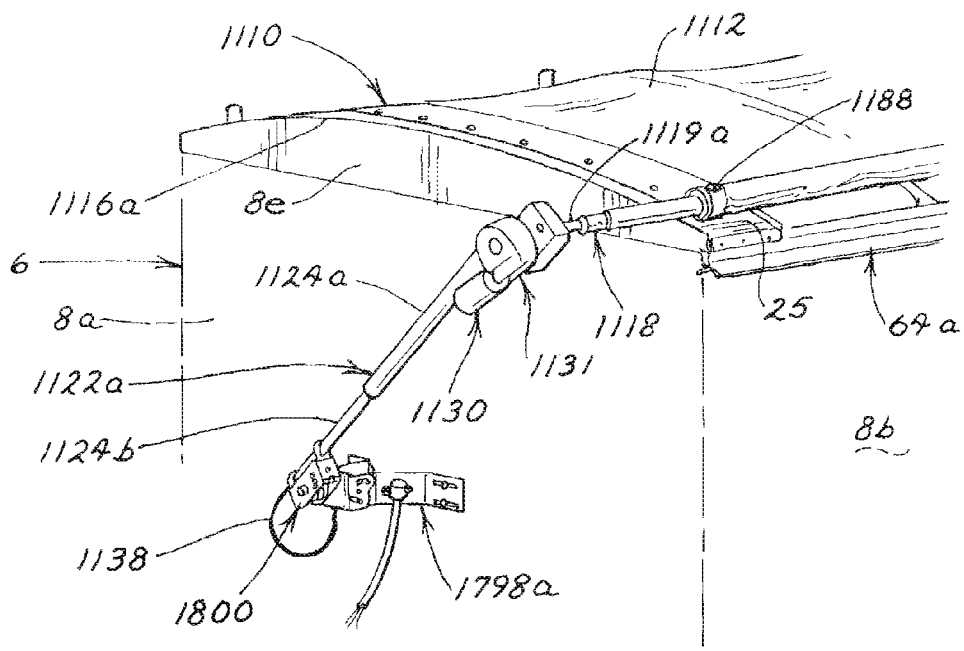
FIG. 34 is a partial, perspective view of a front end of an alternate roll up tarp assembly 1110, largely similar to that shown in FIG. 11; the roll-up tarp assembly 1110 includes a flexible tarp 1112 having a plurality of magnets 1188 that can secure the flexible tarp 1112 to end caps 8e, 8f (not shown; see FIG. 35)
Figure 35:
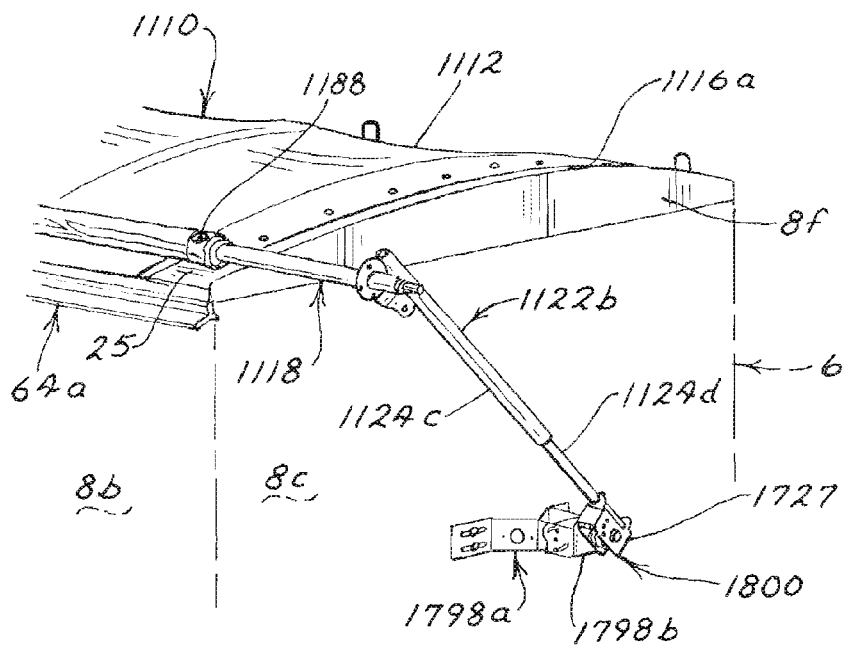
FIG. 35 is a partial, perspective view somewhat similar to FIG. 34, but at a different angle of that shown in FIG. 34 and of a rear end of the roll-up tarp assembly 1110 of FIG. 34, showing the rear end of the trailer 6 and a rear arm 1112b of the roll-up tarp assembly 1110.
Figure 96:
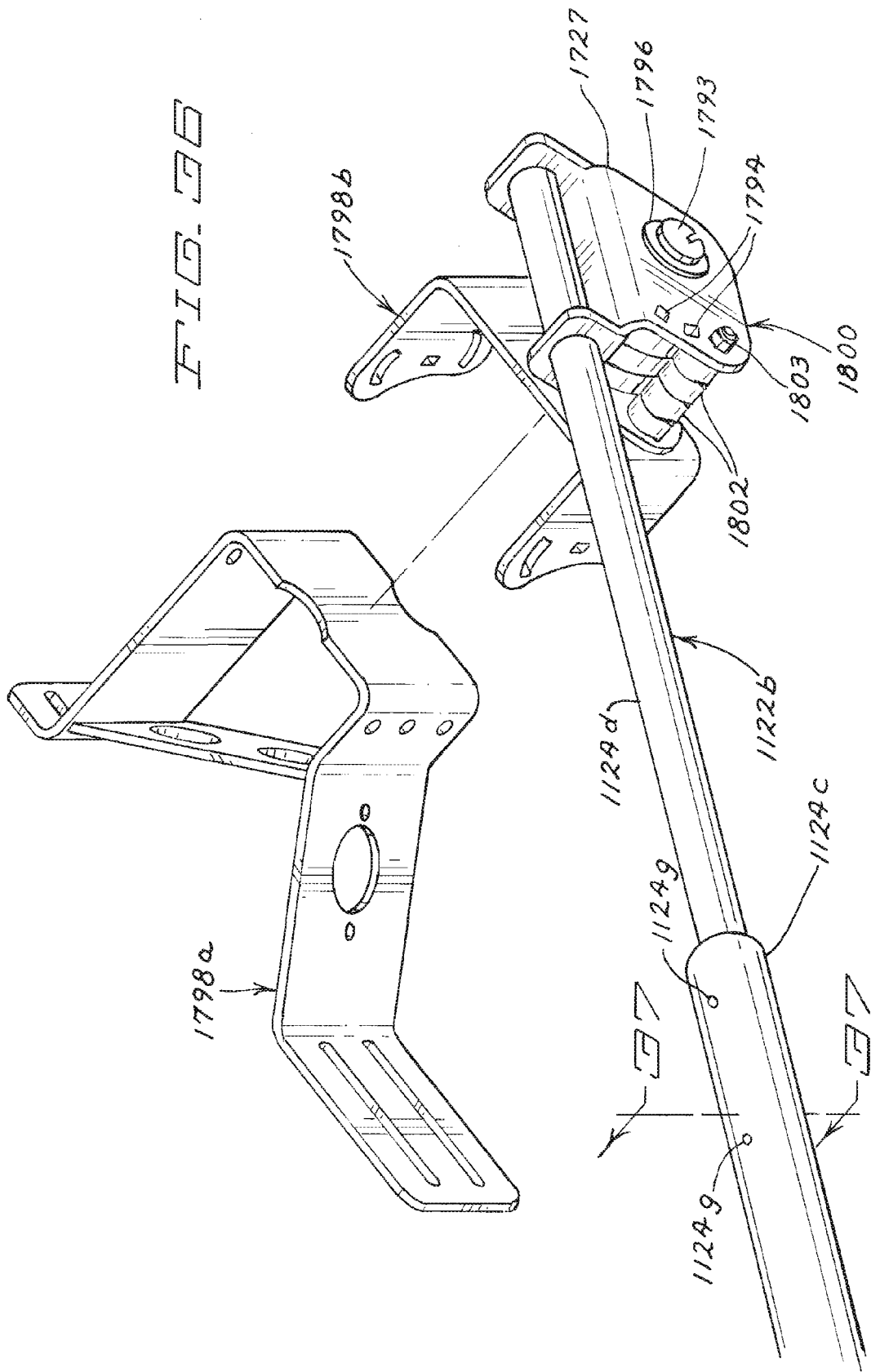

Further preferred embodiments include an arm 1122a, either front arm 1122a or rear arm 1122b or both, each having a hollow interior 1124j, wherein at least one electrical cable 1138 or the like (not shown) can be located within the hollow interior 1124j to protect the cable 1138 from snagging and the elements, for example. The electrical cable(s) 1138, when inserted, can extend from converter unit 1130, as shown in FIG. 34, through the generally hollow interior 1124j of the arm 1122a and then to the power source (see, for example, electrical power source 33 of FIG. 1). The front arm 1122a, shown in FIG. 34 and the rear arm 1122b, shown in FIGS. 35-44, will be made in the same manner and will preferably have the same components, with the exception that the front arm generally encases or houses the electrical cables 1138. Referring now also to FIG. 35, the upper portion 1124c of the rear arm 1122b preferably includes at least one friction-reducing cylindrical wear plate 1124e, that acts as a bushing, just as the front arm 1122a does. The wear plate 1124e, shown in FIG. 38, can be secured to the upper portion 1124c with set screws 1124g or the like. The lower arm 1124d preferably includes a corresponding wear plate 1124i that is secured to the lower arm 1124d with at least one collar 1124f, preferably one collar 1124f at each end of the wear plate 1124i. The wear plate(s) 1124e, 1124i can be made of can be made of a variety of smooth, lightweight materials such as nylon or the like. The collars 1124f, which hold the lower arm wear plate 1124i in place on the lower arm 1124d, are in turn preferably held in place with set screws 1124k. In further preferred embodiments, the end of the lower arm 1124d includes a plug 1124h to create a smooth end and to save the step of deburring the end of the lower arm 1124d. Alternatively, the end of the lower arm 1124d is debrurred to prevent any damage to the cords 1138 running through the arm 1122a. In operation, when the upper arm 1124c slides upwardly with respect to the lower arm 1124d, the wear plate 1124e of the upper arm 1124c will eventually contact the collar 1124f of the lower arm, thus limiting the movement of the upper arm 1124c with respect to the lower arm 1124d and preventing the upper arm 1124c from disconnecting from the lower arm 1124d. The front arm 1122*a* has electrical cables 1138 running through the length of a structure that is generally exactly the same as the rear arm 1122*b* described immediately above and shown in FIG. 38.

Figure 37:
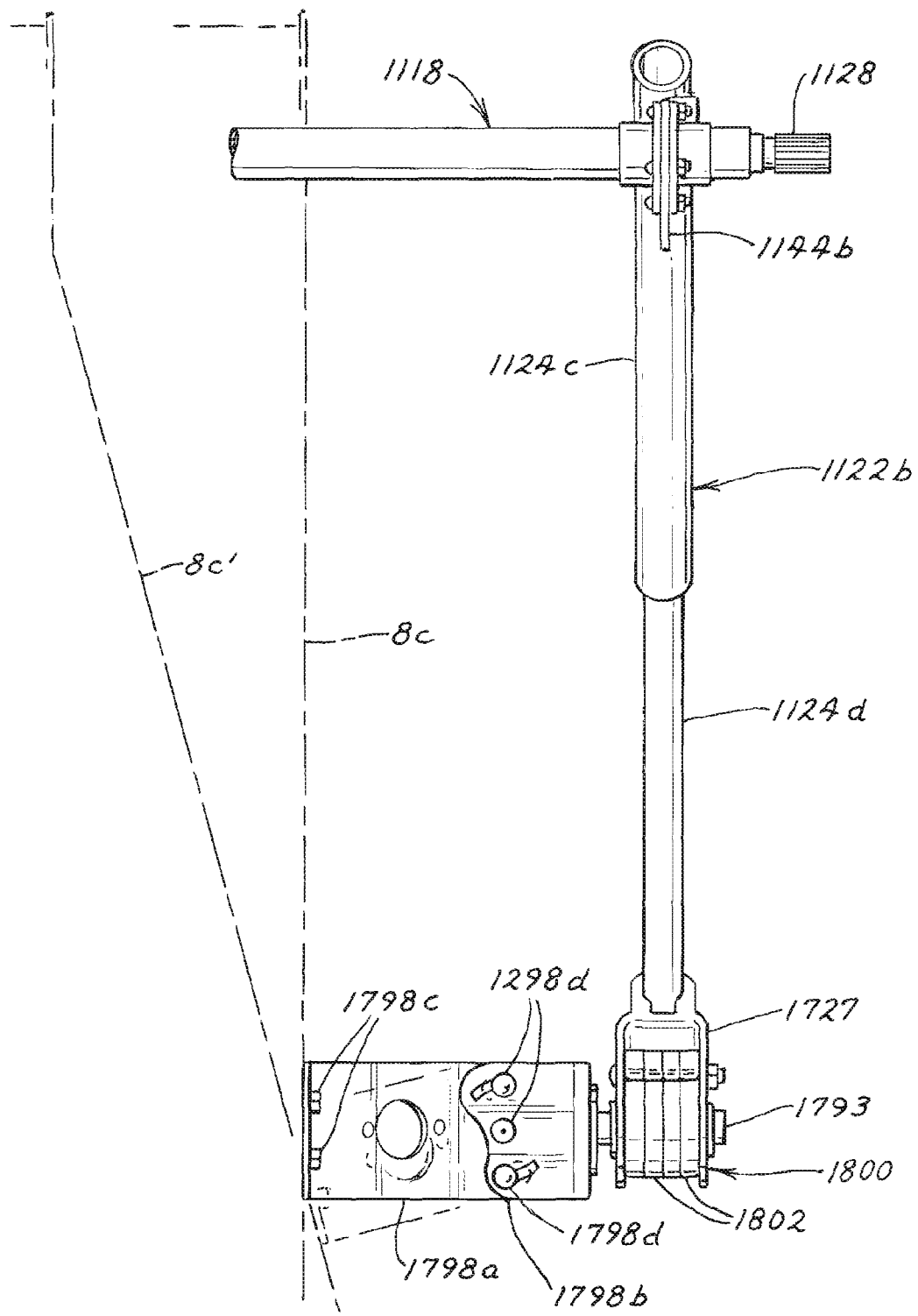
FIG. 37 is a partial, end view of the arm 1122b of FIG. 35.
Figure 38:
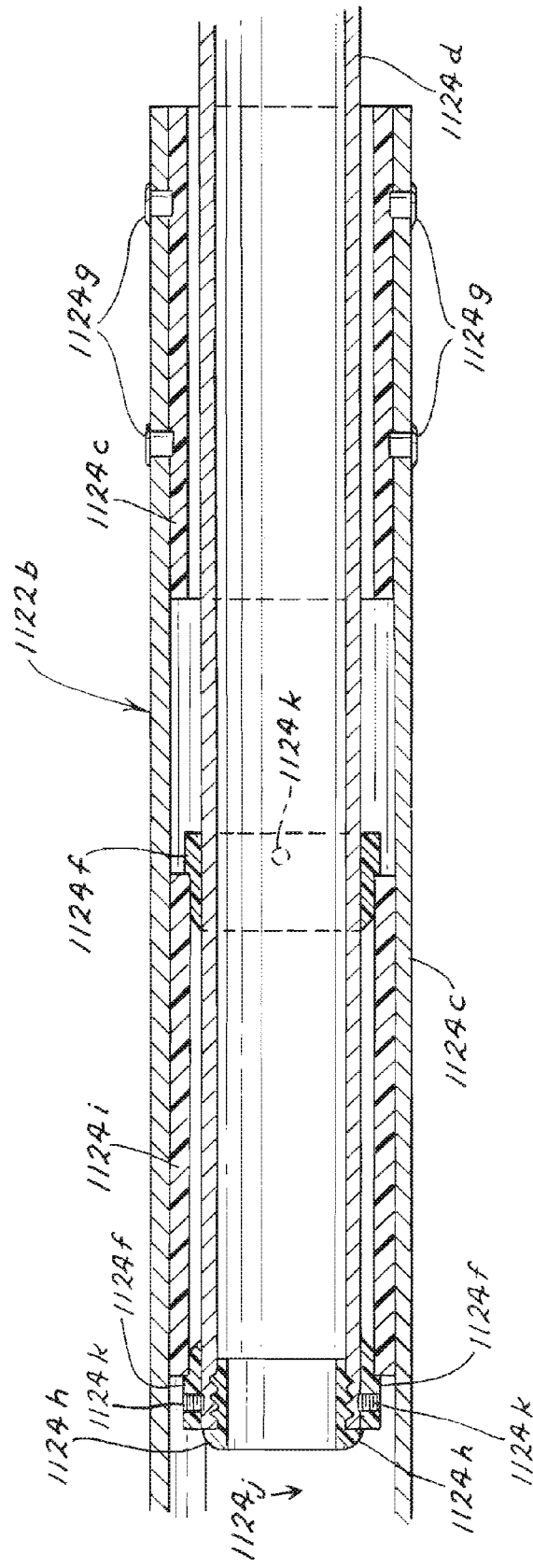
FIG. 38 is a partial, cross-sectional view of the arm 1122b of FIG. 36 as viewed along line 38-38 of FIG. 36.
Figure 39:
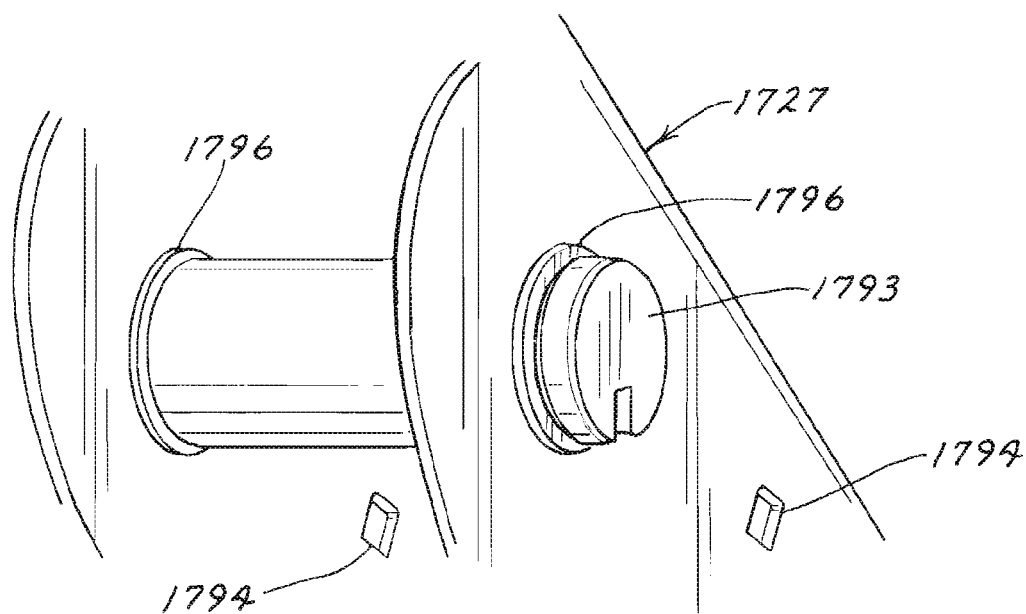
FIG. 39 is a partial, perspective view of a post 1793 of the connecting portion 1727 of the rear arm 1122b of FIG. 37 (with clock springs 1802 removed for clarity)
Figure 40:
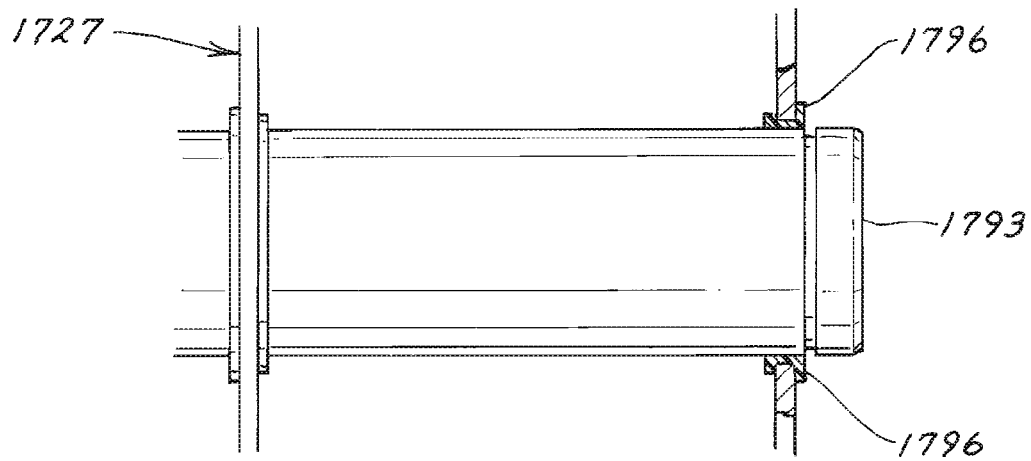
FIG. 40 is a partial front view of the connecting portion 1727 of the rear arm 1122b of FIG. 39 with part of the connecting portion removed for clarity.
Figure 42:
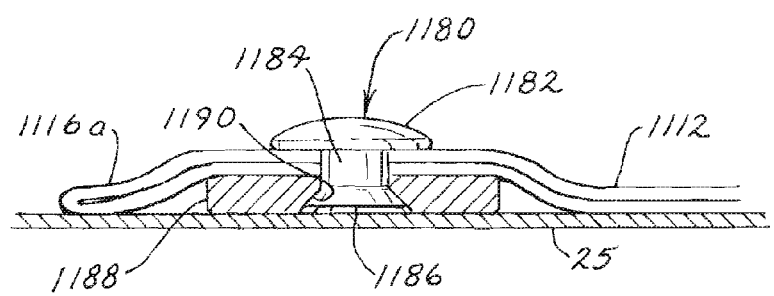
FIG. 42 is a partial, cross-sectional view of one magnet 1188 securing the flexible tarp 1112 to the top surface 25 of an end cap 8e of FIGS. 34 and 41A, as viewed along line 44-44 of FIG. 41A.
Figure 44:
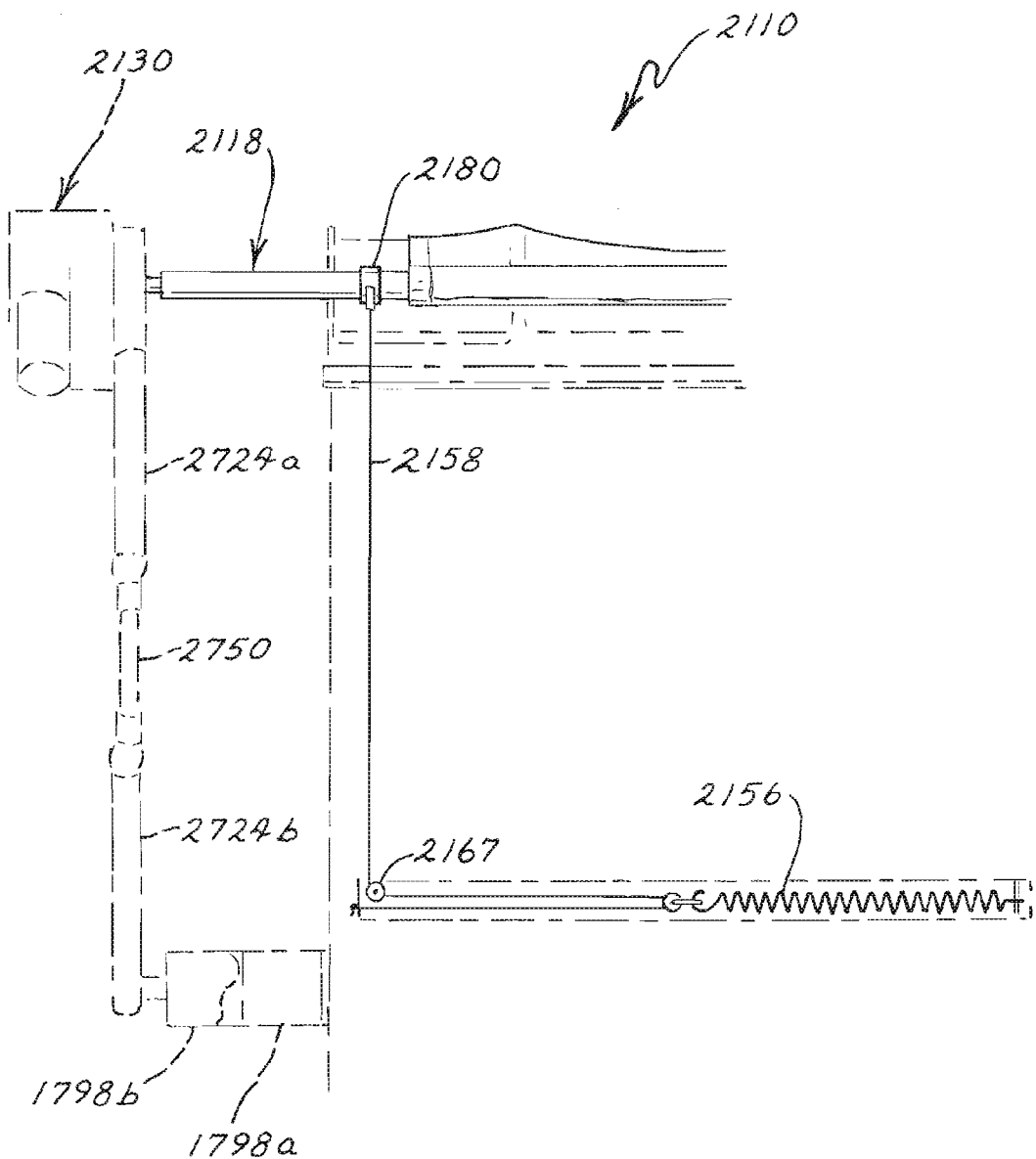
FIG. 44 is a partial, side view of one preferred biasing member 2150 that can be used in conjunction with the roll-up tarp apparatus 2110 of FIG. 34.

Another alternate roll-up tarp assembly 2110 is illustrated in FIGS. 43-44. The roll-up tarp assembly 2110 is largely similar to that of previously disclosed embodiments and includes at least one arm 2122 having upper and lower ends 2124*a*, 2124*b* interconnected by a flexible hose 2750. The hose 2750 does not include an inner spring, but still provides biasing force to assist conversion unit 2130 in moving the arm 2122 in a closed position. In preferred embodiments, each arm 2122 is connected to the truck box 6 with first and second brackets 2798*a*, 2798*b* as are also shown in FIGS. 35 and 37. The roll-up tarp apparatus is preferably arranged and configured such that the arm 2122 is biased in the closed position with an upper biasing member 2150 having a cord 2158 that is connected to an elongated biasing member 2118 with a collar 2180. The cord 2158 is connected to an elastic member 2156, such as a spring. A pulley, roller or other device 2167 can be positioned at the edge for the truck box 6 to guide the cord 2158. A portion of the cord 2158 and the elastic member 2156 can be placed within a housing 2160 to protect these components and users of the roll-up tarp apparatus 2110.

An alternate preferred upper biasing member arrangement is illustrated in FIGS. 45A-45B. In this embodiment, a biasing member 3150 including an elastic member 3156 and cord 3158 are positioned on the end 8*a* of the truck box 6, proximate the end cap 8*e*. The cord 3158 is interconnected to the elastic member 3156 with pulley 3266*a*. Furthermore, two pulleys or rollers 3266*b* can be used to guide the cord 3158 to an elongated roll bar 3118. FIG. 45A illustrates the elongated roll bar member 3118 in the full open position against support post 65, in where the elastic member 3156 is stretched. FIG. 45B illustrates the elongated roll bar member 3118 in a full closed position, in where the elastic member 3156 is not as stretched.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A roll-up tarp apparatus for attachment to an open top truck trailer, the open top truck trailer having a truck box, the truck box having a top opening, two ends and first and second longitudinal sides, the truck box being further equipped with end caps at each of the two ends, wherein each end cap partially covers the top opening; the roll-up tarp apparatus comprising:
   a flexible tarp, the tarp having first and second lateral edges and first and second longitudinal edges; wherein the first longitudinal edge can be interconnected to the first longitudinal side of the truck box; and wherein at least one magnet is secured proximate at least one lateral edge;
   an elongated roll bar member attached to the second longitudinal edge of the tarp; the elongated roll bar member having first and second ends; wherein the tarp can be wound around the elongated roll bar member such that the respective lateral edges of the flexible tarp are wound around the elongated roll bar along with the at least one magnet, which is attached thereto, when the flexible tarp is gathered on the elongated roll bar; and
   an arm connecting to the elongated roll bar member to the truck box; wherein the arm can selectively actuate movement of the elongated roll bar member over the top opening of the truck box in both an unroll direction to position the tarp in a secured position and a roll-up direction to secure the tarp in an open position, when the flexible tarp is gathered on the elongated roll bar;
   wherein the at least one magnet is configured to releasably secure the flexible tarp to one of the respective end caps when the flexible tarp is unwound from around the elongated roll bar and is in the secured position.

2. The roll-up tarp apparatus of claim 1, wherein a plurality magnets are secured proximate the one lateral edge of the tarp.

3. The roll-up tarp apparatus of claim 1, wherein at least one magnet is secured proximate each lateral edge of the tarp.

4. The roll-up tarp apparatus of claim 3, wherein a plurality of magnets are secured proximate each lateral edge of the tarp.

5. The roll-up tarp apparatus of claim 1, further comprising a latch plate that is arranged and configured to be secured to and extend along at least a portion of the second longitudinal side of the truck box.

6. The roll-up tarp apparatus of claim 5, wherein the latch plate further includes an outer longitudinal edge having a rounded surface; the latch plate further including a latch plate cap secured over at least a portion of the rounded surface.

7. The roll-up tarp apparatus of claim 1, wherein the arm includes a hollow interior, wherein a cable is located within the hollow interior; wherein a friction-reducing sleeve is positioned at least partially within the hollow interior to reduce wear on the cable.

8. The roll-up tarp apparatus of claim 1, wherein the arm is operated by a crank.

9. The roll-up tarp apparatus of claim 1, wherein the arm is operated with a motive source.

10. The roll-up tarp apparatus of claim 9, wherein the arm has first and second ends, the first end connected to the motive source and the second end pivotally connected to the truck box; wherein the arm includes a first section, a second section and a biasing member; wherein the first and second sections are interconnected by the biasing member; wherein the biasing member is selected from the group consisting of a conduit, a hose, a spring and a combination thereof.

11. The roll-up tarp apparatus of claim 5, further comprising a biasing member interconnected between the truck box and the elongated roll bar member, the biasing member including:
   a generally non-elastic cord interconnected to one end of the elongated roll bar member; wherein the cord can wind around the elongated roll bar member as the elongated roll bar member moves in the unroll direction; and
   a tensioning element having a first end and a second end, wherein the first end of the tensioning element is interconnected to the cord and the second end of the tensioning element can be interconnected to the second longitudinal side of the truck box when the roll-up tarp apparatus is operatively secured to the truck box, such that the biasing member biases the elongated roll bar member in the unroll direction; wherein the generally non-elastic cord slides over one of the end caps and the latch plate when the elongated roll bar member moves away from the open position toward the secured position.

12. A roll-up tarp apparatus for attachment to an open top truck trailer, the open top truck trailer having a truck box, the truck box having a top opening, two ends and first and second longitudinal sides, the truck box being further equipped with end caps at each of the two ends, wherein each end cap partially covers the top opening; the roll-up tarp apparatus comprising:
- a flexible tarp, the tarp having first and second lateral edges and first and second longitudinal edges; wherein the first longitudinal edge can be interconnected to the first longitudinal side of the truck box; and wherein a plurality of magnets are secured proximate at least one lateral edge;
- an elongated roll bar member attached to the second longitudinal edge of the tarp; the elongated roll bar member having first and second ends; wherein the flexible tarp can be wound around the elongated roll bar member such that the respective lateral edges of the flexible tarp are wound around the elongated roll bar along with at least one magnet, which is attached thereto when the flexible tarp is gathered on the elongated roll bar; and
- an arm connecting to the elongated roll bar member to the truck box; wherein the arm can selectively actuate movement of the elongated roll bar member over the top opening of the truck box in both an unroll direction to position the tarp in a secured position and a roll-up direction to secure the tarp in an open position when the flexible tarp is gathered on the elongated roll bar;
- wherein the plurality of magnets are configured to releasably secure the flexible tarp to one of the respective end caps when the flexible tarp is unwound from around the elongated roll bar and is in the secured position.

13. The roll-up tarp apparatus of claim 12, wherein a plurality of magnets are secured proximate each lateral edge of the tarp.

14. The roll-up tarp apparatus of claim 12, further comprising a latch plate that is arranged and configured to be secured to and extend along at least a portion of the second longitudinal side of the truck box.

15. The roll-up tarp apparatus of claim 14, wherein the latch plate further includes an outer longitudinal edge having a rounded surface; the latch plate further including a latch plate cap secured over at least a portion of the rounded surface.

16. The roll-up tarp apparatus of claim 12, wherein the arm includes a hollow interior, wherein a cable is located within the hollow interior; wherein a friction-reducing sleeve is positioned at least partially within the hollow interior to reduce wear on the cable.

17. The roll-up tarp apparatus of claim 12, wherein the arm is operated by a crank.

18. The roll-up tarp apparatus of claim 12, wherein the arm is operated with a motive source.

19. The roll-up tarp apparatus of claim 18, wherein the arm has first and second ends, the first end connected to the motive source and the second end pivotally connected to the truck box; wherein the arm includes a first section, a second section and a biasing member; wherein the first and second sections are interconnected by the biasing member; wherein the biasing member is selected from the group consisting of a conduit, a hose, a spring and a combination thereof.

20. The roll-up tarp apparatus of claim 14, further comprising a biasing member interconnected between the truck box and the elongated roll bar member, the biasing member including:
- a generally non-elastic cord interconnected to one end of the elongated roll bar member; wherein the cord can wind around the elongated roll bar member as the elongated roll bar member moves in the unroll direction; and
- a tensioning element having a first end and a second end, wherein the first end of the tensioning element is interconnected to the cord and the second end of the tensioning element can be interconnected to the second longitudinal side of the truck box when the roll-up tarp apparatus is operatively secured to the truck box, such that the biasing member biases the elongated roll bar member in the unroll direction; wherein the generally non-elastic cord slides over one of the end caps and the latch plate when the elongated roll bar member moves away from the open position toward the secured position.

21. A roll-up tarp apparatus for attachment to an open top truck trailer, the open top truck trailer having a truck box, the truck box having a top opening, two ends and first and second longitudinal sides, the truck box being further equipped with end caps at each of the two ends, wherein each end cap partially covers the top opening; the roll-up tarp apparatus comprising:
- a flexible tarp, the tarp having first and second lateral edges and first and second longitudinal edges; wherein the first longitudinal edge can be interconnected to the first longitudinal side of the truck box; wherein a plurality of magnets are secured proximate each lateral edge;
- a latch plate that is arranged and configured to be secured to and extend along at least a portion of the second longitudinal side of the truck box;
- an elongated roll bar member attached to the second longitudinal edge of the tarp; the elongated roll bar member having first and second ends; wherein the tarp can be wound around the elongated roll bar member;
- front and rear arms connecting to the elongated roll bar member to the truck box; wherein at least one arm can selectively actuate movement of the elongated roll bar member over the top opening of the truck box in both an unroll direction to position the tarp in a secured position and a roll-up direction to secure the tarp in an open position; wherein the plurality of magnets are configured to releasably secure the flexible tarp to the end cap when the flexible tarp is in the secured position;
- a biasing member interconnected between the truck box and the elongated roll bar member, the biasing member including:
  - a generally non-elastic cord interconnected to one end of the elongated roll bar member; wherein the cord can wind around the elongated roll bar member as the elongated roll bar member moves in the unroll direction; and
  - a tensioning element having a first end and a second end, wherein the first end of the tensioning element is interconnected to the cord and the second end of the tensioning element can be interconnected to the second longitudinal side of the truck box when the roll-up tarp apparatus is operatively secured to the truck box, such that the biasing member biases the elongated roll bar member in the unroll direction; wherein the generally non-elastic cord slides over one of the end caps and the latch plate when the elongated roll bar member moves away from the open position toward the secured position.

22. The roll-up tarp apparatus of claim 21, wherein a plurality of magnets are secured proximate each lateral edge of the tarp.

23. The roll-up tarp apparatus of claim 21, further comprising a latch plate that is arranged and configured to be secured to and extend along at least a portion of the second longitudinal side of the truck box.

24. The roll-up tarp apparatus of claim 23, wherein the latch plate further includes an outer longitudinal edge having a rounded surface; the latch plate further including a latch plate cap secured over at least a portion of the rounded surface.

25. The roll-up tarp apparatus of claim 21, wherein the arm includes a hollow interior, wherein a cable is located within the hollow interior; wherein a friction-reducing sleeve is positioned at least partially within the hollow interior to reduce wear on the cable.

26. The roll-up tarp apparatus of claim 21, wherein the arm is operated by a crank.

27. The roll-up tarp apparatus of claim 21, wherein the arm is operated with a motive source.

28. A method of securing roll-up tarp apparatus in a closed position over an open top truck trailer, the open top truck trailer having a truck box, the truck box having a top opening, two ends and first and second longitudinal sides, the truck box being further equipped with end caps at each of the two ends, wherein each end cap partially covers the top opening; the method comprising:
   providing a roll-up tarp apparatus including:
      a flexible tarp, the tarp having first and second lateral edges and first and second longitudinal edges; wherein the first longitudinal edge can be interconnected to the first longitudinal side of the truck box; wherein at least one magnet is secured proximate one lateral edge;
      an elongated roll bar member attached to the second longitudinal edge of the tarp; the elongated roll bar member having first and second ends; wherein the tarp can be wound around the elongated roll bar member; and
      an arm connecting to the elongated roll bar member to the truck box;
   wherein the arm can selectively actuate movement of the elongated roll bar member over the top opening of the truck box in both an unroll direction to position the tarp in a secured position and a roll-up direction to secure the tarp in an open position; and
   rolling the flexible tarp over the top opening such that the at least one magnet releasably secures the flexible tarp to the respective end cap.

29. The method of claim 28, wherein a plurality magnets are secured proximate the one lateral edge of the tarp such that during the step of rolling, the plurality of magnets releasably secure the flexible tarp to the respective end cap.

30. The method of claim 28, wherein at least one magnet is secured proximate each lateral edge of the tarp such that during the step of rolling, the plurality of magnets releasably secure the flexible tarp to the respective end cap.

31. The method of claim 30, wherein a plurality of magnets are secured proximate each lateral edge of the tarp.

32. A roll-up tarp apparatus for attachment to an open top truck trailer, the open top truck trailer having a truck box, the truck box having a top opening, two ends and first and second longitudinal sides, the truck box being further equipped with end caps at each of the two ends, wherein each end cap partially covers the top opening; the roll-up tarp apparatus comprising:
   a flexible tarp, the tarp having first and second lateral edges and first and second longitudinal edges; wherein the first longitudinal edge can be interconnected to the first longitudinal side of the truck box;
   a latch plate that is arranged and configured to be secured to and extend along at least a portion of the second longitudinal side of the truck box;
   an elongated roll bar member attached to the second longitudinal edge of the tarp; the elongated roll bar member having first and second ends; wherein the tarp can be wound around the elongated roll bar member;
   front and rear arms connecting to the elongated roll bar member to the truck box; wherein the front arm has a generally hollow interior; wherein at least one arm can selectively actuate movement of the elongated roll bar member over the top opening of the truck box in both an unroll direction to position the tarp in a secured position and a roll-up direction to secure the tarp in an open position; wherein the front arm is generally hollow;
   a motor secured to the front arm and the elongated roll bar; wherein the motor actuates movement of the elongated roll bar; wherein the motor includes at least one electrical cable; wherein the electrical cable is at least partially stored within the hollow interior of the front arm;
   a biasing member interconnected between the truck box and the elongated roll bar member, the biasing member including:
      a generally non-elastic cord interconnected to one end of the elongated roll bar member; wherein the cord can wind around the elongated roll bar member as the elongated roll bar member moves in the unroll direction; and
      a tensioning element having a first end and a second end, wherein the first end of the tensioning element is interconnected to the cord and the second end of the tensioning element can be interconnected to the second longitudinal side of the truck box when the roll-up tarp apparatus is operatively secured to the truck box, such that the biasing member biases the elongated roll bar member in the unroll direction; wherein the generally non-elastic cord slides over one of the end caps and the latch plate when the elongated roll bar member moves away from the open position toward the secured position.

33. The roll-up tarp apparatus of claim 32, further comprising a plurality of magnets secured proximate each lateral edge; wherein the plurality of magnets are configured to releasably secure the flexible tarp to the end cap when the flexible tarp is in the secured position.

34. A roll-up tarp apparatus for attachment to an open top truck trailer, the open top truck trailer having a truck box, the truck box having a top opening, two ends and first and second longitudinal sides, the truck box being further equipped with end caps at each of the two ends, wherein each end cap partially covers the top opening; the roll-up tarp apparatus comprising:
   a flexible tarp, the tarp having first and second lateral edges and first and second longitudinal edges; wherein the first longitudinal edge can be interconnected to the first longitudinal side of the truck box;
   an elongated roll bar member attached to the second longitudinal edge of the tarp; the elongated roll bar member having first and second ends; wherein the tarp can be wound around the elongated roll bar member;
   an arm connected to the truck box; wherein the arm has an upper portion, a lower portion and generally hollow interior; wherein the upper portion is telescopically connected to the lower portion, the lower portion having a top end and a first generally cylindrical wear plate proximate the top end and within the generally hollow interior; wherein the first wear plate further includes at least one collar that secures the first wear plate to the lower portion; wherein the upper portion includes a second wear plate secured to the generally hollow interior; wherein the arm is arranged and configured such that the collar can restrict upward movement of the upper portion, thus preventing the upper portion from moving upwardly past the collar;

a motor secured to the arm and the elongated roll bar; wherein the motor can selectively actuate movement of the elongated roll bar member over the top opening of the truck box in both an unroll direction to position the tarp in a secured position and a roll-up direction to secure the tarp in an open position; wherein the motor includes at least one electrical cable; wherein the electrical cable is at least partially stored within the hollow interior of the arm;

a biasing member interconnected between the truck box and the elongated roll bar member, the biasing member including:

a generally non-elastic cord interconnected to one end of the elongated roll bar member; wherein the cord can wind around the elongated roll bar member as the elongated roll bar member moves in the unroll direction; and a tensioning element having a first end and a second end, wherein the first end of the tensioning element is interconnected to the cord and the second end of the tensioning element can be interconnected to the second longitudinal side of the truck box when the roll-up tarp apparatus is operatively secured to the truck box, such that the biasing member biases the elongated roll bar member in the unroll direction; wherein the generally non-elastic cord slides over one of the end caps when the elongated roll bar member moves away from the open position toward the secured position.

35. The roll-up tarp apparatus of claim 34, further comprising a plurality of magnets secured proximate each lateral edge; wherein the plurality of magnets are configured to releasably secure the flexible tarp to the end cap when the flexible tarp is in the secured position.

36. The roll-up tarp apparatus of claim 34, further comprising a latch plate that is arranged and configured to be secured to and extend along at least a portion of the second longitudinal side of the truck box.

37. A roll-up tarp apparatus for attachment to an open top truck trailer, the open top truck trailer having a truck box, the truck box having a top opening, two ends and first and second longitudinal sides, the truck box being further equipped with end caps at each of the two ends, wherein each end cap partially covers the top opening; the roll-up tarp apparatus comprising:

a flexible tarp, the tarp having first and second lateral edges and first and second longitudinal edges; wherein the first longitudinal edge can be interconnected to the first longitudinal side of the truck box;

an elongated roll bar member attached to the second longitudinal edge of the tarp; the elongated roll bar member having first and second ends; wherein the tarp can be wound around the elongated roll bar member;

an arm connected to the truck box; wherein the arm has an upper portion, a lower portion and generally hollow interior; wherein the upper portion is telescopically connected to the lower portion, the lower portion having a top end, a bottom end and a first generally cylindrical wear plate proximate the top end and within the generally hollow interior; wherein the first wear plate further includes at least one collar that secures the first wear plate to the lower portion; wherein the upper portion includes a second wear plate secured to the generally hollow interior;

a motor secured to the arm and the elongated roll bar; wherein the motor can selectively actuate movement of the elongated roll bar member over the top opening of the truck box in both an unroll direction to position the tarp in a secured position and a roll-up direction to secure the tarp in an open position; wherein the motor includes at least one electrical cable; wherein the electrical cable is at least partially stored within the hollow interior of the arm;

a biasing member that biases the elongated roll bar member in the unroll direction.

38. The roll-up tarp apparatus of claim 37, further comprising a plurality of magnets secured proximate each lateral edge; wherein the plurality of magnets are configured to releasably secure the flexible tarp to the end cap when the flexible tarp is in the secured position.

39. The roll-up tarp apparatus of claim 37, further comprising a latch plate that is arranged and configured to be secured to and extend along at least a portion of the second longitudinal side of the truck box.

40. The roll-up tarp apparatus of claim 37, wherein the lower arm portion of the arm includes a plug having an aperture therethrough, wherein the at least one electrical cable extends through the aperture.

41. The roll-up tarp apparatus of claim 37, wherein, in operation, when the upper arm slides upwardly with respect to the lower arm, the wear plate of the upper arm will eventually contact the collar of the lower arm, thus limiting the movement of the upper arm with respect to the lower arm and preventing the upper arm from disconnecting from the lower arm.

42. The roll-up tarp apparatus of claim 37, wherein the biasing member includes a plurality of clock springs that bias the arm in the unroll direction; wherein the plurality of clock springs are positioned proximate the bottom end of the lower arm.

43. The roll-up tarp apparatus of claim 37, wherein the arm is arranged and configured such that the collar can restrict upward movement of the upper portion, thus preventing the upper portion from moving upwardly past the collar.

* * * * *